United States Patent
Dubey et al.

(10) Patent No.: US 10,308,552 B2
(45) Date of Patent: *Jun. 4, 2019

(54) FREEZE-THAW DURABLE GEOPOLYMER COMPOSITIONS AND METHODS FOR MAKING SAME

(71) Applicant: UNITED STATES GYPSUM COMPANY, Chicago, IL (US)

(72) Inventors: Ashish Dubey, Grayslake, IL (US); Sundararaman Chithiraputhiran, Chicago, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 175 days.

This patent is subject to a terminal disclaimer.

(21) Appl. No.: 15/436,360

(22) Filed: Feb. 17, 2017

(65) Prior Publication Data
US 2017/0166481 A1 Jun. 15, 2017

Related U.S. Application Data

(63) Continuation of application No. 14/920,022, filed on Oct. 22, 2015, now Pat. No. 9,624,131.

(51) Int. Cl.
*C04B 7/32* (2006.01)
*E01C 7/14* (2006.01)
(Continued)

(52) U.S. Cl.
CPC .............. *C04B 28/006* (2013.01); *C04B 7/32* (2013.01); *C04B 12/005* (2013.01); *C04B 18/08* (2013.01);
(Continued)

(58) Field of Classification Search
CPC ... C04B 28/006; C04B 24/2676; C04B 28/14; C04B 28/06; C04B 28/065; C04B 18/08;
(Continued)

(56) References Cited

U.S. PATENT DOCUMENTS

| 2,248,032 A | 7/1941 | Stanley et al. |
| 3,147,129 A | 9/1964 | Armstrong et al. |

(Continued)

FOREIGN PATENT DOCUMENTS

| CN | 101134892 A | 3/2008 |
| CN | 101508557 A | 8/2009 |

(Continued)

OTHER PUBLICATIONS

Office Action with a search report dated Feb. 16, 2017 from Taiwanese Patent Application No. 102114041 to United States Gypsum Company.

(Continued)

*Primary Examiner* — Anthony J Green
(74) *Attorney, Agent, or Firm* — Vorys, Sater Seymour and Pease LLP; Pradip Sahu; Philip T. Petti

(57) ABSTRACT

A freeze-thaw durable, dimensionally stable, geopolymer composition including: cementitious reactive powder including thermally activated aluminosilicate mineral, aluminate cement preferably selected from at least one of calcium sulfoaluminate cement and calcium aluminate cement, and calcium sulfate selected from at least one of calcium sulfate dihydrate, calcium sulfate hemihydrate, and anhydrous calcium sulfate; alkali metal chemical activator; and a freeze-thaw durability component selected from at least one of air-entraining agent, defoaming agent, and surface active organic polymer; wherein the composition has an air content of about 4% to 20% by volume, more preferably about 4% to 12% by volume, and most preferably about 4% to 8% by volume. The compositions are made from a slurry wherein the water/cementitious reactive powder weight ratio is 0.14 to 0.45:1, preferably 0.16 to 0.35:1, and more preferably 0.18 to 0.25:1. Methods for making the compositions are also disclosed.

21 Claims, 9 Drawing Sheets

(51) Int. Cl.

| | | |
|---|---|---|
| C04B 12/00 | (2006.01) | |
| C04B 28/00 | (2006.01) | |
| C04B 24/26 | (2006.01) | |
| C04B 28/14 | (2006.01) | |
| C04B 28/06 | (2006.01) | |
| C04B 18/08 | (2006.01) | |
| C04B 24/04 | (2006.01) | |
| C04B 24/34 | (2006.01) | |
| E01C 23/10 | (2006.01) | |
| E01C 7/36 | (2006.01) | |
| E01C 7/35 | (2006.01) | |
| C04B 103/00 | (2006.01) | |
| C04B 111/00 | (2006.01) | |
| C04B 111/20 | (2006.01) | |
| C04B 111/60 | (2006.01) | |
| C04B 111/72 | (2006.01) | |
| C04B 103/30 | (2006.01) | |
| C04B 103/32 | (2006.01) | |
| C04B 103/40 | (2006.01) | |
| C04B 103/50 | (2006.01) | |

(52) U.S. Cl.
CPC ........ *C04B 24/045* (2013.01); *C04B 24/2676* (2013.01); *C04B 24/34* (2013.01); *C04B 28/06* (2013.01); *C04B 28/065* (2013.01); *C04B 28/14* (2013.01); *E01C 7/147* (2013.01); *E01C 7/351* (2013.01); *E01C 7/356* (2013.01); *E01C 7/358* (2013.01); *E01C 7/36* (2013.01); *E01C 23/10* (2013.01); *C04B 2103/0066* (2013.01); *C04B 2103/304* (2013.01); *C04B 2103/32* (2013.01); *C04B 2103/40* (2013.01); *C04B 2103/50* (2013.01); *C04B 2111/0075* (2013.01); *C04B 2111/29* (2013.01); *C04B 2111/60* (2013.01); *C04B 2111/72* (2013.01); *E01C 7/142* (2013.01); *Y02P 40/165* (2015.11); *Y02W 30/92* (2015.05)

(58) Field of Classification Search
CPC ......... C04B 24/045; C04B 24/34; C04B 7/32; C04B 12/005; C04B 2103/0066; C04B 2103/304; C04B 2103/32; C04B 2103/40; C04B 2103/50; C04B 2111/0075; C04B 2111/29; C04B 2111/60; C04B 2111/72; E01C 23/00; E01C 7/36; E01C 7/147; E01C 7/351; E01C 7/356; E01C 7/358; E01C 7/142
See application file for complete search history.

(56) References Cited

U.S. PATENT DOCUMENTS

| | | |
|---|---|---|
| 3,251,701 A | 5/1966 | Klein |
| 3,819,393 A | 6/1974 | Ono et al. |
| 3,854,968 A | 12/1974 | Minnick et al. |
| 3,857,714 A | 12/1974 | Mehta |
| 3,997,353 A | 12/1976 | Chervenka, Jr. et al. |
| 4,302,251 A | 11/1981 | Udagawa et al. |
| 4,350,533 A | 9/1982 | Galer et al. |
| 4,404,031 A | 9/1983 | Sudoh et al. |
| 4,488,909 A | 12/1984 | Galer et al. |
| 4,655,979 A | 4/1987 | Nakano et al. |
| 4,659,385 A | 4/1987 | Costopoulos et al. |
| 4,661,159 A | 4/1987 | Ortega et al. |
| 4,842,649 A | 6/1989 | Heitzmann et al. |
| 5,109,030 A | 4/1992 | Chao et al. |
| 5,273,580 A | 12/1993 | Totten et al. |
| 5,374,308 A | 12/1994 | Kirkpatrick et al. |
| 5,387,283 A | 2/1995 | Kirkpatrick et al. |
| 5,439,518 A | 8/1995 | Francis et al. |
| 5,536,310 A | 7/1996 | Brook et al. |
| 5,556,458 A | 9/1996 | Brook et al. |
| 5,714,003 A | 2/1998 | Styron |
| 5,763,508 A | 6/1998 | Hess et al. |
| 6,149,724 A | 11/2000 | Ulibarri et al. |
| 6,554,894 B2 | 4/2003 | Styron et al. |
| 6,572,698 B1 | 6/2003 | Ko |
| 6,620,487 B1 | 9/2003 | Tonyan et al. |
| 6,641,658 B1 | 11/2003 | Dubey |
| 6,730,162 B1 | 5/2004 | Li et al. |
| 6,827,776 B1 | 12/2004 | Boggs et al. |
| 6,869,474 B2 | 3/2005 | Perez-Pena et al. |
| 6,923,857 B2 | 8/2005 | Constantinou et al. |
| 7,288,148 B2 | 10/2007 | Hicks et al. |
| 7,326,290 B2 | 2/2008 | Guinot et al. |
| 7,326,478 B2 | 2/2008 | Bouscal et al. |
| 7,618,490 B2 | 11/2009 | Nakashima et al. |
| 7,651,564 B2 | 1/2010 | Francis |
| 7,670,427 B2 | 3/2010 | Perez-Pena et al. |
| 7,892,351 B1 | 2/2011 | Kirkpatrick et al. |
| 7,956,113 B2 | 6/2011 | Killat et al. |
| 8,016,937 B2 | 9/2011 | Schumacher et al. |
| 8,038,790 B1 | 10/2011 | Dubey et al. |
| 8,070,878 B2 | 12/2011 | Dubey |
| 8,298,332 B2 | 10/2012 | Dubey |
| 8,366,823 B2 | 2/2013 | Perez-Pena |
| 8,519,016 B2 | 8/2013 | Perez-Pena |
| 8,551,241 B2 | 10/2013 | Perez-Pena |
| 8,747,547 B1 | 6/2014 | Peters et al. |
| 8,795,428 B1 | 8/2014 | Hill et al. |
| 8,864,901 B2 | 10/2014 | Lloyd et al. |
| 8,999,057 B2 | 4/2015 | Clodic et al. |
| 9,321,681 B2 * | 4/2016 | Dubey ............ C04B 7/32 |
| 9,624,131 B1 * | 4/2017 | Dubey ............ C04B 7/32 |
| 9,643,888 B2 * | 5/2017 | Dubey ............ C04B 7/32 |
| 9,656,916 B2 * | 5/2017 | Dubey ............ C04B 11/28 |
| 9,890,082 B2 * | 2/2018 | Dubey ............ C04B 11/28 |
| 2006/0269752 A1 | 11/2006 | Holland et al. |
| 2007/0079733 A1 | 4/2007 | Crocker |
| 2007/0144404 A1 | 6/2007 | Sorrentino et al. |
| 2008/0134943 A1 | 6/2008 | Godfrey et al. |
| 2010/0071597 A1 | 3/2010 | Perez-Pena |
| 2010/0089293 A1 | 4/2010 | Guynn et al. |
| 2010/0310846 A1 | 12/2010 | Berke et al. |
| 2011/0259228 A1 | 10/2011 | Mills et al. |
| 2012/0024196 A1 | 2/2012 | Gong et al. |
| 2012/0167804 A1 | 7/2012 | Perez-Pena |
| 2012/0172469 A1 | 7/2012 | Perez-Pena |
| 2013/0054694 A1 | 2/2013 | Maeng et al. |
| 2013/0087076 A1 | 4/2013 | Hill et al. |
| 2013/0087078 A1 | 4/2013 | Hill et al. |
| 2013/0139729 A1 | 6/2013 | Ong et al. |
| 2013/0284069 A1 | 10/2013 | Dubey |
| 2013/0284070 A1 | 10/2013 | Dubey |
| 2014/0371351 A1 | 12/2014 | Dantin et al. |
| 2015/0000568 A1 | 1/2015 | Bescher et al. |
| 2015/0141554 A1 | 5/2015 | Mikaelsson |
| 2016/0194247 A1 | 7/2016 | Dubey |
| 2016/0214897 A1 | 7/2016 | Du Bey |

FOREIGN PATENT DOCUMENTS

| | | |
|---|---|---|
| CN | 101712546 A | 5/2010 |
| CN | 101786854 A | 7/2010 |
| CN | 101921548 A | 12/2010 |
| CN | 102007085 A | 4/2011 |
| CN | 102159516 A | 8/2011 |
| CN | 102173711 A | 9/2011 |
| CN | 102180626 A | 9/2011 |
| CN | 102770388 A | 11/2012 |
| FR | 2940275 A1 | 6/2010 |
| FR | 2952050 A1 | 5/2011 |
| FR | 2955102 A1 | 7/2011 |
| GB | 2166430 A | 5/1986 |
| JP | 07305827 A | 11/1955 |
| JP | 58110451 A | 7/1983 |
| JP | S5957934 A | 4/1984 |
| JP | S60127252 A | 7/1985 |
| JP | 62179903 A | 8/1987 |

(56) References Cited

FOREIGN PATENT DOCUMENTS

| | | | |
|---|---|---|---|
| JP | 01299913 A | 12/1989 |
| JP | H04270157 A | 9/1992 |
| JP | H05229864 A | 9/1993 |
| JP | H0986979 A | 3/1997 |
| JP | 2002226251 A | 8/2002 |
| JP | 2002316860 A | 10/2002 |
| KR | 549958 B1 | 2/2006 |
| KR | 100549958 B1 | 2/2006 |
| KR | 826258 B1 | 1/2007 |
| KR | 2009025683 A | 9/2007 |
| KR | 100814962 B1 | 3/2008 |
| KR | 100826258 | 4/2008 |
| KR | 20090025683 A | 3/2009 |
| KR | 2010129104 A | 6/2009 |
| KR | 100909997 B1 | 7/2009 |
| KR | 2009085451 A | 8/2009 |
| KR | 959587 B1 | 10/2009 |
| KR | 100959587 | 5/2010 |
| RU | 2268148 C2 | 1/2006 |
| RU | 2365548 C2 | 8/2009 |
| TW | 201139322 A | 11/2011 |
| WO | 2011131998 A1 | 10/2011 |

OTHER PUBLICATIONS

Notice of Allowance with a Search Report dated Feb. 6, 2017 from Russian Patent Application No. 2014146785 to United States Gypsum Company.

Notice of Allowance with a Search Report dated Feb. 6, 2017 from Russian Patent Application No. 2014146124 to United States Gypsum Company.

Office Action dated Jan. 17, 2017 from Japanese Patent Application No. 2015-509035 to United States Gypsum Company.

Office Action dated Jan. 17, 2017 from Japanese Patent Application No. 2015-509036 to United States Gypsum Company.

Christine Angos, "A Guide to Understanding and Mixing Thickeners", Charles Ross & Son Company, New York, Mar. 20, 2013.

Personal Care, "ACULYN™ 22 Rheology Modifier/Stabilizer a Very Efficient Thickener for Difficult to Thicken Surfactant Systems", Rohm and Haas Company, Sep. 2002.

"Air-Entrainment", U.S. Department of Transportation-Federal Highway Administration, [online], [retrieved on Sep. 28, 2015]. Retrieved from the Internet: <http://www.fhwa.dot.gov/infrastructure/materialsgrp/airentr.htm>, pp. 1-3 (last modified Feb. 24, 2015).

Designation: C666/C666M—15, "Standard Test Method for Resistance of Concrete to Rapid Freezing and Thawing", ASTM International, West Conshohocken, PA, [online], [retrieved on Oct. 21, 2015], Retrieved from the Internet: <www.astm.org>, Feb. 1, 2015.

ASTM C672/C672M—12, "Standard Test Method for Scaling Resistance of Concrete Surfaces Exposed to Deicing Chemicals", ASTM International, West Conshohocken, PA, [online], [retrieved on Oct. 21, 2015], Retrieved from the Internet: <www.astm.org>.

"Freeze Thaw and ASTM C-672", US Spec Engineered Concrete Products, posted on May 21, 2010, [online], [retrieved on Sep. 28, 2015], Retrieved from the Internet: <http://www.usspec.com/blog/detail/freeze-thaw-and-astm-c-672/8/>, May 2012.

"Acronal®acrylic resins", BASF Corporation, Dispersion & Pigments North America, [online], [retrieved on Sep. 17, 2015], Retrieved from the Internet: <http://www.dispersions-pigments.basf.us/p02/USWeb-Internet/pigments/en_GB/content/microsites/pigmentsdispersions/products/Acronal>.

Adhesives, Technical Data Sheet, "Acronal® S 695 P", BASF Corporation, Rev 3, pp. 1-2, Mar. 2015.

Construction, Technical Data Sheet, "Acronal® S 695 P", BASF Corporation, Rev 3, pp. 1-3, Apr. 2015.

Construction Polymers, Technical Data Sheet, "Castament® FS 20", BASF Corporation, Rev 1, pp. 1-3, Oct. 2011.

A. Buchwald et al., "The suitability of thermally activated illite/smectite clay as raw material for geopolymer binders", Applied Clay Science 46 (2009), pp. 300-304.

"5.3 The Hydration Reactions", [online], [retrieved on Aug. 28, 2015], Retrieved from the Internet: <http://www.iti.northwestern.edu/cement/monograph/Monograph5_3_html>.

Technical Datasheet, "Bentone® CT", SpecialChem 2015, Elementis, [online], [retrieved on Sep. 17, 2015], Retrieved from the Internet: <http://adhesives_specialchem_com/product/a-elementis-bentone-ct>.

"Extracellular polymeric substance", From Wikipedia, the free encyclopedia, [online], [retrieved on Sep. 18, 2015], Retrieved from the Internet: <http://en.wikipedia.org/wiki/Extracellular_polymeric_substance>.

ASTM, C 666/C 666M—03, "Standard Test Method for Resistance of Concrete to Rapid Freezing and Thawing", ASTM International, West Conshohocken, PA, [online], [retrieved on Nov. 25, 2008], Retrieved from the Internet: <www.astm.org>.

"Methyl cellulose", From Wikipedia, the free encyclopedia, [online], [retrieved on Sep. 18, 2015], Retrieved from the Internet: <http://en.wikipedia.org/wiki/Methyl_cellulose>.

Product Bulletin, Building and Construction, "AXILAT Redispersible Powders, Dispersions and Additives", Momentive Specialty Chemicals Inc., 2012.

"Air-Entrainment", U.S. Department of Transportation-Federal Highway Administration, [online], [retrieved on Feb. 18, 2001]. Retrieved from the Internet: <http://www.fhwa.dot.gov/infrastructure/materialsgrp/airentr.htm>, pp. 1-3 (2001 edition).

"5.3 The Hydration Reactions", [online], [retrieved on Jun. 11, 2010], Retrieved from the Internet: <http://www.iti.northwestern.edu/cement/monograph/Monograph5_3.html> (2010 edition).

English Translation of CN 102173711 A published Sep. 7, 2011.

"The Worlds Only Commercially Available, High Performance & Sustainable Alternative to Traditional Portland Cement", www.ceratechinc.com, May 22, 2012.

Collepardi, M.M. "Water Reducers/Retarders" in "The Concrete Admixtures Handbook" edited by V.S. Ramachandran. Noyes Publications, New Jersey, 1995. pp. 286-297.

Kearsley, E.P.; Wainwright, P.J. The effect of high fly ash content on the compressive strength of foamed concrete. Cement and Concrete Research 31 (2001) pp. 105-112.

Tzouvalas, G, Dermatas, N, Tsimas, S, "Alternative Calcium Sulfate-Bearing Materials as Cement Retarders. Part I. Anhydrite", Cement and Concrete Research, Feb. 8, 2005, pp. 2113-2118, vol. 34, Elsevier, Orlando, FL.

Wayne S. Adaska et al., "Beneficial Uses of Cement Kiln Dust", May 19-22, 2008.

"Redispersible Powders, Dispersions and Additives for Building and Construction", 2009, HEXION.

Wikipedia, "Ye'elimite", http://en.wikipedia.org//wiki/Ye%27elimite, Apr. 12, 2012.

Machine Translation of JPH0986979, published Mar. 31, 1997 for Chichibu Onoda Cement Corp.

Machine Translation of KR100814962, published Mar. 19, 2008 for Refresh Technology Co Ltd et al.

Machine Translation of KR20100129104 A, published Dec. 8, 2010 for Korea Institute of Construction Technology et al.

Machine Translation of KR100909997 B1, published Jul. 29, 2009 for Samwon Inst of Construction Sy et al.

Machine Translation of CN102173711 A, published Sep. 7, 2011 for Wuhan Iron & Steel Group Corp.

Machine Translation of JPS58110451, published Jul. 1, 1983 for Nippon Sheet Glass Co Ltd et al.

Machine Translation of CN102180626, published Sep. 14, 2011 for Shanghai Sunrise Chemical Co Ltd.

C. Costa, C. Ferreira, M. Filipa Ribeiro, A. Fernandes. "Alkali-Activated Binders Produced from Petrochemical Fluid Catalytic Cracking Catalyst Waste" IJRET: Int l Journal of Research in Engineering and Technology 3(13) (2014) 114-122.

I. Garcia-Lodeiro, A. Palomo, A Fernandez-Jimenez, D.E. Macphee. "Compatibility studies between N-A-S-H and C-A-S-H gels. Study in the ternary diagram Na2O—CaO—Al2O3—SiO2—H2O" Cement and Concrete Research 41 (2011) 923-931.

(56) References Cited

OTHER PUBLICATIONS

Geopolymers: Structure, Processing, Properties and Industrial Applications, Edited by J. L. Provis and J. S.J. van Deventer, CRC Press, Woodhead Publishing Limited, Cambridge, UK, 2009, pp. 96-97 and 365-367.
Notice of Allowance dated Dec. 2, 2016 from U.S. Appl. No. 15/071,529 to United States Gypsum Company.
Notice of Allowance dated Nov. 18, 2016 from U.S. Appl. No. 15/071,424 to United States Gypsum Company.
Terminal Disclaimer to Obviate a Double Patenting Rejection Over a "Prior" Patent filed Nov. 3, 2016 in U.S. Appl. No. 15/071,424 to United States Gypsum Company.
Terminal Disclaimer to Obviate a Provisional Double Patenting Rejection Over a Pending "Reference" Application filed Nov. 3, 2016 in U.S. Appl. No. 15/071,424 to United States Gypsum Company.
Electronic Terminal Disclaimer filed Nov. 15, 2016 in U.S. Appl. No. 15/071,424 to United States Gypsum Company.
Terminal Disclaimer to Obviate a Double Patenting Rejection Over a "Prior" Patent filed Nov. 3, 2016 in U.S. Appl. No. 15/071,529 to United States Gypsum Company.
Electronic Terminal Disclaimer filed Nov. 15, 2016 in U.S. Appl. No. 15/071,529 to United States Gypsum Company.
International Search Report dated Jan. 10, 2017 for International Application No. PCT/US2016/056720 to United States Gypsum Company filed Oct. 13, 2016.

\* cited by examiner

Ex: 18 CaCl$_2$ - After 0 Cycles | Ex: 18 CaCl$_2$ - After 75 Cycles

Ex: 18 NaCl - After 0 Cycles | Ex: 18 NaCl - After 75 Cycles

FREEZE-THAW DURABLE GEOPOLYMER COMPOSITIONS AND METHODS FOR MAKING SAME

This application is a continuation of U.S. patent application Ser. No. 14/920,022, filed on Oct. 22, 2015, now U.S. Pat. No. 9,624,131 issued on Apr. 18, 2017.

FIELD OF THE INVENTION

The present invention provides rapid-setting, dimensionally stable geopolymer compositions having excellent freeze-thaw durability behavior and method for making these compositions. The improved properties are provided with sufficient workable time, and high early age and later age compressive strengths.

BACKGROUND OF THE INVENTION

US 20130284069 A1 Dubey Ashish, discloses Geopolymer compositions comprising reaction product of thermally activated aluminosilicate mineral/calcium aluminate cement/calcium sulfate such as anhydrous calcium sulfate/chemical activator such as alkali metal salt/water. It discloses the compositions may contain air-entraining agents or foaming agents. It also discloses using the composition for panels, road patch, traffic bearing surfaces, and pavements. It discloses some embodiments of its invention can be used with different fillers and additives including foaming agents and air entraining agents for adding air in specific proportions to make lightweight cementitious products, including precast construction elements, construction repair products, traffic bearing structures such as road compositions with good expansion properties and no shrinkage.

US 20130284070 A1 Dubey Ashish, discloses a Geopolymer composition for e.g. panels comprises reaction product of thermally activated aluminosilicate mineral/calcium sulfoaluminate cement/calcium sulfate such as anhydrous calcium sulfate/chemical activator such as alkali metal salt/water. It discloses the compositions may contain air-entraining agents or foaming agents. It discloses using the composition for patching compositions for road repair, road patching, traffic bearing surfaces, and pavements. It discloses the geopolymer compositions of some embodiments of its invention can be used with different fillers and additives including foaming agents and air entraining agents for adding air in specific proportions to make lightweight cementitious products, including precast construction elements, construction repair products, and patching compositions which have good expansion properties and no shrinkage e.g. suitable for road repairs and pavements.

As explained by Freeze Thaw and ASTM C-672, US Spec, posted on the Internet May 21, 2010, durability is the ability of concrete to resist weathering action, chemical attack and abrasion while maintaining its desired engineering properties. How durable concrete products need to be depends on the kind of environment they will be exposed to. As cold weather approaches, concepts like freeze-thaw and resistance to deicing salts become important to understand. When water freezes, it expands 9%. As the water in moist concrete freezes, it produces pressure in the pores of concrete. If this pressure exceeds the tensile strength, the cavity will dilate and rupture. Successive freeze-thaw cycles will then eventually cause expansion and cracking, scaling, and/or crumbling of the concrete. Deicing chemicals, used for snow and ice removal, can aggravate freeze-thaw deterioration. Therefore, when using cement products, such as patching materials, on concrete roadways it is important that these materials have a strong resistance to the effects of these harsh conditions and chemicals.

SUMMARY OF THE INVENTION

The present invention provides rapid-setting, dimensionally stable geopolymer compositions having excellent freeze-thaw durability behavior. The improved properties are provided with good dimensional stability, sufficient workable time, and high early age and later age compressive strengths.

The invention provides a freeze-thaw durable, dimensionally stable, geopolymer composition comprising a mixture of:
cementitious reactive powder comprising:
  thermally activated aluminosilicate mineral in an amount of 100 parts by weight, wherein preferably the thermally activated aluminosilicate mineral comprises at least 75% Class C fly ash,
  aluminate cement in an amount of 1 to 100, preferably 2.5-80, more preferably 5 to 60, most preferably 25 to 40 parts by weight (pbw) per 100 pbw of thermally activated aluminosilicate mineral, wherein preferably the aluminate cement is selected from at least one member of the group consisting of calcium sulfoaluminate cement and calcium aluminate cement, and
  calcium sulfate in an amount of 2 to 100, preferably 5 to 75, more preferably 10 to 50 parts by weight per 100 pbw of aluminate cement, wherein the calcium sulfate is selected from at least one member of the group consisting of calcium sulfate dihydrate, calcium sulfate hemihydrate, and anhydrous calcium sulfate; and
alkali metal chemical activator in an amount of 1 to 6, preferably 1.25 to 4, more preferably 1.5 to 2.5 weight % in weight % based upon the total weight of the cementitious reactive powder, wherein the alkali metal chemical activator is selected from at least one member of the group consisting of an alkali metal salt and an alkali metal base, wherein potassium citrate is the preferred alkali metal salt chemical activator;
freeze-thaw durability component in an amount of 0.05 to 21.5, preferably 0.1 to 10, more preferably 0.1 to 5 weight % based upon the total weight of the cementitious reactive powder, the freeze-thaw durability component comprising:
  air-entraining agent in an amount of 0 to 1, preferably 0.01-0.5, more preferably 0.01-0.2, most preferably 0.05-0.2 weight % based upon the total weight of the cementitious reactive powder,
  defoaming agent in an amount of 0 to 0.5, preferably 0-0.25, more preferably 0.01-0.1 weight % based upon the total weight of the cementitious reactive powder, and
  surface active organic polymer in an amount of 0 to 20, preferably 0-10, more preferably 0-5 weight % based upon the total weight of the cementitious reactive powder;
wherein at least one member of the group consisting of the air-entraining agent and the surface active organic polymer is present,
wherein the composition has an air content of about 4% to 20% by volume, more preferably about 4% to 12% by volume, and most preferably about 4% to 8% by volume,
wherein said thermally activated aluminosilicate mineral, said aluminate cement, and said calcium sulfate is at least 70 wt. %, preferably at least 80 wt. %, more preferably at least 95 wt. %, most preferably 100 wt. % of the cementitious reactive powder, wherein the composition has a freeze-thaw durability performance according to ASTM C666/C 666M-15 of a relative dynamic modulus of greater than 80 percent for at least 300 freeze-thaw cycles, preferably at least 600 freeze-thaw cycles, more preferably at least 900 freeze-thaw cycles, most preferably at least 1200 freeze-thaw cycles.

The composition was made from setting a slurry comprising water, the cementitious reactive powder, the alkali metal chemical activator, and the freeze-thaw durability component, wherein the water/cementitious reactive powder weight ratio of the slurry is 0.14 to 0.45:1, preferably 0.16 to 0.35:1, and more preferably 0.18 to 0.25:1. Upon setting the water is bound to the cementitious reactive powder.

The invention also provides a method for making the above-described freeze-thaw durable, dimensionally stable, geopolymer compositions comprising the steps of:

preparing a slurry by mixing
water;
cementitious reactive powder comprising:
thermally activated aluminosilicate mineral in an amount of 100 parts by weight, wherein preferably the thermally activated aluminosilicate mineral comprises at least 75% Class C fly ash,
aluminate cement in an amount of 1 to 100, preferably 2.5-80, more preferably 5 to 60, most preferably 25 to 40 parts by weight (pbw) per 100 pbw of thermally activated aluminosilicate mineral, wherein preferably the aluminate cement is selected from at least one member of the group consisting of calcium sulfoaluminate cement and calcium aluminate cement, and
calcium sulfate in an amount of 2 to 100, preferably 5 to 75, more preferably 10 to 50 parts by weight per 100 pbw of aluminate cement, wherein the calcium sulfate is selected from at least one member of the group consisting of calcium sulfate dihydrate, calcium sulfate hemihydrate, and anhydrous calcium sulfate; and
alkali metal chemical activator in an amount of 1 to 6, preferably 1.25 to 4, more preferably 1.5 to 2.5 weight % in weight % based upon the total weight of the cementitious reactive powder, wherein the alkali metal chemical activator is selected from at least one member of the group consisting of an alkali metal salt and an alkali metal base, wherein potassium citrate is the preferred alkali metal salt chemical activator;
freeze-thaw durability component in an amount of 0.05 to 21.5, preferably 0.1 to 10, more preferably 0.1 to 5 weight % based upon the total weight of the cementitious reactive powder, the freeze-thaw durability component comprising:
air-entraining agent in an amount of 0 to 1, preferably 0.01-0.5, more preferably 0.01-0.2, most preferably 0.05-0.2 weight % based upon the total weight of the cementitious reactive powder,
defoaming agent in an amount of 0 to 0.5, preferably 0-0.25, more preferably 0.01-0.1 weight % based upon the total weight of the cementitious reactive powder, and
surface active organic polymer in an amount of 0 to 20, preferably 0-10, more preferably 0-5 weight % based upon the total weight of the cementitious reactive powder;
wherein at least one member of the group consisting of the air-entraining agent and the surface active organic polymer is present, wherein the slurry has an air content of about 4% to 20% by volume, more preferably about 4% to 12% by volume, and most preferably about 4% to 8% by volume, wherein said thermally activated aluminosilicate mineral, said aluminate cement, and said calcium sulfate is at least 70 wt. %, preferably at least 80 wt. %, more preferably at least 95 wt. %, most preferably 100 wt. % of the cementitious reactive powder;

wherein the water/cementitious reactive powder weight ratio of the slurry is 0.14 to 0.45:1, preferably 0.16 to 0.35:1, and more preferably 0.18 to 0.25:1, setting the slurry to form a set composition;

wherein the set composition has a freeze-thaw durability performance according to ASTM C666/C 666M-15 of a relative dynamic modulus of greater than 80 percent for at least 300 freeze-thaw cycles, preferably at least 600 freeze-thaw cycles, more preferably at least 900 freeze-thaw cycles, most preferably at least 1200 freeze-thaw cycles.

Preferably the slurry has a water/cementitious reactive powders weight ratio of 0.14 to 0.45:1, preferably 0.16 to 0.35:1, and more preferably 0.18 to 0.25:1, wherein the mixture contains at least one member of the group consisting of the air-entraining agent and the surface active organic polymer.

The compositions of the invention have a variety of uses. A preferred use is for road patching to repair a pavement or road defect. Typical defects are potholes, sinkholes, or cracks. When used as road patch the slurry is placed into the pavement or road defect and cures to form a patch having good freeze-thaw resistance. Thus, it resists cracking when exposed to multiple freeze-thaw cycles where temperature cycles below 32° F. (freeze) and above 32° F. (thaw).

The freeze-thaw durability component is one or more surface active agents selected from a group comprising of air-entraining agents, defoaming agents, and surface active organic polymers added to entrain air in the aqueous mixture in amounts that enhance and provide desired mechanical and durability performance. The mixture for the composition and method of the invention may incorporate other additives such as water reducing agents, set accelerating or retarding agents, wetting agents, colorants, fibers, rheology and viscosity modifiers, organic polymers, corrosion resistant admixtures, lightweight or other aggregates, or other additives to provide or modify the properties of the slurry and final product.

As used herein, early age strength of the composition is characterized by measuring the compressive strength after 1 to 24 hours of curing. In many applications, relatively higher early age compressive strength can be an advantage for a cementitious material because it can withstand higher stresses without excessive deformation. Achieving high early strength also increases the factor of safety relating to handling and use of manufactured products. Further, due to the achievement of high early strength, many materials and structures can be opened to traffic and allowed to support non-structural and structural loads at an early age. Typically, chemical reactions providing strength development in such compositions will continue for extended periods after the final setting time has been reached.

As used herein, later age strength of the composition is characterized by measuring the compressive strength after 7 days of curing. Ultimate compressive strength is characterized by measuring the compressive strength after 28 days of curing.

The geopolymer cementitious binders of the invention are capable of developing compressive strength after 1 to 4 hours of about 500 psi to about 5000 psi, about 1500 to about 8000 psi after 24 hours, and about 3,500 to about 13000 psi after 28 days.

Definitions

Herein the expression "hydraulic binder (hydraulic cement)" is understood to mean a pulverulent material which, mixed with water, forms a paste which sets and hardens by a series of hydration reactions and processes and which, after hardening, retains its strength and its stability even under water.

The term "gypsum" as used herein is intended to include gypsum such as is normally understood in the art. This would include calcium sulfate ($CaSO_4$) and its various forms such as calcium sulfate anhydrate, calcium sulfate hemihydrate and calcium sulfate dihydrate, as well as calcined gypsum, pressure calcined gypsum and plaster of Paris.

The gypsum should have a minimum purity of 90% and be preferably finely ground to a particle size such that at least 90 wt. %, and preferably at least 99 wt. % of the gypsum particles, based on the total weight of the gypsum particles will pass through a No. 100 U.S. Standard sieve (150 microns).

The term "aluminate cement" as used herein is intended to include those cementitious materials normally understood in the art to contain as the main cementitious constituent, mono calcium aluminate ($CaOAl_2O_3$). The aluminate cements are any member selected from the group of calcium aluminate cement (CAC), calcium sulfoalumicate cement (CSA), calcium sulfoaluminoferrite cement, calcium sulfoferrite cement, calcium fluroalumiate cement, strontium aluminate cement, barium aluminate cement, Type-K expansive cement, Type S expansive cement, and sulfobelite cement. This would preferably include calcium aluminate cement (CAC), calcium sulfoalumicate cement (CSA). Alternative names for calcium aluminate cements are "aluminous cement", and "high-alumina cement". High alumina cement is normally understood in the art to contain greater than 15% of mono calcium aluminate. The surface area of the aluminate cement is preferably greater than about 3,000 $cm^2$/gram, more preferably 3000 to 8000 $cm^2$/gram, and further more preferably about 4,000 to 6,000 $cm^2$/gram as measured by the Blaine surface area method (ASTM C 204).

The term "Portland cement" as used herein is intended to include those cements normally understood in the art to be "Portland cement" such as those described in British Standards Institution (BSI) EN-197 and American ASTM Standard C-150 and European Standard EN-197. The types CEM I and CEM II compositions of the latter standard are preferred for use in the present invention, although other forms of Portland cement are also suitable. Portland cement consists mainly of tri-calcium silicate and dicalcium silicate.

A monomer is a substantially mono-disperse compound of low molecular weight—typically less than one thousand Daltons—that is capable of being polymerized.

As used herein terms including "meth" in parentheses, such as "(meth)acrylate," are intended to refer either to the acrylate or to the methacrylate, or mixtures of both. Similarly, the term (meth)acrylamide would refer either to the acrylamide or to the methacrylamide, or mixtures of both, as one skilled in the art would readily understand.

An aqueous dispersion of polymer particles is intended to encompass the meaning of latex polymer and water dispersible polymer.

A "latex" polymer means a dispersion or emulsion of polymer particles formed in the presence of water and one or more secondary dispersing or emulsifying agents (e.g., a surfactant, alkali-soluble polymer or mixtures thereof) whose presence is required to form the dispersion or emulsion. The secondary dispersing or emulsifying agent is typically separate from the polymer after polymer formation. In some embodiments a reactive dispersing or emulsifying agent may become part of the polymer particles as they are formed.

A "water-dispersible" polymer means a polymer in powder form capable of being combined by itself with water, without requiring the use of a secondary dispersing or emulsifying agent, to obtain an aqueous dispersion or emulsion of polymer particles having at least a one month shelf stability at normal storage temperatures.

The term "surface active organic polymer" for the purposes of this invention is defined here as any organic polymeric material that is capable of entraining air in the slurry when the slurry is subjected to mechanical agitation.

The term "storage stable" as it applies to that component of the formulation which contains the hydraulic binder (hydraulic cement), is intended to mean that the hydraulic binder therein remains reactive towards water when mixed therewith after a period of storage, typically up to 1 year or greater.

DETAILED DESCRIPTION OF THE INVENTION

Composition

Figure 1:
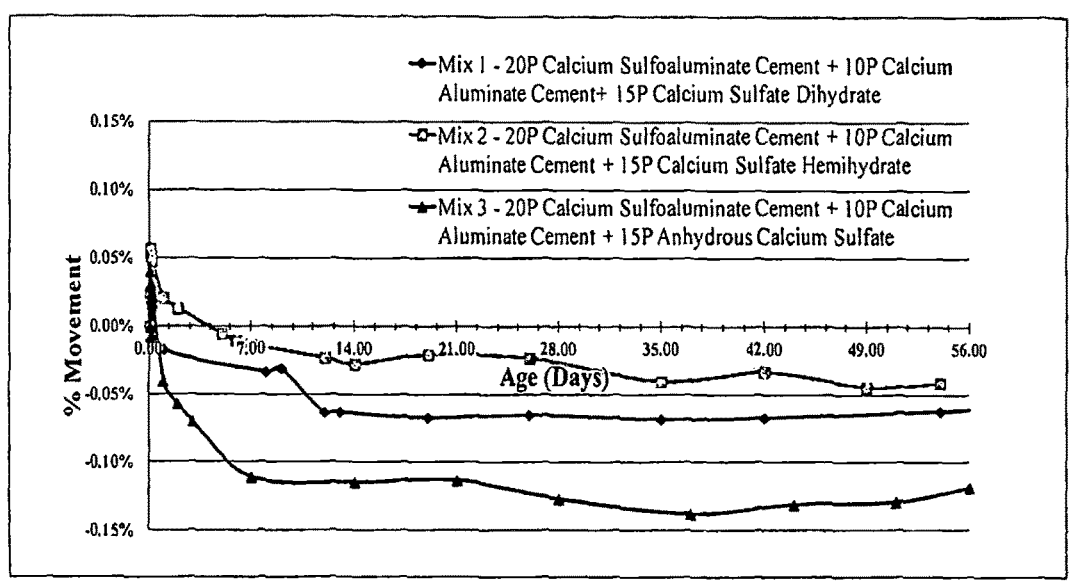
FIG. 1 shows the shrinkage behavior of geopolymeric cementitious compositions of the invention investigated in Example 2.

The invention provides a freeze-thaw durable, dimensionally stable, geopolymer composition comprising a mixture of:
  thermally activated aluminosilicate mineral in an amount of 100 parts by weight, wherein preferably the thermally activated aluminosilicate mineral comprises at least 75% Class C fly ash,
  aluminate cement in an amount of 1 to 100, preferably 2.5-80, more preferably 5 to 60, most preferably 25 to 40 parts by weight (pbw) per 100 pbw of thermally activated aluminosilicate mineral, wherein preferably the aluminate cement is selected from at least one member of the group consisting of calcium sulfoaluminate cement and calcium aluminate cement, and calcium sulfate in an amount of 2 to 100, preferably 5 to 75, more preferably 10 to 50 parts by weight per 100 pbw of aluminate cement, wherein the calcium sulfate is selected from at least one member of the group consisting of calcium sulfate dihydrate, calcium sulfate hemihydrate, and anhydrous calcium sulfate; and alkali metal chemical activator in an amount of 1 to 6, preferably 1.25 to 4, more preferably 1.5 to 2.5 weight % in weight % based upon the total weight of the cementitious reactive powder, wherein the alkali metal chemical activator is selected from at least one member of the group consisting of an alkali metal salt and an alkali metal base, wherein potassium citrate is the preferred alkali metal salt chemical activator;

freeze-thaw durability component in an amount of 0.05 to 21.5, preferably 0.1 to 10, more preferably 0.1 to 5 weight % based upon the total weight of the cementitious reactive powder, the freeze-thaw durability component comprising:

air-entraining agent in an amount of 0 to 1, preferably 0.01-0.5, more preferably 0.01-0.2, most preferably 0.05-0.2 weight % based upon the total weight of the cementitious reactive powder, defoaming agent in an amount of 0 to 0.5, preferably 0-0.25, more preferably 0.01-0.1 weight % based upon the total weight of the cementitious reactive powder, and surface active organic polymer in an amount of 0 to 20, preferably 0-10, more preferably 0-5 weight % based upon the total weight of the cementitious reactive powder;

wherein at least one member of the group consisting of the air-entraining agent and the surface active organic polymer is present, wherein the composition has an air content of about 4% to 20% by volume, more preferably about 4% to 12% by volume, and most preferably about 4% to 8% by volume, wherein said thermally activated aluminosilicate mineral, said aluminate cement, and said calcium sulfate is at least 70 wt. %, preferably at least 80 wt. %, more preferably at least 95 wt. %, most preferably 100 wt. % of the cementitious reactive powder, wherein the composition has a freeze-thaw durability performance according to ASTM C666/C 666M-15 of a relative dynamic modulus of greater than 80 percent for at least 300 freeze-thaw cycles, preferably at least 600 freeze-thaw cycles, more preferably at least 900 freeze-thaw cycles, most preferably at least 1200 freeze-thaw cycles.

The composition was made from setting a slurry comprising water, the cementitious reactive powder, the alkali metal chemical activator, and the freeze-thaw durability component, wherein the water/cementitious reactive powder weight ratio of the slurry is 0.14 to 0.45:1, preferably 0.16 to 0.35:1, and more preferably 0.18 to 0.25:1. Upon setting the water is bound to the cementitious reactive powder.

Preferably the composition has at least one feature selected from the group consisting of an amount of 0.01 to 1 weight % based upon the total weight of the cementitious reactive powder, of air-entraining agent, and an amount of 1 to 20 weight % based upon the total weight of cementitious reactive powder of surface active organic polymer, wherein 80 wt % of the cementitious reactive powder comprises thermally activated aluminosilicate mineral, the aluminate cement, and the calcium sulfate.

Method

The invention also provides a method for making the above-described freeze-thaw durable, dimensionally stable, geopolymer compositions comprising the steps of:

preparing a slurry by mixing
water;
cementitious reactive powder comprising:
thermally activated aluminosilicate mineral in an amount of 100 parts by weight, wherein preferably the thermally activated aluminosilicate mineral comprises at least 75% Class C fly ash, aluminate cement in an amount of 1 to 100, preferably 2.5-80, more preferably 5 to 60, most preferably 25 to 40 parts by weight (pbw) per 100 pbw of thermally activated aluminosilicate mineral, wherein preferably the aluminate cement is selected from at least one member of the group consisting of calcium sulfoaluminate cement and calcium aluminate cement, and calcium sulfate in an amount of 2 to 100, preferably 5 to 75, more preferably 10 to 50 parts by weight per 100 pbw of aluminate cement, wherein the calcium sulfate is selected from at least one member of the group consisting of calcium sulfate dihydrate, calcium sulfate hemihydrate, and anhydrous calcium sulfate; and alkali metal chemical activator in an amount of 1 to 6, preferably 1.25 to 4, more preferably 1.5 to 2.5 weight % in weight % based upon the total weight of the cementitious reactive powder, wherein the alkali metal chemical activator is selected from at least one member of the group consisting of an alkali metal salt and an alkali metal base, wherein potassium citrate is the preferred alkali metal salt chemical activator;

freeze-thaw durability component in an amount of 0.05 to 21.5, preferably 0.1 to 10, more preferably 0.1 to 5 weight % based upon the total weight of the cementitious reactive powder, the freeze-thaw durability component comprising:

air-entraining agent in an amount of 0 to 1, preferably 0.01-0.5, more preferably 0.01-0.2, most preferably 0.05-0.2 weight % based upon the total weight of the cementitious reactive powder, defoaming agent in an amount of 0 to 0.5, preferably 0-0.25, more preferably 0.01-0.1 weight % based upon the total weight of the cementitious reactive powder, and surface active organic polymer in an amount of 0 to 20, preferably 0-10, more preferably 0-5 weight % based upon the total weight of the cementitious reactive powder;

wherein at least one member of the group consisting of the air-entraining agent and the surface active organic polymer is present, wherein the slurry has an air content of about 4% to 20% by volume, more preferably about 4% to 12% by volume, and most preferably about 4% to 8% by volume, wherein said thermally activated aluminosilicate mineral, said aluminate cement, and said calcium sulfate is at least 70 wt. %, preferably at least 80 wt. %, more preferably at least 95 wt. %, most preferably 100 wt. % of the cementitious reactive powder;

wherein the water/cementitious reactive powder weight ratio of the slurry is 0.14 to 0.45:1, preferably 0.16 to 0.35:1, and more preferably 0.18 to 0.25:1, setting the slurry to form a set composition;

wherein the set composition has a freeze-thaw durability performance according to ASTM C666/C 666M-15 of a relative dynamic modulus of greater than 80 percent for at least 300 freeze-thaw cycles, preferably at least 600 freeze-thaw cycles, more preferably at least 900 freeze-thaw cycles, most preferably at least 1200 freeze-thaw cycles.

Preferably the water/cementitious reactive powder weight ratio of the composition is 0.14 to 0.45:1, preferably 0.16 to 0.35:1, and more preferably 0.18 to 0.25:1, wherein the mixture contains at least one member of the group consisting of the air-entraining agent and the surface active organic polymer. This water being the water bound to the cementitious reactive powder.

The Freeze-Thaw Durability Component could be added before water addition along with other raw materials. The cementitious reactive powder, freeze-thaw durability component, and alkali metal chemical activator are preferably combined to form a mixture and then water and air is added. The mixture can be added to the water or the water can be added to the mixture.

The alkali metal chemical activator in dry or liquid form is added to the mixture of cementitious reactive powder. If it is dry it can be added to the mixture before adding water. If liquid then it is added with the water.

In the compositions and methods, the calcium sulfate is selected from the group consisting of calcium sulfate dihydrate, calcium sulfate hemihydrate, anhydrous calcium sulfate and mixtures thereof (preferably it is added in a fine grain form with particle size less than about 300 microns).

In the compositions and methods the chemical activator is added to the cementitious reactive powder mixture either in dry or liquid form comprising an alkali metal salt or base preferably selected from the group consisting of alkali metal salts of organic acids, alkali metal hydroxides, and alkali metal silicates. In subsequent steps, water is added and optionally a superplasticizer is added, particularly a carboxylated plasticizer material, to form stable slurry mixtures that can be used in applications suitable for geopolymeric cementitious products.

The compositions of the invention or made in the method of the present invention include calcium sulfoaluminate cements and/or calcium aluminate cements and allows either one of those to be absent. The invention covers the following three compositions:
 compositions including both a calcium sulfoaluminate cement and a calcium aluminate cement;
 compositions including calcium sulfoaluminate cement but not calcium aluminate cement;
 compositions including only calcium aluminate cement but not calcium sulfoaluminate cement.

The compositions of the invention or made in the method of the present invention may incorporate other additives not considered cementitious reactive powder such as superplasticizers, water reducing agents, set accelerating agents, set retarding agents, wetting agents, fibers, rheology modifiers, organic polymers, shrinkage control agents, viscosity modifying agents (thickeners), film-forming redispersible polymer powders, film-forming polymer dispersions, coloring agents, corrosion control agents, alkali-silica reaction reducing admixtures, discrete reinforcing fibers, and internal curing agents.

The compositions of the invention or made in the method of the present invention may incorporate other additives not considered cementitious reactive powder to provide or modify the properties of the slurry and final product. These additives are pozzolanic mineral, and fillers selected from the group consisting of one or more of sand, lightweight aggregates, lightweight fillers, mineral fillers, and aggregates other than sand.

The compositions of the invention or made in the method of the present invention have no loss in mechanical performance and durability, as demonstrated by the measured parameter relative dynamic modulus, for at least 300 freeze-thaw cycles, preferably at least 600 freeze-thaw cycles, more preferably at least 900 freeze-thaw cycles and most preferably at least 1200 freeze-thaw cycles. The freeze-thaw durability testing is conducted based on ASTM C666—Procedure A. The version of this standard is ASTM C666/C666M-15 (published 2015). The nominal freezing and thawing cycle shall consist of alternately lowering the temperature of the specimens from 40 to 0° F. [4 to −18° C.] and raising it from 0 to 40° F. [−18 to 4° C.] in not less than 2 nor more than 5 hours. The temperature was measured using thermocouple in a freeze-thaw cabinet. The dimensions of the rectangular prism specimen used for freeze-thaw durability testing were as follows: 3 inches (width)×4 inches (thickness)×16 inches (length).

Based on ASTM C666 the durability factor of the test specimen can be calculated as follows:

$$DF = \frac{P*N}{M}$$

where:
DF=durability factor of the test specimen,
P=relative dynamic modulus of elasticity at N cycles, %,
N=number of cycles at which P reaches the specified minimum value for discontinuing the test or the specified number of cycles at which the exposure is to be terminated, whichever is less, and
M=specified number of cycles at which the exposure is to be terminated. M value based on ASTM C666 is 300.

The compositions of the invention or made in the method of the present invention have beneficial properties as measured by the salt scaling resistance test per ASTM C672/C672M-12, Standard Test Method for Scaling Resistance of Concrete Surfaces Exposed to Deicing Chemicals, ASTM, published 2012. The dimensions of the specimen used for salt scaling durability testing were 8.75 inches (length)×8.3125 inches (width)×3 inches (thickness).

Initial Slurry Temperature and Slurry Temperature Rise

In the present invention, to form the composition, the Cementitious Reactive Powder Component (thermally activated aluminosilicate mineral, aluminate cement, and calcium sulfate), Activator Component (alkali metal chemical activator), and water are mixed to form a cementitious slurry at an initial slurry temperature. The slurry is formed under conditions which provide a reduced initial mixture slurry temperature and a controlled temperature. This leads to formation of aluminosilicate geopolymer reaction species and setting and hardening of the resulting material. Simultaneously, hydration reactions of calcium silicate as well as calcium aluminate and/or calcium sulfoaluminate phases also occur leading to setting and hardening of the resulting material.

The initial temperature is defined as the temperature of the overall mixture during the first minute after the cementitious reactive powder, activator, and water are first all present in the mixture. Of course the temperature of the overall mixture can vary during this first minute but to achieve preferred thermal stability it will preferably remain within an range initial temperature range of about 0 to about 122° F. (0 to 50° C.), preferably about 41 to about 104° F. (5 to 40° C.), more preferably about 50 to about 95° F. (10 to 35° C.) and, most preferably ambient temperature (room temperature) of about 77° F. (25° C.).

Increasing the initial temperature of the slurry increases the rate of temperature rise as the reactions proceed and reduces the setting time. Thus, initial slurry temperature of 95° F. (35° C.) to 105° F. (41.1° C.) used in preparing conventional fly ash based geopolymeric compositions for rapid gelation and setting times is preferably avoided since the composition formulation is designed to reduce temperature increase behavior of the mixed composition from the initial slurry temperatures.

The controlled temperature rise is less than about 50° F. (28° C.) to a final composition mixture slurry temperature, more preferably a rise of less than about 40° F. (22° C.) and more preferably a rise of less than about 30° F. (17° C.) for improved temperature stability and more importantly, slower gelation and final setting times of from about 10 to about 240 minutes, more preferably about 60 to about 120 minutes and more preferably about 30 to about 90 minutes. This allows for more controlled working time for commercial use of the compositions of the invention. The setting time of the slurry is adjusted based on the final use requirements.

Material Exothermic and Temperature Riser Behavior

Compositions of the present invention advantageously achieve moderate heat evolution and low temperature rise within the material during the curing stage. In such compositions, the maximum temperature rise occurring in the material is preferably less than about 50° F. (28° C.), more preferably less than about 40° F. (22° C.), and most preferably less than about 30° F. (17° C.). This prevents excessive thermal expansion and consequent cracking and disruption of material.

Aerating

The aqueous mixture of this invention can be aerated by mechanically mixing the slurry comprising freeze-thaw durability component as disclosed in this invention. It has unexpectedly been determined that the high shear mixers (RPM>100) tend to entrain about 2 to 3 times more air in the slurry when compared to the low shear mixers (RPM≤100).

The preferred method for mixing rapid setting geopolymer compositions of the invention with an objective of obtaining superior freeze-thaw durability performance is by utilizing a low shear mixer. Preferably, the low shear mixers useful in this invention are capable of mixing at a speed of 100 RPM or lower. More preferably, the low shear mixers useful in this invention are capable of mixing at a speed of 50 RPM or lower. Most preferably, the low shear mixers useful in this invention are capable of mixing at a speed of 25 RPM or lower.

The preferred slurry mixing time using a low shear mixer (≤100 RPM) is between 2 to 12 minutes. More preferred mixing time using a low shear mixer is between 3 to 10 minutes. The most preferred mixing time using a low shear mixer is between 4 to 8 minutes.

The preferred mixing time using a high shear mixer (>100 RPM) is 1.5 to 8 minutes. More preferred mixing time using a high shear mixer is between 2 to 6 minutes. While the most preferred mixing time using a high shear mixer is between 3 to 4 minutes.

Preferably the composition is aerated in the field. This is advantageous when repairing roads, for example at the road site where a pothole is being repaired.

Ingredients of the Composition of the Invention or Used in the Method to Make the Composition of the Invention TABLE A summarizes components of the composition and method of the present invention. Each "Preferred" range or "More Preferred" range is individually a preferred range or more preferred range for the invention. Thus, preferably any "Preferred" range can be independently substituted for a corresponding "Useable range". More preferably any "More Preferred range" can be independently substituted for a corresponding "Useable" range or a corresponding "Preferred range".

TABLE A

Freeze-Thaw Durable reactive geopolymer cementitious compositions of some embodiments of the invention (in parts by weight unless otherwise specified)

| | Useable | Preferred | More Preferred |
|---|---|---|---|
| Cementitious Reactive Powder Component A: | | | |
| a. Thermally activated aluminosilicate mineral (parts by weight, pbw) | 100 | 100 | 100 |
| b. aluminate cement (pbw per 100 pbw of thermally activated aluminosilicate mineral) | 1-100 | 2.5-80 | 5-60 |
| c. Calcium sulfate (pbw per 100 pbw of mixture of aluminate cement) | 2-100 | 5-75 | 10-50 |
| Activator Component B: | | | |
| Alkali metal chemical activator (weight % based upon the total weight of Component A) | 1 to 6% | 1.25 to 4% | 1.5 to 2.5% |
| Freeze-Thaw Durability Component C: One or more surface active agents (weight % based upon the total weight of Component A) | | | |
| Air-entraining agent (weight % based upon the total weight of Component A) | 0.0-1% | 0.01-0.5% | 0.05-0.2% |
| Defoaming agent (weight % based upon the total weight of Component A) | 0-0.5% | 0-0.25% | 0.01-0.1% |
| Surface active organic polymer (weight % based upon the total weight of Component A) | 0-20% | 0-10% | 1-5% |

The Freeze-Thaw Durability Component C contains at least one member of the group consisting of the air-entraining agent and the surface active organic polymer.

Cementitious Reactive Powder Component A is the total of the thermally activated aluminosilicate (preferably comprising Class C fly ash), aluminate cement, and calcium sulfate, and, if present, other cements (for example, Portland cement or Calcium Fluoroaluminate). However, Cementitious Reactive Powder Component A is at least 70 wt. %, preferably at least 80 wt. %, more preferably at least 95 wt. %, most preferably 100 wt. % thermally activated aluminosilicate mineral, aluminate cement, and calcium sulfate.

In the present specification composition percentages and ratios are weight percents and weight ratios unless otherwise specified.

The invention encompasses Calcium sulfoaluminate cement provided in the absence of Calcium aluminate cement, wherein the composition has Calcium sulfoaluminate cement in an amount of 2-100, preferably 2.5-50, more preferably 5-30, most preferably 25 to 40 parts by weight (pbw) per 100 pbw of thermally activated aluminosilicate mineral.

The invention encompasses Calcium aluminate cement provided in the absence of Calcium sulfoaluminate cement, wherein the composition has Calcium aluminate cement in an amount of 2-100, preferably 2.5-80, more preferably 5-60, most preferably 25 to 40 parts by weight (pbw) per 100 pbw of thermally activated aluminosilicate mineral.

The invention encompasses Calcium aluminate cement provided with Calcium sulfoaluminate cement, wherein the composition has total aluminate cement in an amount of 2-100, preferably 2.5-80, more preferably 5-60, most preferably 25 to 40 parts by weight (pbw) per 100 pbw of thermally activated aluminosilicate mineral.

The geopolymer cementitious compositions of preferred embodiments of the present invention can be used where other cementitious materials are used; particularly applications where freeze-thaw resistance is important, setting and working time flexibility, dimensional stability, compressive strength and/or other strength properties are important or necessary.

Slurries used to make compositions of the invention have the amounts of air and water listed in TABLE A-1. Each "Useable" range, "Preferred" range or "More Preferred" range is individually a useable, preferred range or more preferred range for the invention. Thus, the useable ranges of components of TABLE A-1 would be used with the useable ranges of components of TABLE A. However, preferably any "Preferred" range can be independently substituted for a corresponding "Useable range". More preferably any "More Preferred range" can be independently substituted for a corresponding "Useable" range or a corresponding "Preferred range".

TABLE A-1

Amounts of Air and Water in Compositions of the present invention

|  | Useable | Preferred | More preferred |
| --- | --- | --- | --- |
| Water/Cementitious Reactive Powder Component A Ratio (by weight) | 0.14-0.45 | 0.16-0.35 | 0.18-0.25 |
| Air (volume % of slurry) | 4-20 | 4-12 | 4-8 |

As a result, products of the present invention have these amounts of air as void spaces. Also as a result, products of the present invention have up to these amounts of water bound to the cement by reacting and hydrating the cementitious materials of Component A in presence of Component B. In the invention water is provided to accomplish the chemical hydration and aluminosilicate geopolymerization reactions in compositions of the invention. Hydration reactions of calcium silicate as well as calcium aluminate and/or calcium sulfoaluminate phases also occur leading to setting and hardening of the resulting material. The chemical reaction between cement and water, known as hydration, produces heat known as heat of hydration. Also, when mixed with the water at normal (ambient) temperatures, calcined gypsum reverts chemically to the dihydrate form while physically "setting": $CaSO_4 \cdot \frac{1}{2}H_2O + 1\frac{1}{2}H_2O \rightarrow CaSO_4 \cdot 2H_2O$. Gypsum is highly soluble and rapidly releases calcium and sulfate into the slurry. The presence of the sulfate ions causes calcium aluminate to react such that Calcium aluminate and $CaSO_4 \cdot 2H_2O$ to form the mineral ettringite.

Calcium sulfates (different forms) react with calcium aluminates to form calcium sulfoaluminate hydrates. Presence of calcium sulfates also appears to influence formation of products of geopolymerization reactions such as sodium alumino silicate hydrate (NASH) gels and calcium alumino silicate hydrate (CASH) gels.

The geopolymer reaction of aluminosilicate mineral such as fly ash with an alkali metal activator such as alkali metal citrate is known to involve an extremely rapid rate of reaction in which significant amount of heat is released due to the exothermic reaction involved. This rapid rate of exothermic reaction leads to the formation of aluminosilicate compounds and the material gels-up and hardens extremely quickly (in a matter of minutes).

Similarly, interaction of calcium sulfoaluminate cement with calcium sulfate also is known to involve an extremely rapid rate of reaction in which significant amount of heat is released due to the exothermic reaction. As a result of this rapid exothermic reaction, hydration products of calcium sulfoaluminate compound are formed and the material gels-up and hardens extremely quickly, again in a matter of minutes. An extremely short setting time is problematic in some applications since it provides a short working life (pot life) that causes significant difficulties with processing and placement of rapid setting material in actual field applications. Also, the large amount of heat generated by the rapid exothermic reactions can lead to undesirable thermal expansion and consequent cracking and disruption of material.

Setting of the composition is characterized by initial and final set times, as measured using Vicat needle specified in the ASTM C191 test procedure. The final set time also corresponds to the time when a concrete product, e.g., a concrete panel, has sufficiently hardened so that it can be handled.

The present invention employs the reaction of thermally activated aluminosilicate mineral comprising Class C fly ash, aluminate cement (calcium aluminate cement and/or calcium sulfoaluminate cement), calcium sulfate, and alkali metal chemical activator. They interact synergistically with each other as part of the geopolymerization reaction to increase the gelation time and final setting time of the resulting material. Appropriate selection of the type of calcium sulfate and its amount, the type of aluminate cement and its amount, and the alkali metal chemical activator and its amount are effective in prolonging the gelation rate and period and the final setting time of the resulting material. This allows longer open and working times for the geopolymer cementitious compositions.

Other additives not considered cementitious reactive powder may be incorporated into the slurry and overall geopolymeric cementitious composition of this invention. Such other additives, for example, water reducing agents such as superplasticizers, set accelerating agents, set retarding agents, wetting agents, shrinkage control agents, viscosity modifying agents (thickeners), film-forming redispersible polymer powders, film-forming polymer dispersions, coloring agents, corrosion control agents, alkali-silica reaction reducing admixtures, discrete reinforcing fibers, and internal curing agents. Other additives may include fillers, such as one or more of sand, coarse aggregates, lightweight fillers, pozzolanic minerals, and mineral fillers.

All percentages in the specification are weight percents unless otherwise indicated (for example air percents are volume percents). All ratios in the specification are weight ratios unless otherwise indicated.

TABLE A-2 lists amounts of additives employed in compositions of the present invention. Each "Useable" range, "Preferred" range or "More Preferred" range of TABLE A-2 is individually a useable, preferred range or more preferred range for the invention. Thus, the useable ranges of components of TABLE A-2 would be used with the useable ranges of components of TABLE A and TABLE A-1. However, preferably any "Preferred" range can be independently substituted for a corresponding "Useable range". More preferably any "More Preferred range" can be independently substituted for a corresponding "Useable" range or a corresponding "Preferred range".

Some additives of TABLE A-2 are species of ingredients listed in TABLE A. For example, TABLE A lists Surface active organic polymer. Surface active organic polymer includes Bio-polymers, Organic Rheology Control Agents, and Film-forming polymer additives. Two species of Film-forming polymer additives are Film Forming Redispersible Polymer Powder and Film Forming Polymer Dispersion. Some of the additives of TABLE A-2 are ingredients in addition to those of TABLE A, for example pigments.

TABLE A-2

Additive Ingredient Amounts for Compositions of the Present Invention

| Ingredient* | Useable | Preferred | More preferred |
|---|---|---|---|
| Superplasticizer/Cementitious Reactive Powder Component A (weight %) | 0 to 4.0% | 0.25-2.5% | 0.50-1.5% |
| Fine Aggregate (Sand is a preferred fine aggregate)/Cementitious Reactive Powder Component A Ratio (by weight) | 0-5:1 | 0-4:1 | 1-3.5:1 |
| Inorganic Mineral Filler/Cementitious Reactive Powder Component A Ratio (by weight) | 0-2:1 | 0-1:1 | 0-0.5:1 |
| Organic Rheology Control Agent/Cementitious Reactive Powder Component A (weight %) | 0-0.50% | 0-0.25% | 0-0.15% |
| Inorganic Rheology Control Agent/Cementitious Reactive Powder Component A (weight %) | 0-3% | 0-2% | 0-1% |
| Coloring Pigments/Cementitious Reactive Powder Component A (weight %) | 0-5% | 0-2.5% | 0-1% |
| Efflorescence Suppression Agent/Cementitious Reactive Powder Component A (weight %) | 0-3% | 0-2% | 0-1% |
| Film Forming Redispersible Polymer Powder/Cementitious Reactive Powder Component A (weight %) | 0-20% | 0-10% | 0-5% |
| Film Forming Polymer Dispersion/Cementitious Reactive Powder Component A (weight % of active ingredient) | 0-20% | 0-10% | 0-5% |
| Lightweight Filler/Cementitious Reactive Powder Component A Ratio (by weight) | 0-2:1 | 0-1:1 | 0-0.75:1 |
| Coarse Aggregate/Cementitious Reactive Powder Component A Ratio (by weight) | 0-5.5:1 | 0-5:1 | 0-4.5:1 |
| Naturally-occurring or Non-thermally Activated Pozzolans/Cementitious Reactive Powder Component A Ratio (by weight) | 0-1:1 | 0-0.5:1 | 0-0.25:1 |

*The notation "ingredient/Cementitious Reactive Powder Component A (weight %)" in the present specification, unless otherwise specified, means amount of the ingredient equals the specified weight percent of the Cementitious Reactive Powder Component A. For example, a range of 0-4 wt % for superplasticizer means for 100 pounds of Cementitious Reactive Powder Component A there is additionally 0-4 pounds of superplasticizer.

Preferably there is at least 1 part by weight total fine and coarse aggregate per 1 part total weight of the cementitious reactive powder. More preferably there is 1 to 8 parts by weight total fine and coarse aggregate per 1 part total weight of the cementitious reactive powder.

TABLE B represents full density (preferably densities in the range of 100 to 160 pounds per cubic foot) formulations incorporating the compositions of TABLE A, A-1 and A-2 and specific amounts of the listed ingredients. These full density compositions employ the amounts of ingredients in TABLE A, TABLE A-1, and TABLE A-2 but replace the amounts of fine aggregate (sand) with the amount in TABLE B and have an absence of lightweight filler and coarse aggregate.

TABLE B

Amounts of Fine Aggregate (Sand) for full density compositions in the absence of coarse aggregate and lightweight filler

| Ingredient | Useable | Preferred | More preferred |
|---|---|---|---|
| Fine Aggregate (Sand)/Cementitious Reactive Powder Component A Ratio (by weight) | 0-5:1 | 0.50-4:1 | 0.75-3.5:1 |

TABLE C represents the amounts of sand and lightweight filler for lightweight density (preferably densities in the range of 10 to 125 pounds per cubic foot) compositions incorporating the compositions of TABLE A, TABLE A-1, and TABLE A-2. These lightweight compositions employ the amounts of ingredients in TABLE A, TABLE A-1, and TABLE A-2 but replace the amounts of sand and lightweight filler with the amounts in TABLE C and have an absence of coarse aggregate.

TABLE C

Amounts of Sand and lightweight filler for lightweight density compositions

| Ingredient | Useable | Preferred | More preferred |
|---|---|---|---|
| Fine Aggregate (Sand)/Cementitious Reactive Powder Component A Ratio (by weight) | 0-4:1 | 0-2:1 | 0-1.5:1 |
| Lightweight Filler/Cementitious Reactive Powder Component A Ratio (by weight) | 0-2:1 | 0.01-1:1 | 0.02-0.75:1 |

TABLE D represents lightweight or full density (preferably densities in the range of 40 to 160 pounds per cubic foot) formulations incorporating the composition of TABLE A, coarse aggregate and other ingredients. These compositions employ the amounts of ingredients in TABLE A, TABLE A-1, and TABLE A-2 but replace the amounts of fine aggregate (sand), lightweight filler and coarse aggregate with the amounts in TABLE D

TABLE D

Amounts for full or lightweight density compositions incorporating coarse aggregate

| Ingredient | Useable | Preferred | More preferred |
|---|---|---|---|
| Fine Aggregate (Sand)/Cementitious Reactive Powder Component A Ratio (by weight) | 0-5:1 | 0.50-4:1 | 1-3.5:1 |
| Lightweight Filler/Cementitious Reactive Powder Component A Ratio (by weight) | 0-2:1 | 0-1:1 | 0-0.50:1 |

TABLE D-continued

Amounts for full or lightweight density compositions incorporating coarse aggregate

| Ingredient | Useable | Preferred | More preferred |
|---|---|---|---|
| Coarse Aggregate/Cementitious Reactive Powder Component A Ratio (by weight) | 0.5-5.5:1 | 0.5-5:1 | 1-4.5:1 |

The following describes the individual categories of ingredients.

Cementitious Reactive Mixture

The cementitious reactive mixture of the present invention comprises Cementitious Reactive Powder Component A (also known herein as Cementitious Reactive Material or Cementitious Materials), Activator Component B, and Freeze-Thaw Durability Component C with ranges as shown in TABLE A.

Preferably, the cementitious reactive mixture contains about 10 to about 40 wt. % lime. However, this lime does not have to be added lime. Rather it is sometimes included as a chemical component of the thermally activated aluminosilicate mineral.

In addition to the thermally activated aluminosilicate mineral, calcium aluminate cement, and calcium sulfate, the cementitious reactive powder may include about 0 to about 15 wt. % of optional cementitious additives such as Portland cement. However, preferably there is an absence of Portland cement as its incorporation increases the material shrinkage making the material less dimensionally stable pozzolans other than thermally activated aluminosilicate mineral considered part of the cementitious reactive powder.

Cementitious Reactive Powder Component A (Also Known Herein as Cementitious Reactive Material or Cementitious Materials)

The Cementitious Reactive Powder Component A comprises thermally activated aluminosilicate mineral, at least one aluminate cement preferably selected from calcium aluminate cements and calcium sulfoaluminate cements, and at least one calcium sulfate. Optionally the Cementitious Reactive Powder Component A comprises other cements and/or non-thermally activated pozzolans.

The thermally activated aluminosilicate mineral is selected from at least one member of the group consisting of fly ash, blast furnace slag, thermally activated clays, shales, metakaolin, zeolites, marl red mud, ground rock, and ground clay bricks. Preferably, they have $Al_2O_3$ content greater than about 5% by weight. Preferably clay or marl is used after thermal activation by heat treatment at temperatures of from about 600° to about 850° C. The preferred thermally activated aluminosilicate minerals of compositions of the invention have high lime (CaO) content in the composition, preferably greater than about 10 wt %, more preferably greater than about 15%, and still more preferably greater than about 20%. The most preferred thermally activated aluminosilicate mineral is Class C fly ash, for example, fly ash procured from coal-fired power plants. The thermally activated aluminosilicate minerals also possess pozzolanic properties.

Thermally activated aluminosilicate minerals are aluminosilicate minerals that have undergone high temperature heat treatment. Preferably thermal activation occurs at a temperature in the range of 750-1500° C.

Fly ash is the preferred thermally activated aluminosilicate mineral in the cementitious reactive powder blend of some embodiments of the invention. Fly ashes containing high calcium oxide and calcium aluminate content, such as Class C fly ashes of ASTM C618 (2008) standard, are preferred as explained below.

Fly ash is a fine powder byproduct formed from the combustion of coal. Electric power plant utility boilers burning pulverized coal produce most commercially available fly ashes. These fly ashes consist mainly of glassy spherical particles as well as residues of hematite and magnetite, char, and some crystalline phases formed during cooling. The structure, composition and properties of fly ash particles depend upon the structure and composition of the coal and the combustion processes by which fly ash is formed. ASTM C618 (2008) standard recognizes two major classes of fly ashes for use in concrete—Class C and Class F. These two classes of fly ashes are generally derived from different kinds of coals that are a result of differences in the coal formation processes occurring over geological time periods. Class F fly ash is normally produced from burning anthracite or bituminous coal, whereas Class C fly ash is normally produced from lignite or sub-bituminous coal.

The ASTM C618 (2008) standard differentiates Class F and Class C fly ashes primarily according to their pozzolanic properties. Accordingly, in the ASTM C618 (2008) standard, the major specification difference between the Class F fly ash and Class C fly ash is the minimum limit of $SiO_2+Al_2O_3+Fe_2O_3$ in the composition. The minimum limit of $SiO_2+Al_2O_3+Fe_2O_3$ for Class F fly ash is 70% and for Class C fly ash is 50%. Thus, Class F fly ashes are more pozzolanic than the Class C fly ashes. Although not explicitly recognized in the ASTM C618 (2008) standard, Class C fly ashes preferably have high calcium oxide (lime) content.

Class C fly ash usually has cementitious properties in addition to pozzolanic properties due to free lime (calcium oxide). Class F is rarely cementitious when mixed with water alone. Presence of high calcium oxide content makes Class C fly ashes possess cementitious properties leading to the formation of calcium silicate and calcium aluminate hydrates when mixed with water.

The thermally activated aluminosilicate mineral comprises Class C fly ash, preferably, about 50 to about 100 parts Class C fly ash per 100 parts thermally activated aluminosilicate mineral, more preferably the thermally activated aluminosilicate mineral comprises about 75 parts to about 100 parts Class C fly ash per 100 parts thermally activated aluminosilicate mineral.

Other types of fly ash, such as Class F fly ash, may also be employed. Preferably, at least about 50 wt. % of the thermally activated aluminosilicate mineral in the cementitious reactive powder is Class C fly ash with the remainder Class F fly ash or any other thermally activated aluminosilicate mineral. More preferably, about 55 to about 75 wt. % of the thermally activated aluminosilicate mineral in the cementitious reactive powder is Class C fly ash with the remainder Class F or any other thermally activated aluminosilicate mineral. Preferably the thermally activated aluminosilicate mineral is about 90 to about 100% Class C fly ash, for example 100% Class C Fly ash.

The average particle size of the thermally activated aluminosilicate minerals of some embodiments of the invention is preferably less than about 100 microns, preferably less than about 50 microns, more preferably less than about 25 microns, and still more preferably less that about 15 microns.

Preferably the mixture composition of some embodiments of the invention has at most about 5 parts metakaolin per 100 parts thermally activated aluminosilicate mineral. Preferably, the compositions of the invention have an absence of metakaolin. Presence of metakaolin has been found to increase the water demand of the mixtures hence its use is not desirable in the geopolymer compositions of some embodiments of the invention.

Minerals often found in fly ash are quartz ($SiO_2$), mullite ($Al_2Si_2O_{13}$), gehlenite ($Ca_2Al_2SiO_7$), hematite ($Fe_2O_3$), magnetite ($Fe_3O_4$), among others. In addition, aluminum silicate polymorphs minerals commonly found in rocks such as sillimanite, kyanite and andalusite all three represented by molecular formula of $Al_2SiO_5$ are also often found in fly ash.

Fly ash can also include calcium sulfate or another source of sulfate ions which will be in the mixture composition of some embodiments of the invention.

The fineness of the fly ash is preferably such that less than about 34% is retained on a 325 mesh sieve (U.S. Series) as tested on ASTM Test Procedure C-311 (2011) ("Sampling and Testing Procedures for Fly Ash as Mineral Admixture for Portland Cement Concrete"). The average particle size of the fly ash materials of some embodiments of the invention is preferably less than about 50 microns, preferably less than about 35 microns, more preferably less than about 25 microns, and still more preferably less than about 15 microns. This fly ash is preferably recovered and used dry because of its self-setting nature.

Class C fly ash made from sub-bituminous coal has the following representative composition listed in TABLE E. This fly ash is preferably recovered and used dry because of its self-setting nature.

TABLE E

An example of suitable Class C fly ash

| Component | Proportion (wt. %) |
|---|---|
| $SiO_2$ | 20-45 |
| $Al_2O_2$ | 10-30 |
| $Fe_2O_3$ | 3-15 |
| MgO | 0.5-8 |
| $SO_3$ | 0.5-5 |
| CaO | 15-60 |
| $K_2O$ | 0.1-4 |
| $Na_2O$ | 0.5-6 |
| Loss on Ignition | 0-5 |

A preferable suitable Class F fly ash has the following composition listed in TABLE F.

TABLE F

An example of suitable Class F fly ash

| Component | Proportion (wt. %) |
|---|---|
| $SiO_2$ | 50-70 |
| $Al_2O_2$ | 10-40 |
| $Fe_2O_3$ | 1-10 |
| MgO | 0.5-3 |
| $SO_3$ | 0-4 |
| CaO | 0-10 |
| $K_2O$ | 0.1-4 |
| $Na_2O$ | 0.1-6 |
| Loss on Ignition | 0-5 |

Hydraulic Cements

Hydraulic cements for purposes of this invention is a cement that undergoes a chemical setting reaction when it comes in contact with water (hydration) and which will not only set (cure) under water but also forms a water-resistant product.

Hydraulic cements include, but are not limited to, aluminum silicate cements like Portland cement, calcium aluminate cement, calcium sulfoaluminate cement, calcium sulfoaluminoferrite cement, calcium sulfoferrite cement, calcium fluroaluminate cement, strontium aluminate cement, barium aluminate cement, Type-K expansive cement, Type S expansive cement, and sulfobelite cement. Compositions of invention may comprise one or more hydraulic cements added as part of cementitious reactive powder.

Calcium Aluminate Cements

Calcium aluminate cement (CAC) is a hydraulic cement that forms a component of the cementitious reactive powder blend of embodiments of the invention.

Calcium aluminate cement (CAC) is also commonly referred to as aluminous cement or high alumina cement. Calcium aluminate cements have a high alumina content, preferably about 30-45 wt %. Higher purity calcium aluminate cements are also commercially available in which the alumina content can range as high as about 80 wt %. These higher purity calcium aluminate cements tend to be relatively more expensive. The calcium aluminate cements for use in the invention are finely ground to facilitate entry of the aluminates into the aqueous phase so rapid formation of ettringite and other calcium aluminate hydrates can take place. The surface area of the calcium aluminate cement is preferably greater than about 3,000 $cm^2$/gram, more preferably 3000 to 8000 $cm^2$/gram, and further more preferably about 4,000 to 6,000 $cm^2$/gram as measured by the Blaine surface area method (ASTM C 204).

Several manufacturing methods have emerged to produce calcium aluminate cement worldwide. Typically, the main raw materials used in the manufacturing of calcium aluminate cement are bauxite and limestone. One manufacturing method used for producing calcium aluminate cement is described as follows. The bauxite ore is first crushed and dried, then ground along with limestone. The dry powder comprising of bauxite and limestone is then fed into a rotary kiln. A pulverized low-ash coal is used as fuel in the kiln. Reaction between bauxite and limestone takes place in the kiln and the molten product collects in the lower end of the kiln and pours into a trough set at the bottom. The molten clinker is quenched with water to form granulates of the clinker, which is then conveyed to a stock-pile. This granulate is then ground to the desired fineness to produce the final cement.

Several calcium aluminate compounds are formed during the manufacturing process of calcium aluminate cements. The predominant compound formed is monocalcium aluminate ($CaO.Al_2O_3$, also referred to as CA), in one type of calcium aluminate cement. In another type of calcium aluminate cement, $12CaO.7Al_2O_3$ also referred to as $C_{12}A_7$ or dodeca calcium hepta aluminate is formed as the primary calcium aluminate reactive phase. Other calcium aluminate and calcium silicate compounds formed in the production of calcium aluminate cements include $CaO.2Al_2O_3$ also known as $CA_2$ or calcium dialuminate, dicalcium silicate ($2CaO.SiO_2$, also known as $C_2S$), dicalcium alumina silicate ($2CaO.Al_2O_3.SiO_2$, also known as $C_2AS$). Several other compounds containing relatively high proportion of iron oxides are also formed. These include calcium ferrites such as $CaO.Fe_2O_3$ or CF and $2CaO.Fe_2O_3$ or $C_2F$, and calcium alumino-ferrites such as tetracalcium aluminoferrite ($4CaO.Al_2O_3.Fe_2O_3$ or $C_4AF$), $6CaO.Al_2O_3.2Fe_2O_3$ or $C_6AF_2$) and $6CaO.2Al_2O_3.Fe_2O_3$ or $C_6A_2F$). Other minor constituents present in the calcium aluminate cement include magnesia (MgO), titania ($TiO_2$), sulfates and alkalis. The preferred calcium aluminate cements can have one or more of the aforementioned phases. Calcium aluminate cements having monocalcium aluminate ($CaO.Al_2O_3$ or CA) and/or dodeca calcium hepta aluminate ($12CaO.7Al_2O_3$ or $C_{12}A_7$) as predominant phases are particularly preferred. Further, the calcium aluminate phases can be in crystalline form and/or amorphous form. CIMENT FONDU (or HAC FONFU), SECAR 51, and SECAR 71 are some examples of commercially available calcium aluminate cements that have the monocalcium aluminate (CA) as the primary cement phase. TERNAL EV is an example of commercially available calcium aluminate cement that has the dodeca calcium hepta aluminate ($12CaO.7Al_2O_3$ or $C_{12}A_7$) as the predominant cement phase.

Compositions of the invention comprise about 2 to 100 parts by weight calcium aluminate cement per 100 pbw of mixture of at least one of calcium sulfoaluminate cement and calcium aluminate cement.

When calcium aluminate cement is used in the present invention, it may be used with calcium sulfoaluminate cement or be used in the absence of calcium sulfoaluminate cement.

Compositions of the present invention using calcium aluminate cement (CAC) in the absence of calcium sulfoaluminate (CSA) cement comprise about 2 to about 100 parts, more preferably about 2.5 to about 80 parts, even more preferably about 5 to about 60 parts by weight (pbw) CAC per 100 pbw of thermally activated aluminosilicate mineral.

To provide a significant degree of dimensional stability and/or shrinkage control to prevent cracking, delamination and other modes of failure, the amount of calcium aluminate cement is preferably about 5 to about 75, more preferably about 10 to 50 parts by weight (pbw) per 100 pbw of a mixture of calcium sulfoaluminate cement and calcium aluminate cement.

Calcium Sulfoaluminate (CSA) Cements

Calcium sulfoaluminate (CSA) cements are a different class of cements from calcium aluminate cement (CAC) or calcium silicate based hydraulic cements, for example, Portland cement. CSA cements are hydraulic cements based on calcium sulphoaluminate. In contrast, calcium aluminates are the basis of CAC cement and calcium silicates are the basis of Portland cement. Calcium sulfoaluminate cements are made from clinkers that include Ye'elimite ($Ca_4(AlO_2)_6SO_4$ or $C_4A_3\check{S}$) as a primary phase. Other major phases present in the CSA may include one or more of the following: dicalcium silicate ($C_2S$), tetracalcium aluminoferrite ($C_4AF$), and calcium sulfate ($C\check{S}$). The relatively low lime requirement of calcium sulfoaluminate cements compared to Portland cement reduces energy consumption and emission of greenhouse gases from cement production. In fact, calcium sulfoaluminate cements can be manufactured at temperatures approximately 200° C. lower than Portland cement, thus further reducing energy and greenhouse gas emissions. The amount of calcium sulfoaluminate cement used in the compositions of some embodiments of the invention is adjustable based on the amount of active Ye'elimite phase ($Ca_4(AlO_2)_6SO_4$ or $C_4A_3\check{S}$) present in the CSA cement. The amount of Ye'elimite phase ($Ca_4(AlO_2)_6SO_4$ or $C_4A_3\check{S}$) present in the calcium sulfoaluminate cements useful in this invention is preferably about 20 to about 90 wt % and more preferably 30 to 75 wt %.

When calcium sulfoaluminate (CSA) cement is used in the present invention, it may be used with calcium aluminate cement or be used in the absence of calcium aluminate cement.

Preferably compositions of the present invention comprising the calcium sulfoaluminate cement and the calcium aluminate cement, have an amount of calcium aluminate cement of about 5 to about 75, more preferably about 10 to 50, most preferably about 30 to 45 parts by weight (pbw) per 100 pbw of total calcium sulfoaluminate cement and calcium aluminate cement.

The surface area of the calcium sulfoaluminate cement is preferably greater than about 3,000 $cm^2$/gram, more preferably 3000 to 8000 $cm^2$/gram, and further more preferably about 4,000 to 6,000 $cm^2$/gram as measured by the Blaine surface area method (ASTM C 204).

Compositions of the present invention using calcium sulfoaluminate (CSA) cement in the absence of calcium aluminate cement (CAC) comprise about 2 to about 100 parts, more preferably about 2.5 to about 80 parts, even more preferably about 5 to about 60 parts by weight (pbw) CSA per 100 pbw of thermally activated aluminosilicate mineral.

Calcium Fluoroaluminate Cement

The cementitious reactive powder of the invention may have about 0 to about 20 parts by weight total calcium fluoroaluminate relative to 100 parts by weight fly ash.

Calcium fluoroaluminate has the chemical formula $3CaO.3Al_2O_3.CaF_2$. The calcium fluoroaluminate is often produced by mixing lime, bauxite and fluorspar in such an amount that the mineral of the resulting product becomes $3CaO.3Al_2O_3.CaF_2$ and burning the resulting mixture at a temperature of about 1,200°-1,400° C. Calcium fluoroaluminate cements may optionally be used in the present invention.

Preferably compositions of the present invention have an absence of calcium fluoroaluminate cement.

Calcium Sulfate

Calcium sulfate forms an ingredient of the geopolymer compositions of some embodiments of the invention. Although calcium sulfate, e.g., calcium sulfate dihydrate will react with water, it does not form a water resistant product and it is not considered to be hydraulic cement for purposes of this invention. Calcium sulfate types that are useful of some embodiments of the invention include calcium sulfate dihydrate, calcium sulfate hemihydrate and anhydrous calcium sulfate (anhydrite). These calcium sulfates may be available naturally or produced industrially. Calcium sulfates synergistically interact with the other fundamental components of the cementitious compositions of some embodiments of the invention and thereby help to minimize material shrinkage while imparting other useful properties to the final material.

Different morphological forms of calcium sulfate can be usefully employed in the present invention. The properties of the geopolymer compositions and composites of some embodiments of the invention have been found to depend significantly on the type of calcium sulfate used based on its chemical composition, particle size, crystal morphology, and chemical and thermal treatment. Amongst other properties, the setting behavior, rate of strength development, ultimate compressive strength, shrinkage behavior, and cracking resistance of the geopolymer compositions of some embodiments of the invention can be tailored by selecting a proper source of calcium sulfate in the formulation. Thus, the selection of the type of calcium sulfate used of some embodiments of the invention is based on the balance of properties sought in the end application.

Particle size and morphology of calcium sulfate have been found to significantly influence the development of early age and ultimate strengths of the geopolymer cementitious compositions of some embodiments of the invention. In general, a smaller particle size of calcium sulfate has been found to provide a more rapid development in early age strength. When it is desirable to have an extremely rapid rate of strength development, the preferred average particle size of calcium sulfate ranges is about 1 to about 100 microns, more preferably about 1 to about 50 microns, and still more preferably about 1 to about 25 microns. Furthermore, calcium sulfates with finer particle size have also been found to result in lower material shrinkage of some embodiments.

All three forms of calcium sulfate (primarily hemihydrate, dihydrate and anhydrite) are useful. The most soluble form of calcium sulfate is the hemihydrate, followed by the relatively lower solubility form of the dihydrate, and then followed by the relatively insoluble form of the anhydrite. All three forms are themselves known to set (form matrices of the dihydrate chemical form) in aqueous media under appropriate conditions, and the setting times and compressive strengths of the set forms are known to follow their order of solubility. For example, all other things being equal, employed alone as the sole setting material, the hemihydrate usually has the shortest set times and the anhydrite the longest set times (typically very long set times).

However, compositions employing predominately or all calcium sulfate hemihydrate have the longest set times, while those employing predominately or all calcium sulfate anhydrite have the shortest set times. Also, compositions employing predominately or all calcium sulfate anhydrite have greater early age compressive strength (≤24 hour) than those employing the primarily dihydrate form. The compositions using primarily the hemihydrate form have early compressive strength similar to those using primarily the anhydrite form.

The particle size and morphology of calcium sulfate provides a significant and surprising influence on development of early age strength (less than about 24 hours) of the compositions. In such embodiments, the use of a relatively a small particle size calcium sulfate provides a more rapid development in early age compressive strength. In those embodiments, the preferred average particle size of calcium sulfate ranges from about 1 to 100 microns, more preferably from about 1 to 50 microns, and most preferably from about 1 to 25 microns.

The amount of calcium sulfate present in proportion to mixture of calcium sulfoaluminate cement and calcium aluminate cement in the composition can moderate potential adverse effects, such as shrinkage, of geopolymer compositions of the invention. The amount of calcium sulfate in geopolymer compositions of the invention is about 2 to about 100, preferably about 5 to about 75, and most preferably about 10 to about 50 parts by weight relative to 100 parts by weight of the mixture of calcium sulfoaluminate cement and calcium aluminate cement.

The calcium sulfate may be added as a separate component or all or part of the calcium sulfate may be provided as part of the calcium aluminate cement or calcium sulfoaluminate cement.

Portland Cement

The cementitious reactive powder of the invention may have about 0 to about 15 parts by weight total Portland cement relative to 100 parts by weight fly ash.

The low cost and widespread availability of the limestone, shales, and other naturally occurring materials make Portland cement one of the lowest-cost materials widely used over the last century throughout the world. As used herein, "Portland cement" is a calcium silicate based hydraulic cement. ASTM C 150 defines Portland cement as "hydraulic cement (cement that not only hardens by reacting with water but also forms a water-resistant product) produced by pulverizing clinkers consisting essentially of hydraulic calcium silicates, usually containing one or more of the forms of calcium sulfate as an interground addition." As used herein, "clinkers" are nodules (diameters, about 0.2-about 1.0 inch [5-25 mm]) of a sintered material that are produced when a raw mixture of predetermined composition is heated to high temperature.

Preferably there is an absence of Portland cement in compositions of the present invention. It has been found addition of Portland cement to the geopolymer compositions of the present invention increases the shrinkage of the resulting compositions. The magnitude of observed shrinkage increases with increase in the amount of Portland cement in the resulting compositions.

"Naturally-occurring and Non-thermally Activated" Pozzolans

The cementitious reactive powder of the invention may have about 0 to about 20 parts by weight total naturally-occurring and non-thermally activated pozzolans relative to 100 parts by weight fly ash.

Preferably there is an absence of naturally-occurring and non-thermally activated pozzolans in compositions of the present invention.

The above-discussed thermally activated aluminosilicate mineral additives have pozzolanic properties. However, in addition to the above-discussed fly ash, other pozzolans can also be included as optional silicate and aluminosilicate mineral additives in the compositions of the invention. ASTM C618 (2008) defines pozzolanic materials as "siliceous or siliceous and aluminous materials which in themselves possess little or no cementitious value, but will, in finely divided form and in the presence of moisture, chemically react with calcium hydroxide at ordinary temperatures to form compounds possessing cementitious properties."

Various natural and man-made materials have been referred to as pozzolanic materials possessing pozzolanic properties. Some examples of pozzolanic materials include silica fume, pumice, perlite, diatomaceous earth, finely ground clay, finely ground shale, finely ground slate, finely ground glass, volcanic tuff, trass, and rice husk. All of these pozzolanic materials can be used either singly or in combined form as part of the cementitious reactive powder of some embodiments of the invention.

Alkali Metal Chemical Activators Component B

The Activator Component B comprises alkali metal chemical activator.

In compositions of the invention, alkali metal salts and bases are useful as alkali metal chemical activators to activate the Reactive Powder Component A comprising thermally activated aluminosilicate mineral such as fly ash, aluminate cement, and calcium sulfate. The alkali metal activators in some embodiments of this invention can be added in liquid or solid form. The preferred alkali metal chemical activators of some embodiments of this invention are metal salts of organic acids. The more preferred alkali metal chemical activators of some embodiments of this invention are alkali metal salts of carboxylic acids. Alkali metal hydroxides and alkali metal silicates are some other examples of alkali metal chemical activator of some embodiments of this invention. Alternatively, alkali metal hydroxides and alkali metal silicates can also be used in combination with carboxylic acids such as citric acid to provide chemical activation of cementitious reactive powder blend comprising thermally activated aluminosilicate mineral, aluminate cement, and calcium sulfate. The preferred alkali metal citrates are potassium citrates and sodium citrates and particularly tri-potassium citrate monohydrate, and tri-sodium citrate anhydrous, tri-sodium citrate monohydrate, sodium citrate dibasic sesquihydrate, tri-sodium citrate dihydrate, di-sodium citrate, and mono-sodium citrate. Potassium citrate is the most preferred alkali metal salt activator in this invention.

Employing alkali metal salts of citric acid such as sodium or potassium citrate in combination with the cementitious reactive powder blend comprising thermally activated aluminosilicate mineral comprising Class C fly ash, aluminate cement, and calcium sulfate, provides mixture compositions with relatively good fluidity and which do not stiffen too quickly, after mixing the raw materials at about 68-77° F. (20-25° C.).

The amount of alkali metal salt of citric acid, e.g., potassium citrate or sodium citrate, is about 0.5 to about 10 wt. %, preferably about 1.0 to about 6 wt. %, preferably about 1.25 to about 4 wt. %, more preferably about 1.5 to about 2.5 wt. % and still more preferably about 2 wt % based on 100 parts of the cementitious reactive components (i.e., Cementitious Reactive Powder Component A). Thus, for example, for 100 pounds of cementitious reactive powder, there may be about 1.25 to about 4 total pounds of potassium and/or sodium citrates.

Preferably the activator does not contain an alkanolamine. Also, preferably the activator does not contain a phosphate.

Air and Water

Important factors that have been determined to affect the freeze-thaw durability behavior of the material include the air content of the material and the water/cementitious reactive powders ratio.

An important invention objective was to obtain a stable air-void system which is independent of mixing time employed. A stable system is defined as the one where the air content of the material does not vary significantly with change in the mixing time employed. A stable air-void system in turn provides satisfactory freeze-thaw durability performance.

Surprisingly a desired and stable amount of air in the geopolymer composition of the invention is entrained by means of utilizing a combination of various additives including air-entraining agents, defoamers and organic polymers. The other critical factors that affect the air content include the water to cementitious materials ratio, gravel to cementitious materials ratio, mixing time, and mixing methods.

To obtain freeze-thaw durability behavior in accordance to this invention, the air content is about 4% to 20% by volume, more preferably about 4% to 12% by volume, and the most preferably about 4% to 8% by volume.

Unexpectedly, the addition of 0.1 wt % of certain air entraining agents increases the air by close to 1% or more and the addition of 0.01 wt % of certain defoamers decreases the air by close to 1% or more.

The water/cementitious reactive powders ratio in the preferred compositions and embodiments of the invention is preferably 0.14 to 0.45, more preferably 0.16 to 0.35, and most preferably 0.18 to 0.25.

Freeze-Thaw Durability Component C

The Freeze-Thaw Durability Component C comprises an air-entraining agent and/or surface active organic polymer. The Freeze-Thaw Durability Component C may further comprise a defoaming agent.

Air Entraining Agent

Air entraining agents (also known as foaming agents) are added to the cementitious slurry of some embodiments of the invention to form air bubbles (foam) in situ. Air entraining agents are preferably surfactants used to purposely trap microscopic air bubbles in the concrete. Alternatively, air entraining agents are employed to externally produce foam which is introduced into the mixtures of the compositions of some embodiments of the invention during the mixing operation to reduce the density of the product. Preferably to externally produce foam the air entraining agent (also known as a liquid foaming agent), air and water are mixed to form foam in a suitable foam generating apparatus. A foam stabilizing agent such as polyvinyl alcohol can be added to the foam before the foam is added to the cementitious slurry.

Examples of air entraining/foaming agents include alkyl sulfonates, alkylbenzolfulfonates and alkyl ether sulfate oligomers among others. Details of the general formula for these foaming agents can be found in U.S. Pat. No. 5,643,510 incorporated herein by reference.

An air entraining agent (foaming agent) such as that conforming to standards as set forth in ASTM C 260 "Standard Specification for Air-Entraining Admixtures for Concrete" (Aug. 1, 2006) can be employed. Such air entraining agents are well known to those skilled in the art and are described in the Kosmatka et al "Design and Control of Concrete Mixtures," Fourteenth Edition, Portland Cement Association, specifically Chapter 8 entitled, "Air Entrained Concrete," (cited in US Patent Application Publication No. 2007/0079733 A1).

Suitable air entraining (foaming) agents include water soluble salts (usually sodium) of wood resin, vinsol resin, wood rosin, tall oil rosin, or gum rosin; non-ionic surfactants (e.g., such as those commercially available from BASF under the trade name TRITON X-100); sulfonated hydrocarbons; proteinaceous materials; or fatty acids (e.g., tall oil fatty acid) and their esters.

Commercially available air entraining materials include vinsol wood resins, sulfonated hydrocarbons, fatty and resinous acids, aliphatic substituted aryl sulfonates, such as sulfonated lignin salts and numerous other interfacially active materials which normally take the form of anionic or nonionic surface active agents (surfactants), sodium abietate, saturated or unsaturated fatty acids and salts thereof, tensides, alkyl-aryl-sulfonates, phenol ethoxylates, lignosulfonates, resin soaps, sodium hydroxystearate, lauryl sulfate, ABSs (alkylbenzenesulfonates), LASS (linear alkylbenzenesulfonates), alkanesulfonates, polyoxyethylene alkyl(phenyl)ethers, polyoxyethylene alkyl(phenyl)ether sulfate esters or salts thereof, polyoxyethylene alkyl(phenyl)ether phosphate esters or salts thereof, proteinic materials, alkenylsulfosuccinates, alpha-olefinsulfonates, a sodium salt of alpha olefin sulphonate, or sodium lauryl sulphate or sulphonate and mixtures thereof Air-entraining agent when present is in an amount of 0.01 to 1, preferably 0.01-0.5, more preferably 0.01-0.2, most preferably 0.05-0.2 weight % based upon the total weight of the Cementitious Reactive Powder Component A (i.e., weight % of total thermally activated aluminosilicate comprising Class C fly ash, aluminate cement, and calcium sulfate). Most preferred dosage of air entraining agent dosage equals about 0.01 to about 0.20 wt % of total Cementitious Reactive Powder Component A.

Defoaming Agents

Defoaming agents can be added to the geopolymer cementitious compositions of some embodiments of the invention to reduce the amount of entrapped air, increase material strength, increase material bond strength to other substrates, and to produce a defect free surface in applications where surface aesthetics is an important criteria. Examples of suitable defoaming agents useful in the geopolymer compositions of the invention include polyethylene oxides, propoxylated amines, polyetheramine, polyethylene glycol, polypropylene glycol, alkoxylates, polyalkoxylate, fatty alcohol alkoxylates, hydrophobic esters, tributyl phosphate, alkyl polyacrylates, silanes, silicones, polysiloxanes, polyether siloxanes, acetylenic diols, tetramethyl decynediol, secondary alcohol ethoxylates, silicone oil, hydrophobic silica, oils (mineral oil, vegetable oil, white oil), waxes (paraffin waxes, ester waxes, fatty alcohol waxes), amides, fatty acids, polyether derivatives of fatty acids, etc., and mixtures thereof.

Preferably the dosage of defoamer equals 0 to about 0.5 wt %, more preferably 0 to about 0.25 wt %, and most preferably 0.01 to about 0.1 wt % of total Cementitious Reactive Powder Component A (i.e., weight % of total thermally activated aluminosilicate comprising Class C fly ash, aluminate cement, and calcium sulfate).

Surface Active Organic Polymer

Surface active organic polymer includes any one or more Organic Rheology Modifiers (also known as Organic Rheology Control Agents), Film-forming polymers, or biopolymers. The Organic Rheology Modifiers could be biopolymers or come from synthetic sources. The Film-forming polymers could be Film Forming Redispersible Polymer Powder or the film forming polymer of a Film Forming Polymer Dispersion. Surface active organic polymers, as their secondary function, also help entrain air in the mixture but may not be as effective as compounds known as air entraining (foaming) agents.

Bio-polymers

Some of these biopolymers are also known as Thickeners or Viscosity Modifiers. Some also function as film forming polymers. Some, such as methyl cellulose also function as an emulsifier. Naturally occurring biopolymers comprise polysaccharide or amino acid building blocks, and are generally water-soluble. Common examples are starch, cellulose, alginate, egg yolk, agar, arrowroot, carrageenan, collagen, gelatin, guar gum, pectin and xanthan gum. Preferred Bio-polymers include cellulosic ethers and gum-based organic polymers.

Succinoglycans, diutan gum, guar gum, wellan gum, xanthan gums and cellulose ether based organic compounds, are bio-polymers that act as hydrocolloids and rheology control agents. Gum based polymers are selected from the group consisting of galactomannan gums, glucomannan gums, guar gum, locust bean gum, cara gum, hydroxyethyl guar, hydroxypropyl guar, cellulose, hydroxypropyl cellulose, hydroxymethyl cellulose, hydroxyethyl cellulose, and combinations thereof.

Examples of preferred cellulose based organic polymers useful for rheology control in the geopolymer compositions of the present invention include hydroxyethyl-cellulose (HEC), hydroxypropyl-cellulose (HPC), hydroxypropylmethyl-cellulose (HPMC), methyl-cellulose (MC), ethyl-cellulose (EC), methylethyl-cellulose (MEC), carboxymethyl-cellulose(CMC), carboxymethylethyl-cellulose (CMEC), and carboxymethylhydroxyethyl-cellulose (CMHEC).

The biopolymers mentioned above are typically soluble both in cold and/or hot water. These additives also act as water retention agents and thereby minimize material segregation and bleeding in addition to controlling the material rheology.

Organic Rheology Control Agents

As opposed to biopolymers which may be able to control or modify rheology, for purposes of the present specification, Organic Rheology Modifiers (Organic Rheology Control Agents) are defined as those coming from synthetic sources. Some of these Organic Rheology Control Agents are also known as Thickeners. Acrylic-based polymers for Organic Rheology Control Agents are grouped into three general classes: alkali-swellable (or soluble) emulsions (ASE's) hydrophobically modified alkali-swellable emulsions (HASE's) and hydrophobically modified, ethoxylated urethane resins (HEUR's). HASE's are modifications of ASE's following an addition of hydrophobic functional groups. These are commonly known as associative thickeners. In its simplest form, an associative thickener is a water-soluble polymer containing several relatively hydrophobic groups. HEUR's also belong to the category of associative thickeners. But unlike HASE's, HEUR's are nonionic substances and are not dependent on alkali for activation of the thickening mechanism.

Preferred polymers for use as Organic Rheology Control Agents and thickeners in the geopolymer compositions of some embodiments of the invention are selected from the group consisting of polyacryl amides, alkali-swellable acrylic polymers, associative acrylic polymers, acrylic/acrylamide copolymers, hydrophobically modified alkali-swellable polymers, and highly water-swellable organic polymers.

For example, ACULYN 22 rheology modifier is an anionic hydrophobically modified alkali-soluble acrylic polymer emulsion (HASE) available from Dow Chemical. HASE polymers are synthesized from an acid/acrylate copolymer backbone and a monomer that connects the hydrophobic groups as side chains. The polymer is made through emulsion polymerization. ACULYN 22 is synthesized from acrylic acid, acrylate esters and a steareth-20 methacrylate ester.

Both associative and non-associative types of organic rheology control agents and thickeners can be usefully employed in the geopolymer compositions of the invention.

The organic rheology control agents and thickeners mentioned above are soluble both in cold and/or hot water. These additives also act as water retention agents and thereby minimize material segregation and bleeding in addition to controlling the material rheology.

Film-forming Polymer Additives

Film forming polymers are polymers which produce a physical, continuous and flexible film. They are available as polymer dispersions or as redispersible powders. Preferred film forming polymer dispersions are latex dispersions. Preferred film forming redispersible polymer powders are latex powders. These polymer powders are water-redispersible and produced by spray-drying of aqueous polymer dispersions (latex). The polymer powders are typically made by spray drying latex dispersions (emulsions). In the field film forming redispersible polymer powders are preferred for ease of use.

Latex is an emulsion polymer. Latex is a water based polymer dispersion, widely used in industrial applications. Latex is a stable dispersion (colloidal emulsion) of polymer microparticles in an aqueous medium. Thus, it is a suspension/dispersion of rubber or plastic polymer microparticles in water. Latexes may be natural or synthetic.

The latex is preferably made from a pure acrylic, a styrene rubber, a styrene butadiene rubber, a styrene acrylic, a vinyl acrylic or an acrylated ethylene vinyl acetate copolymer, and is more preferably a pure acrylic. Preferably latex polymer is derived from at least one acrylic monomer selected from the group consisting of acrylic acid, acrylic acid esters, methacrylic acid, and methacrylic acid esters. For example, the monomers preferably employed in emulsion polymerization include such monomers as methyl acrylate, ethyl acrylate, methyl methacrylate, butyl acrylate, 2-ethyl hexyl acrylate, other acrylates, methacrylates and their blends, acrylic acid, methacrylic acid, styrene, vinyl toluene, vinyl acetate, vinyl esters of higher carboxylic acids than acetic acid, e.g. vinyl versatate, acrylonitrile, acrylamide, butadiene, ethylene, vinyl chloride and the like, and mixtures thereof. For example, a latex polymer can be a butyl acrylate/methyl methacrylate copolymer or a 2-ethylhexyl acrylate/methyl methacrylate copolymer. Preferably, the latex polymer is further derived from one or more monomers selected from the group consisting of styrene, alpha-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, ethylene, and C4-C8 conjugated dienes.

Vinyl acetate ethylene (VAE) emulsions are based on the copolymerization of vinyl acetate and ethylene, in which the vinyl acetate content can range between 60 and 95 percent, and the ethylene content ranges between 5 and 40 percent of the total formulation. This product should not be confused with the ethylene vinyl acetate (EVA) copolymers, in which the vinyl acetate generally ranges in composition from 10 to 40 percent, and ethylene can vary between 60 and 90 percent of the formulation. VAEs are water-based emulsions and these emulsions can be dried to form redispersible powders, whereas EVAs are solid materials used for hot-melt and plastic molding applications.

The film-forming polymer can be chosen from dispersions of polymer particles which may include: (meth)acrylics; vinyls; oil-modified polymers; polyesters; polyurethanes; polyamides; chlorinated polyolefins; and, mixtures or copolymers thereof, for example, vinyl acetate ethylene. Further, the polymers should typically have a glass transition temperature (Tg) of from −40° to 70° C. The Tg of a polymer is most commonly determined by differential scanning calorimetry (DSC). The Tg is the temperature at which there is a 'sudden' increase in the specific heat (Cp). This is manifested by a shift in the baseline of the DSC curve. The International Confederation of Thermal Analysis proposes an evaluation procedure to be used to determine the Tg. According to this procedure two regression lines R1 and R2 are applied to the DSC curve: the regression line before the event (R1) and the regression line at the inflection point (R2). These two lines define the glass transition temperature (Tg) as the intersection between R1 and R2. It should be noted that the values for the Tg obtained by DSC are dependent on the heating rate chosen during the experiment. Generally the heating rate used by DSC measurements is 5° C./min.

As preferred polymers may be mentioned: i) pure acrylate copolymers obtainable as the polymerization product of a plurality of acrylic monomers such as (meth)acrylic acid, (meth)acrylic monomers containing a hydroxyl group, (meth)acrylic acid esters and (meth)acrylonitrile; ii) styrene-acrylate copolymers obtainable as the polymerization product of a monomer mixture comprising styrene and/or substituted styrene in an amount of up to 100 wt. %, preferably of from 30 to 90 wt. % and more preferably of from 40 to 80 wt. %, based on total monomers, and one or more acrylic monomers, such as (meth)acrylic acid, (meth)acrylic monomers containing a hydroxyl group, (meth)acrylic acid esters and (meth)acrylonitrile; and, iii) ethylene vinyl acetate copolymers obtainable as the polymerization product of vinyl acetate, ethylene, and optionally other co-monomers.

The polymers can be prepared and used in bulk, powdered form: such powders would be re-dispersed in the water during the formation of the second component. ACRONAL S 430 P and ACRONAL S 695 P (BASF Aktiengesellschaft) are examples of a suitable commercial, re-dispersible styrene-acrylate copolymer powder.

In the alternative the polymers are directly provided as a dispersion in the water based medium, which dispersion is then mixed with additional water and other additives. Such dispersions may be provided using known commercial products such as: STYROPOR P555 (styrene homopolymer available from BASF Aktiengesellschaft); for styrene butadiene copolymers, LIPATON SB 3040, LIPATON SB 2740 (Polymer Latex GmBH), STYROLUX 684 D (BASF Aktiengesellschaft) and, SYNTHOMER 20W20 (Synthomer Chemie); SYNTHOMER VL 10286 and SYNTHOMER 9024 (styrene/butadiene/acrylonitrile terpolymer, Synthomer Chemie); for styrene acrylate copolymers, ALBERDINGK H 595, ALBERDINGK AS 6002 (both Alberdingk Boley), RHODOPAS DS 913 (Rhodia, now Solvay), ACRONAL 290D, ACRONAL S 400, ACRONAL DS 5011 (BASF Aktiengesellschaft), VINNAPAS SAF 54 (Wacker Polymer Systems), MOWILITH LDM 6159 (Celanese) and LIPATON AE 4620 (Polymer Latex GmBH); and, B60A (pure acrylate dispersion available from Rohm & Haas). Other exemplary commercially available latex polymers include: AIRFLEX EF811 (available from Air Products); EPS 2505 (available from EPS/CCA); and, NEOCAR 2300, NEOCAR 820 and NEOCAR 2535 (available from Dow Chemical Co.).

Alternatively, the aqueous dispersions may be provided by polymerizing appropriate monomer mixtures as will be described herein below. P. A. Lovell, M. S. El-Aasser (Editors), "Emulsion Polymerization and Emulsion Polymers", John Wiley and Sons, Chichester, UK, 1997 is herein incorporated by reference. The monomer mixture should generally comprise at least one unsaturated monomer selected from the group consisting of: (meth)acrylonitrile; alkyl (meth)acrylate esters; (meth)acrylic acids; vinyl esters; and, vinyl monomers.

Suitable alkyl esters of acrylic acid and methacrylic acid are those derived from C1 to C14 alcohols and thereby include as non-limiting examples: methyl (meth)acrylate; ethyl (meth)acrylate; isopropyl (meth)acrylate; butyl (meth)acrylate; isobutyl (meth)acrylate; n-pentyl (meth)acrylate; neopentyl (meth)acrylate; cyclohexyl (meth)acrylate; 2-hexyl (meth)acrylate; 2-ethylhexyl (meth)acrylate; isobornyl (meth)acrylate; 2-hydroxyethyl (meth)acrylate, 3-hydroxypropyl (meth)acrylate, 4-hydroxybutyl (meth)acrylate, and epsilon-caprolactone adducts thereof and, di(meth)acrylate esters of alkane diols such as 1,6-hexane diol diacrylate.

Suitable vinyl esters include vinyl acetate, vinyl propionate, vinyl versatate and vinyl laurate. Suitable vinyl comonomers include: ethylene; propene; butene; iso-butene; 1,3-butadiene; isoprene; styrene; alpha-methyl styrene; t-butyl styrene; vinyl toluene; divinyl benzene; heterocyclic vinyl compounds; and, vinyl halides such as chloroprene. Preferably the vinyl comonomers include ethylene, styrene, butadiene and isoprene.

The monomer mixture may comprise a carbonyl monomer that is a mono-olefinically unsaturated monomer having an aldehyde group or a ketone group. The mono-olefinic unsaturation in the carbonyl monomers of this invention is typically provided by (meth)acrylate, (meth)acrylamide, styryl or vinyl functionalities. Preferably the carbonyl monomer is selected from the group consisting of: acrolein; methacrolein; vinyl methyl ketone; vinyl ethyl ketone; vinyl isobutyl ketone; vinyl amyl ketone; acetoacetoxy esters of hydroxyalkyl (meth)acrylates; diacetoneacrylamide (DAAM); diacetone(meth)acrylamide; formyl styrol; diacetone (meth)acrylate; acetonyl acrylate; 2-hydroxypropyl acrylate-acetyl acetate; 1,4-butanediol acrylate acetylacetate; and, mixtures thereof Examples of suitable film forming homopolymers and copolymers are vinyl acetate homopolymers, copolymers of vinyl acetate with ethylene, copolymers of vinyl acetate with ethylene and one or more further vinyl esters, copolymers of vinyl acetate with ethylene and acrylic esters, copolymers of vinyl acetate with ethylene and vinyl chloride, styrene-acrylic ester copolymers, styrene-1,3-butadiene copolymers. Preference is given to vinyl acetate homopolymers; copolymers of vinyl acetate with from 1 to 40% by weight of ethylene; copolymers of vinyl acetate with from 1 to 40% by weight of ethylene and from 1 to 50% by weight of one or more further comonomers from the group consisting of vinyl esters having from 1 to 15 carbon atoms in the carboxylic acid radical, e.g. vinyl propionate, vinyl laurate, vinyl esters of alpha-branched carboxylic acids having from 9 to 13 carbon atoms; copolymers of vinyl acetate, from 1 to 40% by weight of ethylene and preferably 1 to 60% by weight of acrylic esters of unbranched or branched alcohols having from 1 to 15 carbon atoms, in particular n-butyl acrylate or 2-ethylhexyl acrylate; and copolymers comprising from 30 to 75% by weight of vinyl acetate, from 1 to 30% by weight of vinyl laurate or the vinyl ester of an alpha-branched carboxylic acid having from 9 to 13 carbon atoms, and from 1 to 30% by weight of acrylic esters of unbranched or branched alcohols having from 1 to 15 carbon atoms, in particular n-butyl acrylate or 2-ethylhexyl acrylate, and further comprising from 1 to 40% by weight of ethylene; copolymers comprising vinyl acetate, from 1 to 40% by weight of ethylene and from 1 to 60% by weight of vinyl chloride; where the polymers may further comprise the above-mentioned auxiliary monomers in the amounts specified and the percentages by weight in each case add up to 100% by weight.

Other Additives

In the invention, other additives not considered cementitious reactive powder may be incorporated into the slurry and overall geopolymeric cementitious composition. Such other additives, for example, superplasticizers (water reducing agents), set accelerating agents, set retarding agents, air-entraining agents, foaming agents, wetting agents, shrinkage control agents, viscosity modifying agents (thickeners), film-forming redispersible polymer powders, film-forming polymer dispersions, set control agents, efflorescence control (suppression) agents, coloring agents, corrosion control agents, alkali-silica reaction reducing admixtures, discrete reinforcing fibers, and internal curing agents. Other additives may include fillers, such as one or more of sand and/or other aggregates, lightweight fillers, mineral fillers, etc.

Superplasticizer

Superplasticizers (water reducing agents) are preferably used in the compositions of some embodiments of the invention. They may be added in the dry form or in the form of a solution. Superplasticizers help to reduce water demand of the mixture. Examples of superplasticizers include polynapthalene sulfonates, polyacrylates, polycarboxylates, polyether polycarboxylates, lignosulfonates, melamine sulfonates, caseins, and the like.

Preferably the superplasticizer is a carboxylated plasticizer material. Thus, superplasticizers based on polycarboxylate polyether chemistry are the most preferred water reducing chemical admixture of the geopolymeric cementitious compositions of some embodiments of the invention. Polycarboxylate polyether superplasticizers are the most preferred since they facilitate accomplishment of the various objectives of this invention as mentioned earlier.

Depending upon the type of superplasticizer used, the weight ratio of the superplasticizer (on dry powder basis) to the cementitious reactive powders preferably will be about 5 wt % or less, preferably about 2 wt. % or less, preferably about 0.1 to about 1 wt. %.

Fillers—Fine Aggregate, Coarse Aggregate, Inorganic Mineral Fillers and Lightweight Fillers One or more fillers such as fine aggregate, coarse aggregate, inorganic mineral fillers, and lightweight fillers may be used as a component in compositions of the invention. These fillers are not pozzolans or thermally activated aluminosilicate minerals.

Fine aggregates can be added to the geopolymer compositions in the invention without affecting the properties to increase the yield of the material. An example of fine aggregate is Sand. Sand is defined as an inorganic rock material with an average particle size of less than about 4.75 mm (0.195 inches). The sand used in this invention preferably meet the standard specifications of the ASTM C33 standard. Preferably the sand has a mean particle size of 0.1 mm to about 3 mm. More preferably the sand has a mean particle size of 0.2 mm to about 2 mm. Most preferably the sand has a mean particle size about 0.3 to about 1 mm. Examples of preferable fine sand used in some embodiments of this invention include QUIKRETE FINE No. 1961 and UNIMIN 5030 having a predominant size range of US sieve number #70-#30 (0.2-0.6 mm). The fine aggregate used in this invention meet the ASTM C33 standard performance.

Inorganic mineral fillers are dolomite, limestone, calcium carbonate, ground clay, shale, slate, mica and talc. Generally they have a fine particle size with preferably average particle diameter of less than about 100 microns, preferably less than about 50 microns, and more preferably less than about 25 microns in the compositions of some embodiments of the invention. Smectite clays and palygorskite and their mixtures are not considered inorganic mineral fillers in this invention.

Coarse aggregates can be added to the geopolymer compositions without it affecting any of the properties to increase the yield of the material. Coarse aggregate is defined as an inorganic rock material with an average particle size at least 4.75 mm (0.195 inches), for example ¼" to 1½ in." (0.64 to 3.81 cm). Aggregate with size larger than 1½" (3.81 cm) may also be used in some applications for example concrete pavement. The particle shape and texture of the coarse aggregate used can be angular, rough-textured, elongated, rounded or smooth or a combination of these. Preferably coarse aggregate are made of minerals such as granite, basalt, quartz, riolite, andesite, tuff, pumice, limestone, dolomite, sandstone, marble, chert, flint, greywacke, slate, and/or gneiss. Coarse aggregate useful in some embodiments of the invention as listed in TABLE A-2 and D meets specifications set out in ASTM C33 (2011) and AASHTO M6/M80 (2008) standards. Gravel is a typical coarse aggregate.

Lightweight fillers have a specific gravity of less than about 1.5, preferably less than about 1, more preferably less than about 0.75, and still more preferably less than about 0.5. In some other preferred embodiments of the invention the specific gravity of lightweight fillers is less than about 0.3, more preferably less than about 0.2 and most preferably less than about 0.1. In contrast, inorganic mineral filler preferably has a specific gravity above about 2.0. Examples of useful lightweight fillers include pumice, vermiculite, expanded forms of clay, shale, slate and perlite, scoria, expanded slag, cinders, glass microspheres, synthetic ceramic microspheres, hollow ceramic microspheres, lightweight polystyrene beads, plastic hollow microspheres, expanded plastic beads, and the like. Expanded plastic beads and hollow plastic spheres when used in the composition of some embodiments of the invention are employed in very small quantity on a weight basis owing to their extremely low specific gravity.

When lightweight fillers are utilized to reduce the weight of the material, they may be employed at filler to cementitious materials (reactive powder) ratio of about 0 to about 2, preferably about 0.01 to about 1, preferably about 0.02 to about 0.75. One or more types of lightweight fillers may be employed in the geopolymer compositions of the invention.

Yield is defined as the total volume of slurry in cubic feet, obtained from 50 pounds of dry material consisting of cementitious materials and additives (i.e., 50 pounds mixture of cementitious materials and additives), when mixed with fine aggregate (when present), coarse aggregate (when present), lightweight filler (when present), inorganic mineral filler (when present) and water.

For the full density compositions of the present invention, the yield of 50 pounds of dry material consisting of cementitious materials and additives, when mixed with fine aggregate, coarse aggregate, and water is preferably greater than 0.75 cubic feet, more preferably greater than 1.5 cubic feet, even more preferably greater than 2.0 cubic feet, and most preferably greater than 2.5 cubic feet.

When lightweight fillers are employed as part of the composition, the yield of 50 pounds of dry material consisting of cementitious materials and additives, when mixed with fine aggregate (when present), coarse aggregate (when present), lightweight filler and water is preferably greater than 3 cubic feet, more preferably greater than 4.5 cubic feet, even more preferably greater than 6 cubic feet, and most preferably greater than 7.5 cubic feet.

Compositions of the present invention may be free of added fillers.

Inorganic Rheology Control Agents

The geopolymer cementitious compositions of some embodiments of the invention may also include inorganic rheology control agents belonging to the family of phyllosilicates. Examples of inorganic rheology control agents particularly useful in the geopolymer compositions of invention include palygorskite, sepiolite, smectites, kaolinites, and illite. Particularly useful smectite clays in some embodiments of the present invention include hectorite, saponite, and montmorillonite. Different varieties of bentonite clays both natural and chemically treated may also be used to control rheology of the compositions of the present invention. These additives also act as water retention agents and thereby minimize material segregation and bleeding. The inorganic rheology control agents may be added in the absence of or in combination with the organic rheology control agents in some embodiments of the present invention.

Efflorescence Suppression Agent

Water repelling agents such as silanes, silicones, siloxanes, stearates are added to the cementitious compositions of some embodiments of the invention to reduce efflorescence potential of the material. Selected examples of useful efflorescence suppression agents include octyltriethoxy silane, potassium methyl siliconate, calcium stearate, butyl stearate, polymer stearates. These efflorescence control agents reduce the transport of the water within the hardened material and thereby minimize migration of salts and other soluble chemicals that can potentially cause efflorescence. Excessive efflorescence can lead to poor aesthetics, material disruption and damage from expansive reactions occurring due to salt accumulation and salt hydration, and reduction in bond strength with other substrates and surface coatings.

Set Retarders

Organic compounds such as hydroxylated carboxylic acids, carbohydrates, sugars, and starches are the preferred retarders of the invention. Organic acids such as citric acid, tartaric acid, malic acid, gluconic acid, succinic acid, glycolic acid, malonic acid, butyric acid, malic acid, fumaric acid, formic acid, glutamic acid, pentanoic acid, glutaric acid, gluconic acid, tartronic acid, mucic acid, tridydroxy benzoic acid, etc. are useful as set retarders in the dimensionally stable geopolymer cementitious compositions of some embodiments of the invention. Sodium gluconate is also useful as an organic set retarder in some embodiments of in the present invention.

Preferably inorganic acid based retarders of the type borates or boric acid are not employed in compositions of the present invention because they have been found to hinder mix rheology, cause excessive efflorescence, and reduce material bond strength to other substrates.

Other Optional Set-Control Agents

Other optional set control chemical additives include a sodium carbonate, potassium carbonate, calcium nitrate, calcium nitrite, calcium formate, calcium acetate, calcium chloride, lithium carbonate, lithium nitrate, lithium nitrite, aluminum sulfate, sodium aluminate, alkanolamines, polyphosphates, and the like. These additives when included as a part of the formulation may also influence rheology of the geopolymer compositions of some embodiments of the invention in addition to affecting their setting behavior.

Optional Materials, Fibers, and Scrims

Other optional materials and additives may be included in geopolymer compositions of some embodiments of the invention. These include at least one member selected from the group consisting of corrosion control agents, wetting agents, colorants and/or pigments, discrete fibers, long and continuous fibers and reinforcement, textile reinforcement, polyvinyl alcohol fibers, glass fibers, and/or other discrete reinforcing fibers.

Discrete reinforcing fibers of different types may also be included in the geopolymer compositions of some embodiments of the invention. Scrims made of materials such as polymer-coated glass fibers and polymeric materials such as polypropylene, polyethylene and nylon can be used to reinforce the cement-based precast products depending upon their function and application.

Preferably the geopolymer compositions of the invention have an absence of cement kiln dust. Cement kiln dust (CKD) is created in the kiln during the production of cement clinker. The dust is a particulate mixture of partially calcined and unreacted raw feed, clinker dust and ash, enriched with alkali sulfates, halides and other volatiles. These particulates are captured by the exhaust gases and collected in particulate matter control devices such as cyclones, baghouses and electrostatic precipitators. CKD consists primarily of calcium carbonate and silicon dioxide which is similar to the cement kiln raw feed, but the amount of alkalies, chloride and sulfate is usually considerably higher in the dust. CKD from three different types of operations: long-wet, long-dry, and alkali by-pass with precalcined have various chemical and physical traits. CKD generated from long-wet and long-dry kilns is composed of partially calcined kiln feed fines enriched with alkali sulfates and chlorides. The dust collected from the alkali by-pass of pre-calcined kilns tends to be coarser, more calcined, and also concentrated with alkali volatiles. However, the alkali by-pass process contains the highest amount by weight of calcium oxide and lowest loss on ignition (LOI). TABLE AA from Adaska et al., *Beneficial Uses of Cement Kiln Dust,* presented at 2008 IEEE/PCA 50th Cement Industry Technical Conf., Miami, Fla., May 19-22, 2008, provides the composition breakdown for the three different types of operation and includes a preferably chemical composition for Type I Portland cement for comparison.

TABLE G

Composition of CKD from Different Operation Sources

| Constituent | Long-wet kiln (% by weight) | Long-dry kiln (% by weight) | Alkali by-pass from preheater/ precalciner (% by weight) | Preferably Type I Portland cement (% by weight) |
|---|---|---|---|---|
| $SiO_2$ | 15.02 | 9.64 | 15.23 | 20.5 |
| $Al_2O_3$ | 3.85 | 3.39 | 3.07 | 5.4 |
| $Fe_2O_3$ | 1.88 | 1.10 | 2.00 | 2.6 |
| CaO | 41.01 | 44.91 | 61.28 | 63.9 |
| MgO | 1.47 | 1.29 | 2.13 | 2.1 |
| $SO_3$ | 6.27 | 6.74 | 8.67 | 3.0 |
| $K_2O$ | 2.57 | 2.40 | 2.51 | <1 |
| Loss on Ignition (LOI) | 25.78 | 30.24 | 4.48 | 0-3 |
| Free lime (CaO) | 0.85 | 0.52 | 27.18 | <2 |

Preferably the compositions of the invention have an absence of the following organic particles: coffee grounds particles, leaf powder particles, starch particles, ground leaf particles, and cork powder.

Properties of the Compositions of the Invention

Preferably the compositions of the present invention have compressive strengths after 300 freeze-thaw cycles of greater than 6000 psi, more preferably the compressive strengths are greater than 8000 psi and most preferably greater than 10000 psi.

The compositions of the present invention have little or no loss in mechanical performance and durability, as demonstrated per ASTM C666/C66M-15 by the measured parameter relative dynamic modulus, for up to 300 freeze-thaw cycles, preferably up to 600 freeze-thaw cycles, more preferably up to 900 freeze-thaw cycles, and most preferably up to 1200 freeze-thaw cycles.

Compositions of the present invention have freeze-thaw durability performance per ASTM C666/C66M-15 as indicated by relative dynamic modulus after a number of freeze-thaw cycles. In particular, for at least 300 freeze-thaw cycles, preferably at least 600 freeze-thaw cycles, more preferably at least 900 freeze-thaw cycles, most preferably at least 1200 freeze-thaw cycles the relative dynamic modulus greater than 80% for the above freeze-thaw cycles (e.g., the relative dynamic modulus greater than 80% for at least 300 cycles), preferably greater than 85% for the above freeze-thaw cycles, more preferably greater than 90% for the above freeze-thaw cycles, furthermore preferably greater than 95% for the above freeze-thaw cycles, and most preferably greater than 95% for the above freeze-thaw cycles.

The initial dynamic elastic modulus (prior to initiation of freeze-thaw cycles) and dynamic elastic modulus after 300 freeze-thaw cycles is preferably greater than 20 GPa, more preferably greater than 25 GPa, and most preferably greater than 30 GPa.

The relative dynamic modulus after 300 freeze-thaw cycles for the preferred embodiments of the invention is equal or greater than 100.

Also, the compositions of the invention achieve a desirable Durability Factor as explained above, wherein the composition has a Durability Factor (DF) measured according to ASTM C666/C666m-15 greater than 85%, preferably greater than 90%, more preferably greater than 95%, and most preferably equal or greater than 100% for 300 freeze-thaw cycles.

The long term free drying shrinkage of certain preferred embodiments of the invention typically is less than about 0.3%, preferably less than about 0.2%, and more preferably less than about 0.1%, and most preferably less than about 0.05% (measured after initial set).

The invention also exhibits an unexpected rate of early age strength development. For example, preferably their 2-hour compressive strength may exceed about 1500 psi, more preferably exceeding about 2000 psi, most preferably exceeding about 2500 psi. Their 4-hour compressive strength development may exceed about 4000 psi, more preferably exceeding about 5000 psi, and most preferably exceeding about 6000 psi. The 24-hour compressive strength may exceed about 6000 psi, more preferably exceeding about 7000 psi, and most preferably exceeding about 9000 psi. The 7-day compressive strength may exceed about 8000 psi, more preferably exceeding about 9000 psi, and most preferably exceeding about 10000 psi. The 28-day compressive strength may exceed about 10000 psi, more preferably exceeding about 11000 psi, and most preferably exceeding about 13000 psi.

Preferably the freeze-thaw durable geopolymer compositions of this invention have very rapid setting behavior. The final setting time for a rapid setting geopolymer composition is preferably between 10 to 60 minutes, more preferably between 15 to 40 minutes, and most preferably between 20 to 30 minutes.

The compositions of the present invention have superior salt-scaling resistance per ASTM C672/C672M-12 Standard Test Method for Scaling Resistance of Concrete Surfaces Exposed to Deicing Chemicals, ASTM, published 2012. When tested according to this ASTM C672/C672M-12 salt scaling test the compositions have as indicated by weight loss less than 1% after 25 freeze-thaw cycles, more preferably after 50 freeze-thaw cycles, and most preferably after 75 freeze-thaw cycles when subjected to solutions of sodium chloride and solutions of calcium chloride.

While separately discussed above, each of the preferred geopolymeric compositions and mixtures of the invention has at least one, and can have a combination of two or more of the above mentioned distinctive advantages (as well as those apparent from the further discussion, examples and data herein) relative to prior art geopolymeric cementitious compositions.

The embodiments of the invention are highly environmentally sustainable, utilizing fly ash—a post industrial waste as a primary raw material source. This significantly reduces the life cycle carbon footprint and the life cycle embodied energy of the manufactured product.

Uses of Composition of the Invention

The compositions of the invention have many uses. They can be used where other cementitious materials are used, particularly applications where freeze-thaw stability and compressive strength are important or necessary. For example, in various concrete product applications including structural concrete panels for floors, slabs, and walls, wall and floor underlayment for installation of floor-finish materials such as ceramic tiles, natural stones, vinyl tiles, vinyl composition tiles (VCTs), and carpet, highway overlays and bridge repair, sidewalks and other slabs-on-ground, repair materials for wall, floors and ceiling bonding mortars, plasters, surfacing materials, roofing materials, exterior stucco and finish plasters, self-leveling topping and capping underlayments, guniting and shotcrete which are sprayed products for stabilization of earth and rocks in foundations, mountain slopes and mines, patching repair mortars for filling and smoothing cracks, holes and other uneven surfaces, statuary and murals for interior and exterior applications, as well as pavement materials for roads, bridge decks and other traffic and weight bearing surfaces.

Other examples include uses for precast concrete articles, as well as building products such as cementitious boards, masonry blocks, bricks, and pavers with excellent moisture durability. In some applications, such precast concrete products such as cement boards are preferably made under conditions which provide setting times appropriate for pouring into a stationary or moving form or over a continuously moving belt.

The geopolymer compositions of some embodiments of the invention can be used with different fillers and additives including foaming agents and air entraining agents for adding air in specific proportions to make lightweight cementitious products, including precast construction elements, construction repair products, traffic bearing structures such as road compositions with good expansion properties and no shrinkage.

A most preferred use of the composition is for road patching to repair a pavement or road defect. Typical defects are potholes, sinkholes, or cracks. When used as road patch the slurry is placed into the pavement or road defect and cures to form a patch having good freeze-thaw resistance. Thus, it resists cracking when exposed to multiple freeze-thaw cycles where temperature cycles below 32° F. (freeze) and above 32° F. (thaw).

EXAMPLES

The following examples investigated the performance of the geopolymeric formulations comprising cementitious compositions fly ash, calcium sulfoaluminate cement, calcium aluminate cement, and calcium sulfates. The mixes were activated with potassium citrate and contained varying amounts of sand or varying amounts of sand and aggregate. All mixtures contained calcium sulfoaluminate cement and/or calcium aluminate cements. All mixes contained at least one of the three different types of calcium sulfates: calcium sulfate dihydrate, calcium sulfate hemihydrate, and anhydrous calcium sulfate (anhydrite).

The compressive strengths in these examples, unless otherwise specified, were measured according to ASTM C109—Standard Test Method for Compressive Strength of Hydraulic Cement Mortars (Using 2-in. or [50-mm] Cube Specimens).

Unless otherwise indicated, freeze-thaw durability performance of all the geopolymeric cementitious compositions of the examples in the present specification were tested based on ASTM C666/C 666M-15—Procedure A—Standard Test Method for Resistance of Concrete to Rapid Freezing and Thawing, published 2015.

Unless otherwise indicated, a high shear mixer was employed for the mixes of the following examples and the mixing time was 4 minutes.

Unless otherwise indicated, the mixes of the examples were activated with potassium citrate.

The superplasticizer used for the examples of this specification was BASF CASTAMENT FS 20 polymerization product based on polyethylene glycol. EP 2598457 describes it as an anionic dispersant. EP 2616407 describes it as a polyether polycarboxylate.

The rheology modifier used for the examples of this specification was MOMENTIVE AXILAT RH 100 XP which is Succinoglycan. This is an exopolysaccharide biopolymer. Exopolysaccharides are high-molecular-weight polymers composed of sugar residues and are secreted by a microorganism into the surrounding environment.

The organic polymer (which is a species of a film forming surface active polymer) used for the examples of this specification was BASF ACRONAL S 695 P. BASF ACRONAL S 695 P is a re-dispersible polymer powder mainly used to modify inorganic binders. In the tables of compositions for the examples it is listed as "Polymer". It is a copolymer of butyl acrylate and styrene in powder form. US published patent app. no. 2004/0259022, para. [0126] discloses ACRONAL S 695 P is a styrene/butyl acrylate (meth)acrylamide emulsion copolymer available from BASF.

Unless otherwise indicated, the defoamer was SURFYNOL 500S from Air Products. Unless otherwise indicated, the air-entraining agent was VINSOL NVX resin from Pinova.

In all of the examples, unless otherwise indicated, the fly ash was Class C Fly Ash from Campbell Power Plant, West Olive, Mich. This fly ash had an average particle size of about 4 microns. The measured Blaine fineness of the fly ash was about 4300 cm$^2$/g. The oxide composition of the Class C fly ash used in these examples is shown in TABLE L.

Unless otherwise indicated, the calcium aluminate cement used in the examples of this invention was TERNAL EV available from Kerneos Inc. This cement had a mean particle size of about 29 microns. The oxide composition of TERNAL EV is shown in TABLE L. The main calcium aluminate phase in TERNAL EV is dodecacalcium. hepta-aluminate (12CaO.7Al$_2$O$_3$ or C$_{12}$A$_7$).

Unless otherwise indicated, the calcium sulfoaluminate cement used in the examples of this invention was FASTROCK 500 available from the CTS Company. This cement had a mean particle size of about 11 microns. The oxide composition of FASTROCK 500 is shown in TABLE L.

Unless otherwise indicated, the calcium sulfate used in the examples was calcium sulfate hemihydrate commercially available with the trade name USG HYDROCAL C-Base available from United States Gypsum Company. HYDROCAL C-Base is an alpha morphological form of calcium sulfate hemihydrate having blocky crystal microstructure and lower water demand. The USG HYDROCAL C-Base had a mean particle size of about 17 microns.

The anhydrous calcium sulfate (anhydrite) included in some of the examples was SNOW WHITE filler available from United States Gypsum Company. The USG SNOW WHITE filler is an insoluble form of anhydrite produced by high temperature thermal treatment of calcium sulfate; preferably gypsum. It has a very low level of chemically combined moisture, preferably around 0.35%. The mean particle size of the USG SNOW WHITE filler is about 7 microns.

The calcium sulfate dihydrate employed in the examples was USG TERRA ALBA, a fine-grained calcium sulfate dihydrate available from United States Gypsum Company. The mean particle size of USG TERRA ALBA is about 13 microns.

In Examples 2-26, unless otherwise indicated calcium sulfoaluminate cement and calcium aluminate cement were added at 20 wt % and 15 wt % of the fly ash, respectively. Calcium sulfate hemihydrate was added at an amount of 50 wt % of the weight of calcium sulfoaluminate and calcium aluminate cements and 17.5 wt % of the fly ash in the mixture compositions investigated. Thus, for example, for 100 parts by weight fly ash there are 20 parts by weight calcium sulfoaluminate cement for a total of 120 parts by weight.

Two different sands (fine aggregate) were used in these examples—Sand A and Sand B. Sand A used was Unimin GRANUSIL 5030. Sand B used was Hamilton Builders' Supply Concrete Sand. The particle size analysis of Sand A and Sand B is shown in TABLES H and I respectively. Sand B was significantly coarser than Sand A. The chemical analysis of these sands is shown in TABLE J.

TABLE H

Typical Mean % Retained on Individual Sieves

| ASTM (Mesh #) | Microns | SAND A |
|---|---|---|
| 12 | 1.70 mm | — |
| 18 | 1.00 mm | — |
| 20 | 850 | — |
| 30 | 600 | 1.3 |
| 40 | 425 | 10.4 |
| 50 | 300 | 24.3 |
| 70 | 212 | 33.6 |
| 100 | 150 | 22.9 |
| 140 | 106 | 6.4 |
| 200 | 75 | 1.0 |
| 270 | 53 | 0.1 |
| PAN | PAN | — |

TABLE I

Typical Mean % Retained on Individual Sieves

| ASTM (Mesh #) | Microns | SAND B |
|---|---|---|
| 4 | 4.75 mm | 1.73 |
| 8 | 2.36 mm | 7.15 |
| 16 | 1.18 mm | 10.16 |
| 20 | 850 | 8.51 |
| 30 | 600 | 12.79 |
| 40 | 425 | 17.00 |
| 50 | 300 | 16.36 |
| 70 | 212 | 12.03 |
| 100 | 150 | 7.42 |
| 140 | 106 | 2.96 |
| 200 | 75 | 1.68 |
| 270 | 53 | 0.92 |
| PAN | PAN | 1.31 |

TABLE J

Chemical Analysis - Mean % by Weight

| Oxide | SAND A | SAND B |
|---|---|---|
| Silicon Dioxide ($SiO_2$) | 99.80 | 42.95 |
| Iron Oxide ($Fe_2O_3$) | 0.02 | 1.73 |
| Aluminum Oxide ($Al_2O_3$) | 0.08 | 5.54 |
| Calcium Oxide (CaO) | TR | 19.73 |
| Titanium Dioxide ($TiO_2$) | 0.01 | 0.30 |
| Magnesium Oxide (MgO) | TR | 5.90 |
| Potassium Oxide ($K_2O$) | 0.05 | 1.16 |
| Sodium Oxide ($Na_2O$) | 0.01 | 0.88 |
| Phosphorus Pentoxide ($P_2O_5$) | — | 0.07 |
| Loss on Ignition (L.O.I.) | 0.02 | 21.74 |

Two different gravels were used in these examples, Gravel A and Gravel B. Gravel A used was Quickrete® All Purpose Gravel. Gravel B used was Hamilton Builders' Supply Pea Gravel. The particle size analysis of both the Gravels A and B are mentioned in TABLE J. The chemical analysis of both the Gravels A and B are mentioned in TABLE K.

TABLE J

Typical Mean % Retained on Individual Sieves

| ASTM Sieve Size (Mesh #) | Sieve Size (mm) | GRAVEL A | GRAVEL B |
|---|---|---|---|
| 1.05" | 26.7 | — | — |
| ¾" | 19.1 | — | — |
| ½" | 12.5 | — | — |
| ⅜" | 9.5 | 0.3 | 28.4 |
| ¼" | 6.3 | 28.6 | 55.8 |
| 4 | 4.75 | 31.7 | 14.8 |
| 8 | 2.36 | 37.9 | 0.9 |
| 16 | 1.18 | 1.0 | 0.0 |
| PAN | PAN | 0.5 | 0.1 |

TABLE K

Chemical Analysis - Mean % by Weight

| Oxide | GRAVEL A | GRAVEL B |
|---|---|---|
| Silicon Dioxide ($SiO_2$) | 21.86 | 23.58 |
| Iron Oxide ($Fe_2O_3$) | 2.23 | 1.64 |
| Aluminum Oxide ($Al_2O_3$) | 2.26 | 4.16 |
| Calcium Oxide (CaO) | 23.10 | 24.59 |
| Magnesium Oxide (MgO) | 15.25 | 12.68 |
| Potassium Oxide ($K_2O$) | 0.63 | 0.72 |
| Sodium Oxide ($Na_2O$) | 0.19 | 0.49 |
| Sulfur Trioxide ($SO_3$) | 0.01 | — |
| Phosphorus Pentoxide ($P_2O_5$) | 0.11 | 0.06 |
| Manganese(II) oxide (MnO) | 0.06 | — |
| Titanium Dioxide ($TiO_2$) | — | 0.26 |
| Loss on Ignition (L.O.I.) | 34.30 | 31.82 |

TABLE L shows the chemical analysis of Class C fly ash (Campbell Power Plant, West Olive, Mich.), calcium sulfoaluminate cement (CTS FASTROCK 500) and calcium aluminate cement (Kerneos TERNAL EV) used in the examples.

TABLE L

Chemical Analysis - Mean % by Weight

| Oxide | Fly Ash | Calcium Sulfoaluminate Cement | Calcium Aluminate Cement |
|---|---|---|---|
| Silicon Dioxide ($SiO_2$) | 40.37 | 14.29 | 4.41 |
| Iron Oxide ($Fe_2O_3$) | 6.27 | 1.10 | 6.51 |
| Aluminum Oxide ($Al_2O_3$) | 19.38 | 26.21 | 36.72 |
| Calcium Oxide (CaO) | 23.19 | 45.45 | 48.44 |

TABLE L-continued

Chemical Analysis - Mean % by Weight

| Oxide | Fly Ash | Calcium Sulfoaluminate Cement | Calcium Aluminate Cement |
|---|---|---|---|
| Magnesium Oxide (MgO) | 5.02 | 2.71 | 0.48 |
| Potassium Oxide ($K_2O$) | 0.69 | 0.41 | 0.17 |
| Sodium Oxide ($Na_2O$) | 1.08 | 0.45 | 0.15 |
| Sulfur Trioxide ($SO_3$) | 1.19 | 7.60 | 0.17 |
| Phosphorus Pentoxide ($P_2O_5$) | 1.08 | — | — |
| Titanium Dioxide ($TiO_2$) | 1.31 | 0.73 | 1.41 |
| Loss on Ignition (L.O.I.) | 0.42 | 1.05 | 1.54 |

Comparative Example 1A

Air Content and Compressive Strength

This comparative example investigates the air content and the freeze-thaw durability performance of formulations lacking the air levels of compositions of the present invention.

TABLE 1A.1 shows the raw material composition of these comparative compositions. Two mixes with different water to cementitious materials ratios were studied. The mixes contained no coarse aggregates. The high shear mixer used in this example was PERLS hand held ME 140 mixer operated manually at a RPM of 490. The mixing was performed for 4 minutes. The sand used in this example is Sand A Unimin GRANUSIL 5030.

TABLE 1A.1

Compositions investigated in Example 1A

| Raw Material | Mix 1 | Mix 2 |
|---|---|---|
| Fly Ash Class C (grams) | 2307.7 | 2307.7 |
| Calcium Sulfoaluminate Cement (grams) | 461.5 | 461.5 |
| Calcium Sulfate Hemihydrate (grams) | 230.8 | 230.8 |
| Total Cementitious Materials (grams) | 3000 | 3000 |
| Sand A (grams) | 3450 | 3450 |
| Potassium Citrate (grams) | 60 | 60 |
| Superplasticizer (grams) | 15 | 15 |
| Rheology Modifier (grams) | 0.45 | 0.45 |
| ELEMENTIS BENTONE CT Untreated natural hectorite clay (grams) | 0.30 | 0.30 |
| Defoamer (grams) | 7.5 | 7.5 |
| Sodium Gluconate (grams) | 1.9 | 1.9 |
| Citric Acid (grams) | 22.5 | 22.5 |
| Lithium Carbonate (grams) | 12 | 12 |
| Water (grams) | 960 | 660 |
| Water/Cementitious Materials Wt. Ratio | 0.32:1 | 0.22:1 |
| Sand A/Cementitious Materials Wt. Ratio | 1.15:1 | 1.15:1 |

Cementitious Materials are Fly Ash Class C, Calcium Sulfoaluminate Cement, and Calcium Sulfate Hemihydrate.
The weight of Rheology Modifier and ELEMENTIS BENTONE CT represents grams of active ingredient.

TABLE 1A.2 shows the air content of these comparative formulations.

TABLE 1A.2

Air Content

| Mix # | Air Content (%) |
|---|---|
| 1 | 0.95 |
| 2 | 3.70 |

The air content in this example, and the other examples of the present specification, unless otherwise specified, were measured according to ASTM C231—Standard Test Method for Air Content of Freshly Mixed Concrete by the Pressure Method. The air content for Mix 1 was very low at less than 1%. Air content of Mix 2 was less than 4%. The compressive strengths of Mix 1 and Mix 2 after 28 days were found to be 6497 psi and 11234 psi respectively.

Comparative Example 1B

Freeze-Thaw Durability Performance

The objective of this example was to investigate the freeze-thaw durability of comparative formulations. The dry powder formulations used in this example were the same as the ones illustrated in Example 1A with the only difference being in the water/cementitious materials ratio. The water/cementitious materials ratio for Mix 1 was 0.32:1 while the same for Mix 2 was 0.25:1. The high shear mixer used in this example was PERLS hand held ME 140 mixer operated manually at a RPM of 490. The mixing was performed for 4 minutes.

TABLE 1B.1 shows the air content of the two mixes investigated in this example. It can be seen that the air content for both mixes was less than 3%.

TABLE 1B.1

Air Content

| Mix # | Air Content (%) |
|---|---|
| 1 | 0.9 |
| 2 | 2.4 |

TABLE 1B.2 shows the freeze-thaw durability behavior of the comparative cementitious compositions investigated in Example 1B.

TABLE 1B.2

Freeze-Thaw Durability Performance

| Mix # | | 0 cycles | 30 cycles | 65 cycles | 160 cycles | 300 cycles |
|---|---|---|---|---|---|---|
| 1 | Compressive Strength | 7273 | 3728 | Broken | Broken | Broken |
| 2 | (psi) | 9904 | 6427 | 4614 | Broken | Broken |
| 1 | Dynamic Modulus | 29.2 | 27.3 | Broken | Broken | Broken |
| 2 | (GPa) | 36.3 | 27.7 | Broken | Broken | Broken |
| 1 | Relative Dynamic | 100 | 96 | Broken | Broken | Broken |
| 2 | Modulus (%) | 100 | 76 | Broken | Broken | Broken |

TABLE 1B.1 shows the comparative geopolymer formulations did not perform well under the freeze-thaw conditions. It is noteworthy that both mixes did not survive even 65 freeze-thaw cycles. The calculated durability factor (DF), per ASTM C666 for M=300 cycles, for both mixes were found to be 0. The inventors attribute the poor freeze-thaw durability performance observed to the low air content of these formulations.

Example 2

Freeze-thaw Durability Performance of Geopolymer Compositions of the Invention TABLE 2.1 shows the raw material composition of the mixture composition investigated. This example investigated freeze-thaw durability performance of three different compositions employing three different types of calcium sulfates. Mix 1 employed calcium sulfate dihydrate (USG TERRA ALBA), Mix 2 employed calcium sulfate hemihydrate (USG HYDROCAL C-BASE), and Mix 3 employed anhydrous calcium sulfate (anhydrite—USG SNOW WHITE FILLER). The material was mixed using a high shear mixer—PERLS hand held ME 140 mixer operated manually at a RPM of 490. The mixing was performed for 4 minutes. The sand used in this example was Sand A Unimin GRANUSIL 5030.

TABLE 2.1

Compositions investigated in Example 2

| Raw Material | Mix 1 | Mix 2 | Mix 3 |
|---|---|---|---|
| Fly Ash Class C (grams) | 10345 | 10345 | 10345 |
| Calcium Sulfoaluminate Cement (grams) | 2069 | 2069 | 2069 |
| Calcium Aluminate Cement (grams) | 1034 | 1034 | 1034 |
| Calcium Sulfate Dihydrate (grams) | 1552 | — | — |
| Calcium Sulfate Hemihydrate (grams) | — | 1552 | — |
| Anhydrous Calcium Sulfate (grams) | — | — | 1552 |
| Total Cementitious Materials (grams) | 15000 | 15000 | 15000 |
| Sand A (grams) | 17250 | 17250 | 17250 |
| Potassium Citrate (grams) | 300 | 300 | 300 |
| Superplasticizer (grams) | 75 | 75 | 75 |
| Rheology Modifier (grams) | 1.5 | 1.5 | 1.5 |
| Defoamer (grams) | 30 | 30 | 30 |
| Lithium Carbonate (grams) | 75 | 75 | 75 |
| Polymer (grams) | 750 | 750 | 750 |
| Water (grams) | 3300 | 3300 | 3300 |
| Water/Cementitious Materials Ratio | 0.22:1 | 0.22:1 | 0.22:1 |
| Sand A/Cementitious Materials Ratio | 1.15:1 | 1.15:1 | 1.15:1 |
| Calcium sulfoaluminate cement amount relative to weight of fly ash | 20 wt %* | 20 wt % | 20 wt % |
| Calcium aluminate cement amount relative to weight of fly ash | 10 wt % | 10 wt % | 10 wt % |
| Calcium sulfates amount relative to weight of calcium sulfoaluminate and calcium aluminate cements | 50 wt % | 50 wt % | 50 wt % |
| Calcium sulfates amount relative to weight of fly ash | 15 wt % | 15 wt % | 15 wt % |

*For 100 parts by weight fly ash there are 20 parts by weight calcium sulfoaluminate cement for a total of 120 parts by weight.

The primary difference between Mix 1 and Mix 2 of Example 2 and compositions of Example 1A is in the amount of air entrainment (TABLE 2.6) and freeze-thaw durability component (TABLE 2.1) used as part of the formulation. Rheology modifier, polymer, and defoamer used in this example were part of the freeze-thaw durability component employed in the system.

TABLE 2.2 shows set time of the cementitious compositions investigated in this example. The set times in this example and also for all the examples of the present specification were measured using ASTM C191—Standard Test Methods for Time of Setting of Hydraulic Cement by Vicat Needle. Workability is determined using slump of the fresh concrete with the 2"×4" cylinder. TABLE 2.2 shows the formulations exhibit good workability and the set times decreases by using anhydrous calcium sulfate.

TABLE 2.2

Workability (Slump - 2" × 4") and Setting Time (Vicat)

| Mix # | Slump (inches) | Initial Set (mins) | Final Set (mins) |
|---|---|---|---|
| 1 | 9.675 | 77 | 85 |
| 2 | 7.000 | 32 | 48 |
| 3 | 7.825 | 28 | 33 |

FIG. 1 shows the shrinkage behavior of geopolymeric cementitious compositions of the invention investigated in Example 2. The shrinkage measurements were done in accordance to the ASTM C157 standard with the test being initiated at an age of 1 hour from the time the raw materials were mixed together to form an aqueous slurry. The material shrinkage was measured for a total duration of about 8-weeks while curing the material at 75° F./50% RH.

All the compositions investigated in this example showed shrinkage less than 0.2%. In particular, shrinkage was low when calcium sulfate dihydrate or calcium sulfate hemihydrate was used. The ultimate shrinkage values for the various mixes investigated are tabulated in TABLE 2.3

TABLE 2.3

Ultimate shrinkage values

| Mix # | Ultimate shrinkage at the age of 8 weeks (%) |
|---|---|
| 1 | 0.04 |
| 2 | 0.06 |
| 3 | 0.12 |

These examples imply calcium sulfate hemihydrate or calcium sulfate dihydrate are preferred for making dimensionally stable geopolymer compositions.

TABLE 2.4 shows the compressive strength behavior of the inventive developed geopolymeric cementitious compositions of Example 2. It is noteworthy that the geopolymer cementitious compositions of the invention investigated in this example demonstrated an impressive compressive strength behavior.

TABLE 2.4

Compressive Strength (in psi)

| Mix # | 2 hr | 4 hr | 24 hr | 7 days | 28 days |
|---|---|---|---|---|---|
| 1 | 236 | 2349 | 4541 | 6678 | 7926 |
| 2 | 1779 | 4299 | 6707 | 9111 | 12080 |
| 3 | 2401 | 4447 | 6621 | 10158 | 13090 |

Freeze-Thaw Durability Performance

TABLE 2.5 shows the freeze-thaw durability behavior of the developed geopolymeric cementitious compositions of Mix 1 and Mix 2 of Example 2. It was surprisingly found there was no loss in durability performance even after 1200 freeze-thaw cycles. The calculated durability factors (DF), per ASTM C666 for M=300 cycles, for the mixes investigated in this example were found to be more than 100. In contrast, the comparative formulations of Example 1A showed significant deterioration as early as 100 freeze-thaw cycles. These results thus demonstrate that the developed geopolymer compositions of invention are significantly superior to the comparative formulations in terms of freeze-thaw durability performance, which is a key durability performance characteristic for exterior applications. The freeze-thaw durability performance exhibited by the investigated geopolymer compositions of invention is also significantly superior to the traditional structural concrete compositions used in the concrete industry in exterior applications and other extreme environments.

TABLE 2.5

Freeze-Thaw Durability Performance

| Mix # | | 0 cycles | 100 cycles | 200 cycles | 300 cycles | 900 cycles | 1200 cycles |
|---|---|---|---|---|---|---|---|
| 1 | Compressive | 6192 | 6757 | 5860 | 6698 | NA | NA |
| 2 | Strength | 8957 | 9751 | 7904 | 7474 | NA | NA |
| 3 | (psi) | 12717 | 11775 | 13473 | NA | NA | NA |
| 1 | Dynamic | 24.3 | 26.5 | 26.7 | 27.0 | 24.0 | 24.0 |
| 2 | Modulus | 31.8 | 32.6 | 32.2 | 33.3 | 32.3 | 31.8 |
| 3 | (GPa) | 36.9 | 36.9 | 37.4 | 37.3 | NA | NA |
| 1 | Relative | 100 | 108 | 109 | 111 | 101 | 102 |
| 2 | Dynamic | 100 | 103 | 101 | 105 | 104 | 102 |
| 3 | Modulus (%) | 100 | 100 | 101 | 101 | NA | NA |

Slurry Density, Air Content, and Yield of Material

TABLE 2.6 shows the slurry density, air content and the yield of the geopolymeric cementitious compositions investigated in this example. Yield is defined as the total volume of slurry in cubic feet, obtained from 50 pounds of dry material consisting of cementitious materials and additives, when mixed with fine aggregate, coarse aggregate (when present) and water.

TABLE 2.6

Slurry Density, Air Content and Yield

| Mix # | Slurry Density (pcf) | Air Content (%) | Yield (cu. ft.) |
|---|---|---|---|
| 1 | 131.5 | 6.7 | 0.86 |
| 2 | 133.4 | 6.8 | 0.85 |
| 3 | 134.5 | 5.6 | 0.84 |

The shrinkage results from Example 2 demonstrate, in the presence of both calcium sulfoaluminate cement and calcium aluminate cement, the most preferred calcium sulfate is calcium sulfate hemihydrate when the goal is to minimize shrinkage in selected embodiments of the invention

Example 3

Freeze-Thaw Durability Performance—Influence of Different Levels of Calcium Aluminate Cement with Calcium Sulfate Hemihydrate TABLE 3.1 shows the raw material composition of the inventive mixture compositions investigated in this example.

The high shear mixer used in this example was PERLS hand held ME 140 mixer operated manually at a RPM of 490. The mixing was performed for 4 minutes.

TABLE 3.1

Compositions investigated in Example 3

| Raw Material | Mix 1 | Mix 2 |
|---|---|---|
| Fly Ash Class C (grams) | 10345 | 9836 |
| Calcium Sulfoaluminate Cement (grams) | 2069 | 1967 |
| Calcium Aluminate Cement (grams) | 1034 | 1475 |
| Calcium Sulfate Hemihydrate (grams) | 1552 | 1721 |
| Total Cementitious Materials (grams) | 15000 | 15000 |
| Sand A (grams) | 17250 | 17250 |
| Potassium Citrate (grams) | 300 | 300 |
| Superplasticizer (grams) | 75 | 75 |
| Rheology Modifier (grams) | 1.5 | 1.5 |
| Defoamer (grams) | 30 | 30 |
| Lithium Carbonate (grams) | 75 | 75 |
| Polymer (grams) | 750 | 750 |
| Water (grams) | 3300 | 3300 |
| Water/Cementitious Materials Wt. Ratio | 0.22:1 | 0.22:1 |
| Sand A/Cementitious Materials Wt. Ratio | 1.15:1 | 1.15:1 |
| Calcium sulfoaluminate cement amount relative to weight of fly ash | 20 wt %* | 20 wt % |
| Calcium aluminate cement amount relative to weight of fly ash | 10 wt % | 15 wt % |
| Calcium sulfates amount relative to weight of calcium sulfoaluminate and calcium aluminate cements | 50 wt % | 50 wt % |
| Calcium sulfates amount relative to weight of fly ash | 15 wt % | 17.5 wt % |

*For 100 parts by weight fly ash there are 20 parts by weight calcium sulfoaluminate cement for a total of 120 parts by weight.

The primary difference between Mix 1 and Mix 2 of Example 3 and compositions of Example 1A is in the amount of air content.

TABLE 3.2 shows the slump and setting times of the geopolymer compositions discussed in Example 3.

TABLE 3.2

Workability (Slump - 2" x 4") and Setting Time (Vicat)

| Mix # | Slump (inches) | Initial Set (mins) | Final Set (mins) |
|---|---|---|---|
| 1 | 7.00 | 32 | 48 |
| 2 | 7.25 | 35 | 41 |

TABLE 3.3 shows the compressive strength behavior of the developed geopolymeric cementitious compositions of Example 3. Both geopolymer cementitious compositions of the invention investigated in this example demonstrated an impressive compressive strength behavior both at early ages and later ages.

TABLE 3.3

Compressive Strength (in psi)

| Mix # | 2 hr | 4 hr | 24 hr | 7 days | 28 days |
|---|---|---|---|---|---|
| 1 | 1779 | 4299 | 6707 | 9111 | 12080 |
| 2 | 2426 | 4505 | 7218 | 9052 | 11966 |

TABLE 3.4 shows the freeze-thaw durability behavior of the developed geopolymeric cementitious compositions of Example 3. Surprisingly the material performed well even after 1200 freeze-thaw cycles. The relative dynamic modulus values were surprisingly above 100%. The calculated durability factors (DF), per ASTM C666 for M=300 cycles, for the mixes investigated in this example were found to be more than 100. These results demonstrate that the developed geopolymer compositions of invention are significantly superior to the comparative formulations in terms of freeze-thaw durability performance, which is a key durability performance characteristic for exterior applications. The freeze-thaw durability performance exhibited by the investigated geopolymer compositions of invention is also significantly superior to the traditional structural concrete compositions used in the concrete industry in exterior applications and other extreme environments.

TABLE 3.4

Freeze-Thaw Durability Performance

| Mix # | | 0 cycles | 100 cycles | 200 cycles | 300 cycles | 900 cycles | 1200 cycles |
|---|---|---|---|---|---|---|---|
| 1 | Compressive Strength | 8957 | 9751 | 7904 | 7474 | 5225 | NA |
| 2 | (psi) | 9623 | 9815 | 9664 | 8071 | 6832 | NA |
| 1 | Dynamic Modulus | 31.8 | 32.6 | 32.2 | 33.3 | 32.3 | 31.8 |
| 2 | (GPa) | 31.3 | 31.9 | 31.7 | 32.1 | 31.2 | 30.0 |
| 1 | Relative Dynamic | 100 | 103 | 101 | 105 | 104 | 102 |
| 2 | Modulus (%) | 100 | 102 | 101 | 103 | 102 | 98 |

Slurry Density, Air Content, and Yield of Material

TABLE 3.5 shows the slurry density, air content and yield characteristics of the geopolymeric cementitious compositions investigated in Example 3. The yield, representing the total volume of slurry produced in cubic feet, was calculated for 50 pounds of dry material consisting of cementitious materials and additives (i.e., 50 pounds mixture of cementitious materials and additives) when mixed with fine aggregate and water.

TABLE 3.5

Slurry Density, Air Content and Yield

| Mix # | Slurry Density (pcf) | Air Content (%) | Yield (cubic feet) |
|---|---|---|---|
| 1 | 133.4 | 6.8 | 0.85 |
| 2 | 132.0 | 7.0 | 0.86 |

Example 4

Freeze-Thaw Durability Performance—Influence of Water to Cementitious Materials Ratio This example investigated the influence of water-cementitious materials ratio on the freeze-thaw durability performance of the geopolymeric formulations investigated. TABLE 4.1 shows the raw material composition of the mixture compositions investigated. The high shear mixer used in this example was PERLS hand held ME 140 mixer operated manually at a RPM of 490. The mixing was performed for 4 minutes.

TABLE 4.1

Compositions investigated in Example 4

| Raw Material | Mix 1 | Mix 2 | Mix 3 |
|---|---|---|---|
| Fly Ash Class C (grams) | 10345 | 10345 | 10345 |
| Calcium Sulfoaluminate Cement (grams) | 2069 | 2069 | 2069 |
| Calcium Aluminate Cement (grams) | 1034 | 1034 | 1034 |
| Calcium Sulfate Hemihydrate (grams) | 776 | 776 | 776 |
| Anhydrous Calcium Sulfate (grams) | 776 | 776 | 776 |
| Total Cementitious Materials (grams) | 15000 | 15000 | 15000 |
| Sand A (grams) | 17250 | 17250 | 17250 |
| Potassium Citrate (grams) | 300 | 300 | 300 |
| Superplasticizer (grams) | 75 | 75 | 75 |
| Rheology Modifier (grams) | 1.5 | 1.5 | 1.5 |
| Defoamer (grams) | 30 | 30 | 30 |
| Lithium Carbonate (grams) | 75 | 75 | 75 |
| Polymer (grams) | 750 | 750 | 750 |
| Water (grams) | 4050 | 3300 | 2700 |
| Water/Cementitious Materials Ratio | 0.27:1 | 0.22:1 | 0.18:1 |
| Sand A/Cementitious Materials Ratio | 1.15:1 | 1.15:1 | 1.15:1 |
| Calcium sulfoaluminate cement amount relative to weight of fly ash | 20 wt %* | 20 wt % | 20 wt % |

TABLE 4.1-continued

Compositions investigated in Example 4

| Raw Material | Mix 1 | Mix 2 | Mix 3 |
|---|---|---|---|
| Calcium aluminate cement amount relative to weight of fly ash | 10 wt % | 10 wt % | 10 wt % |
| Calcium sulfates amount relative to weight of calcium sulfoaluminate and calcium aluminate cements | 50 wt % | 50 wt % | 50 wt % |
| Calcium sulfates amount relative to weight of fly ash | 15 wt % | 15 wt % | 15 wt % |

*For 100 parts by weight fly ash there are 20 parts by weight calcium sulfoaluminate cement for a total of 120 parts by weight.

TABLE 4.2 shows the slump and setting times of the geopolymer compositions discussed in example 4.

TABLE 4.2

Workability (Slump - 2" × 4") and Setting Time (Vicat)

| Mix # | Slump (inches) | Initial Set (mins) | Final Set (mins) |
|---|---|---|---|
| 1 | 9.75 | 38 | 51 |
| 2 | 7.56 | 26 | 35 |
| 3 | 5.31 | 21 | 26 |

TABLE 4.3 shows the compressive strength behavior of the developed geopolymeric cementitious compositions of Example 4. The geopolymer cementitious compositions of the invention investigated in this example demonstrated an impressive compressive strength behavior both at early ages and later ages.

TABLE 4.3

Compressive Strength (in psi)

| Mix # | 2 hr | 4 hr | 24 hr | 7 days | 28 days |
|---|---|---|---|---|---|
| 1 | 1073 | 3390 | 5693 | 8109 | 11492 |
| 2 | 2194 | 4851 | 8118 | 9855 | 12252 |
| 3 | 3896 | 6324 | 9392 | 10758 | 13865 |

TABLE 4.4 shows the freeze-thaw durability behavior of the developed geopolymeric cementitious compositions of Example 4. Mix 1 performed well after 900 freeze-thaw cycles. Mixes 2 and 3 performed well even after 1200 freeze-thaw cycles. The relative dynamic modulus values were surprisingly found to be above 100%. The calculated durability factors (DF), per ASTM C666 for M=300 cycles, for the mixes investigated in this example were found to be more than 100. This indicates the material had no loss in strength. The developed geopolymer formulations of this invention as shown in this example demonstrate excellent freeze-thaw durability performance even at water to cementitious materials ratio as high as 0.27.

TABLE 4.4

Freeze-Thaw Durability Performance

| Mix # | | 0 cycles | 100 cycles | 200 cycles | 300 cycles | 900 cycles | 1200 cycles |
|---|---|---|---|---|---|---|---|
| 1 | Compressive | 8751 | 9782 | 9870 | 9712 | 9069 | NA |
| 2 | Strength (psi) | 9741 | 10853 | 10663 | 9512 | 8527 | NA |
| 3 | | 11134 | 12605 | 12493 | 12853 | 13381 | NA |
| 1 | Dynamic | 28.9 | 31.2 | 30.5 | 31.2 | 34.3 | Broken |
| 2 | Modulus | 33.1 | 34.1 | 33.6 | 34.2 | 34.5 | 34.8 |
| 3 | (GPa) | 35.9 | 36.6 | 36.3 | 36.7 | 36.9 | 38.6 |

TABLE 4.4-continued

Freeze-Thaw Durability Performance

| Mix # | | 0 cycles | 100 cycles | 200 cycles | 300 cycles | 900 cycles | 1200 cycles |
|---|---|---|---|---|---|---|---|
| 1 | Relative | 100 | 108 | 106 | 108 | 120 | Broken |
| 2 | Dynamic | 100 | 103 | 102 | 103 | 105 | 106 |
| 3 | Modulus (%) | 100 | 102 | 101 | 102 | 103 | 107 |

Slurry Density, Air Content, and Yield of Material

TABLE 4.5 shows the slurry density, air content and yield of the geopolymeric cementitious compositions investigated in Example 4. The yield, representing the total volume of slurry produced in cubic feet, was calculated for 50 pounds of dry material consisting of cementitious materials and additives (i.e., 50 pounds mixture of cementitious materials and additives) when mixed with fine aggregate and water.

TABLE 4.5

Slurry Density, Air Content and Yield

| Mix # | Slurry Density (pounds per cubic foot) | Air Content (%) | Yield (cubic feet) |
|---|---|---|---|
| 1 | 130.2 | 6.4 | 0.89 |
| 2 | 132.0 | 7.2 | 0.86 |
| 3 | 135.6 | Note 1 | 0.82 |

Note 1:
Air content test not performed on mix 3 due to rapid set of material.

The slurry densities for the mixes investigated in Example 4 increase with decrease in the water to cementitious materials ratio. Air content test was not performed on mix 3 with very low water/cementitious materials ratio (w/cm ratio 0.18:1) due to its rapid set. Based on the slurry density value for mix 3, it is evident the air content for mix 3 would have been in similar range as for mix 1 and mix 2.

Example 5

Influence of Additives on the Air Content, Slurry Density and Yield

This example investigates the influence of different additives on the air content, slurry density and yield of the geopolymer formulations of this invention. The additives investigated were a superplasticizer, a rheology modifier and an organic film forming polymer. The objective of this example was to identify the primary additives responsible for affecting the air content of the system.

TABLE 5.1 shows the raw material composition of the mixture composition investigated. Mix 1 is the control formulation which had all the additives under investigation in this example. Mix 2 had all the additives except for the superplasticizer BASF CASTAMENT FS 20. Mix 3 had all the additives except for the rheology modifier MOMENTIVE AXILAT RH 100 XP. Mix 4 had all the additives except for the polymer BASF ACRONAL S 695 P which is a cement-compatible, redispersible styrene butyl acrylate copolymer powder (a film-forming polymer). The BASF ACRONAL S 695 P is present in an amount equal to 5% of Total Cementitious Materials.

The high shear mixer used in this example was PERLS hand held ME 140 mixer operated manually at a RPM of 490. The mixing was performed for 4 minutes.

TABLE 5.1

Compositions investigated in Example 5

| Raw Material | Mix 1 | Mix 2 | Mix 3 | Mix 4 |
|---|---|---|---|---|
| Fly Ash Class C (grams) | 6557 | 6557 | 6557 | 6557 |
| Calcium Sulfoaluminate Cement (grams) | 1311 | 1311 | 1311 | 1311 |
| Calcium Aluminate Cement (grams) | 984 | 984 | 984 | 984 |
| Calcium Sulfate Hemihydrate (grams) | 1148 | 1148 | 1148 | 1148 |
| Total Cementitious Materials (grams) | 10000 | 10000 | 10000 | 10000 |
| Sand A (grams) | 11500 | 11500 | 11500 | 11500 |
| Potassium Citrate (grams) | 200 | 200 | 200 | 200 |
| Superplasticizer (grams) | 50 | 0 | 50 | 50 |
| Rheology Modifier (grams) | 1 | 1 | 0 | 1 |
| Polymer (grams) | 500 | 500 | 500 | 0 |
| Lithium Carbonate (grams) | 50 | 50 | 50 | 50 |
| Water (grams) | 2200 | 2200 | 2200 | 2200 |
| Water/Cementitious Materials Ratio | 0.22:1 | 0.22:1 | 0.22:1 | 0.22:1 |
| Sand A/Cementitious Materials Ratio | 1.15:1 | 1.15:1 | 1.15:1 | 1.15:1 |

TABLE 5.2 shows the slurry density, air content, and yield of the geopolymeric cementitious compositions of Example 5. The yield, representing the total volume of slurry produced in cubic feet, was calculated for 50 pounds of dry material consisting of cementitious materials and additives (i.e., 50 pounds mixture of cementitious materials and additives) when mixed with fine aggregate and water.

TABLE 5.2

Slurry Density, Air Content and Yield

| Mix # | Slurry Density (pcf) | Air Content (%) | Yield (cu. ft.) |
|---|---|---|---|
| 1 | 117.4 | 19.0 | 0.97 |
| 2 | 117.4 | 19.0 | 0.97 |
| 3 | 115.9 | 20.0 | 0.98 |
| 4 | 127.8 | 13.0 | 0.92 |

The slurry densities for these mixes were between 115 pcf to 128 pcf. The slurry densities in this example and also in the following examples were calculated using the air meter cylinder with a known volume of 0.2472 cubic feet. The mass of the slurry was measured and the slurry density was calculated using the mass and the known volume of the cylinder. The material yield was calculated and reported for 50 pounds of dry material consisting of cementitious materials and all additives in the mixture. Yield for 50 pounds of dry material (i.e., weight of total cementitious materials and dry additives totaling 50 pounds) is derived by calculating the total material consumed by the air meter cylinder, including total cementitious materials, dry additives, fine aggregate, coarse aggregate, and water, to produce the known volume of slurry.

The high air content of 19% for the control Mix 1 with all the additives present can be attributed to the absence of defoamers and the use of high shear mixer.

The air content for the Mix 2 without superplasticizer and Mix 3 without rheology modifier did not change much when compared to the control Mix 1. However Mix 4 without polymer had a drop in the air content to 13%. These results demonstrate the impact of polymer on the air content.

Thus, this study teaches that low density materials in some embodiments of this invention can be obtained by excluding defoamers in the system. Further, this study also teaches that including film forming organic polymers in absence of defoamers is helpful in increasing the air content and lowering the density of the material.

TABLE 5.3 shows the early age and ultimate compressive strength behavior of the developed geopolymeric cementitious compositions of this example.

TABLE 5.3

| | Compressive Strength (psi) | | |
|---|---|---|---|
| Mix # | 24 hr | 7 days | 28 days |
| 1 | 4607 | 6309 | 6963 |
| 2 | 3466 | 5091 | 5552 |
| 3 | 4210 | 5858 | 6426 |
| 4 | 4389 | 5443 | 5069 |

Example 6

Influence of Water-cementitious Materials Ratio on the Air Content, Slurry Density and Yield This example investigates the influence of water to cementitious materials ratio on the air content, slurry density and yield of the geopolymer formulations of this invention. TABLE 6.1 shows the raw material composition of the mixture composition investigated. The high shear mixer used in this example was PERLS hand held ME 140 mixer operated manually at a RPM of 490. The mixing was performed for 4 minutes.

TABLE 6.1

| Compositions investigated in Example 6 | | | | |
|---|---|---|---|---|
| Raw Material | Mix 1 | Mix 2 | Mix 3 | Mix 4 |
| Fly Ash Class C (grams) | 6557 | 6557 | 6557 | 6557 |
| Calcium Sulfoaluminate Cement (grams) | 1311 | 1311 | 1311 | 1311 |
| Calcium Aluminate Cement (grams) | 984 | 984 | 984 | 984 |
| Calcium Sulfate Hemihydrate (grams) | 1148 | 1148 | 1148 | 1148 |
| Total Cementitious Materials (grams) | 10000 | 10000 | 10000 | 10000 |
| Sand A (grams) | 11500 | 11500 | 11500 | 11500 |
| Potassium Citrate (grams) | 200 | 200 | 200 | 200 |
| Superplasticizer (grams) | 50 | 50 | 50 | 50 |
| Rheology Modifier (grams) | 1 | 1 | 1 | 1 |
| Polymer (grams) | 500 | 500 | 500 | 500 |
| Lithium Carbonate (grams) | 50 | 50 | 50 | 50 |
| Water (grams) | 2200 | 2500 | 2800 | 3200 |
| Water/Cementitious Materials Ratio | 0.22:1 | 0.25:1 | 0.28:1 | 0.32:1 |
| Sand A/Cementitious Materials Ratio | 1.15:1 | 1.15:1 | 1.15:1 | 1.15:1 |

TABLE 6.2 shows the slurry density, air content and the yield of the geopolymeric cementitious compositions of this example. The yield, representing the total volume of slurry produced in cubic feet, was calculated for 50 pounds of dry material consisting of cementitious materials and additives (i.e., 50 pounds mixture of cementitious materials and additives) when mixed with fine aggregate and water.

TABLE 6.2

| Slurry Density, Air Content and Yield | | | |
|---|---|---|---|
| Mix # | Slurry Density (pcf) | Air Content (%) | Yield (cu. ft.) |
| 1 | 117.4 | 19.0 | 0.97 |
| 2 | 115.9 | 19.0 | 0.99 |
| 3 | 119.0 | 15.0 | 0.98 |
| 4 | 119.7 | 14.5 | 0.99 |

The data shows the air content in general decreases with the increase in the water to cementitious materials ratio for the compositions investigated. The slurry densities increase with decrease in the air content.

TABLE 6.3 shows early age and ultimate compressive strength behavior of the developed geopolymeric cementitious compositions of this example. The geopolymer cementitious compositions of the invention demonstrated impressive compressive strength behavior (both early age and later age) despite containing very high amounts of air in the system.

TABLE 6.3

| | Compressive Strength (psi) | | |
|---|---|---|---|
| Mix # | 24 hr | 7 days | 28 days |
| 1 | 4607 | 6309 | 6963 |
| 2 | 3526 | 4984 | 5320 |
| 3 | 3358 | 4881 | 5164 |
| 4 | 3502 | 4897 | 5177 |

Example 7

Influence of Defoaming Agent Amount on the Air Content, Slurry Density and Yield This example investigates the influence of defoamer amount on the air content of the geopolymer formulations of this invention. TABLE 7.1 shows the raw material composition of the mixture composition investigated. The defoamer dosages investigated were 0.00, 0.0.05, 0.10, and 0.15 wt % of total cementitious materials. No air entraining agents were used and all mixes contained polymer. The high shear mixer used in this example was PERLS hand held ME 140 mixer operated manually at a RPM of 490. The mixing was performed for 4 minutes.

TABLE 7.1

| Compositions investigated in Example 7 | | | | |
|---|---|---|---|---|
| Raw Material | Mix 1 | Mix 2 | Mix 3 | Mix 4 |
| Fly Ash Class C (grams) | 6557 | 6557 | 6557 | 6557 |
| Calcium Sulfoaluminate Cement (grams) | 1311 | 1311 | 1311 | 1311 |
| Calcium Aluminate Cement (grams) | 984 | 984 | 984 | 984 |
| Calcium Sulfate Hemihydrate (grams) | 1148 | 1148 | 1148 | 1148 |
| Total Cementitious Materials (grams) | 10000 | 10000 | 10000 | 10000 |
| Sand A (grams) | 11500 | 11500 | 11500 | 11500 |
| Potassium Citrate (grams) | 200 | 200 | 200 | 200 |
| Superplasticizer (grams) | 50 | 50 | 50 | 50 |
| Rheology Modifier (grams) | 1 | 1 | 1 | 1 |
| Defoamer (grams) | 0 | 5 | 10 | 15 |
| Lithium Carbonate (grams) | 50 | 50 | 50 | 50 |

TABLE 7.1-continued

Compositions investigated in Example 7

| Raw Material | Mix 1 | Mix 2 | Mix 3 | Mix 4 |
|---|---|---|---|---|
| Polymer (grams) | 500 | 500 | 500 | 500 |
| Water (grams) | 2200 | 2200 | 2200 | 2200 |
| Water/Cementitious Materials Ratio | 0.22:1 | 0.22:1 | 0.22:1 | 0.22:1 |
| Sand A/Cementitious Materials Ratio | 1.15:1 | 1.15:1 | 1.15:1 | 1.15:1 |

TABLE 7.2 shows the slurry density, air content and yield of the geopolymeric cementitious compositions of Example 7. The yield, representing the total volume of slurry produced in cubic feet, was calculated for 50 pounds of dry material consisting of cementitious materials and additives (i.e., 50 pounds mixture of cementitious materials and additives) when mixed with fine aggregate and water.

TABLE 7.2

Slurry Density, Air Content and Yield

| Mix # | Slurry Density (pcf) | Air Content (%) | Yield (cu. ft.) |
|---|---|---|---|
| 1 | 118.1 | 18.5 | 0.96 |
| 2 | 126.5 | 11.8 | 0.90 |
| 3 | 131.1 | 8.6 | 0.86 |
| 4 | 132.1 | 8.0 | 0.86 |

The results shown is TABLE 7.2 demonstrate the air content was very high when there was no defoamer present in the system. Addition of a small amount of defoamer was helpful in significantly reducing the amount of air. However, beyond a certain defoamer amount, the influence of defoamer amount on the air content was not as significant for the compositions investigated. An objective of this example was to identify the amount of defoamer needed to maintain the air content at a desired level. The next example confirms this benefit.

The effect of defoamer amount on the slurry density is similar to its effect on the air content. An increase in defoamer amount increases the density of the material. An increase in defoamer amount decreased the material yield (calculated for 50 pounds of dry (water-free) material consisting of cementitious materials and additives).

TABLE 7.3 shows the early age and ultimate compressive strength behavior of the developed geopolymeric cementitious compositions of Example 7.

TABLE 7.3

Compressive Strength (psi)

| Mix # | 24 hr | 7 days | 28 days |
|---|---|---|---|
| 1 | 5055 | 6843 | 7402 |
| 2 | 6332 | 8805 | 9342 |
| 3 | 7039 | 9777 | 10564 |
| 4 | 7447 | 10074 | 10641 |

The compressive strength of the geopolymeric cementitious compositions of the invention of this example continued to increase as a function of time. The early age 24-hour compressive strengths of the material were in excess of 5000 psi. The increase in the defoamer level increased the compressive strengths after 7 days of air curing and increased the compressive strengths after 28 days of air curing for all geopolymeric cementitious compositions investigated in this example. It is noteworthy that all geopolymer cementitious compositions of the invention investigated in this example demonstrated an impressive compressive strength behavior (both early age and later age) despite containing different and very high amounts of air in the system.

Example 8

Influence of Very High Amounts of Defoaming Agent on the Air Content, Slurry Density and Yield TABLE 8.1 shows the raw material composition of the mixture composition investigated. The objective of this investigation was to determine the defoamer dosage levels for obtaining air content between 4 to 8% by volume so that satisfactory freeze-thaw durability performance may be obtained. No air entraining agents were used and all mixes contained polymer. The defoamer dosages investigated were 0.20, 0.30, 0.40, and 0.50 wt % of total cementitious materials. The high shear mixer used in this example was PERLS hand held ME 140 mixer operated manually at a RPM of 490. The mixing was performed for 4 minutes.

TABLE 8.1

Compositions investigated in Example 8

| Raw Material | Mix 1 | Mix 2 | Mix 3 | Mix 4 |
|---|---|---|---|---|
| Fly Ash Class C (grams) | 6557 | 6557 | 6557 | 6557 |
| Calcium Sulfoaluminate Cement (grams) | 1311 | 1311 | 1311 | 1311 |
| Calcium Aluminate Cement (grams) | 984 | 984 | 984 | 984 |
| Calcium Sulfate Hemihydrate (grams) | 1148 | 1148 | 1148 | 1148 |
| Total Cementitious Materials (grams) | 10000 | 10000 | 10000 | 10000 |
| Sand A (grams) | 11500 | 11500 | 11500 | 11500 |
| Potassium Citrate (grams) | 200 | 200 | 200 | 200 |
| Superplasticizer (grams) | 50 | 50 | 50 | 50 |
| Rheology Modifier (grams) | 1 | 1 | 1 | 1 |
| Defoamer (grams) | 20 | 30 | 40 | 50 |
| Lithium Carbonate (grams) | 50 | 50 | 50 | 50 |
| Polymer (grams) | 500 | 500 | 500 | 500 |
| Water (grams) | 2200 | 2200 | 2200 | 2200 |
| Water/Cementitious Materials Ratio | 0.22:1 | 0.22:1 | 0.22:1 | 0.22:1 |
| Sand A/Cementitious Materials Ratio | 1.15:1 | 1.15:1 | 1.15:1 | 1.15:1 |

TABLE 8.2 shows the slurry density, air content and yield of the geopolymeric cementitious compositions of Example 8. The yield, representing the total volume of slurry produced in cubic feet, was calculated for 50 pounds of dry material consisting of cementitious materials and additives (i.e., 50 pounds mixture of cementitious materials and additives) when mixed with fine aggregate and water.

TABLE 8.2

Slurry Density, Air Content and Yield

| Mix # | Slurry Density (pcf) | Air Content (%) | Yield (cu. ft.) |
|---|---|---|---|
| 1 | 133.3 | 6.8 | 0.85 |
| 2 | 135.0 | 5.8 | 0.84 |
| 3 | 134.8 | 5.5 | 0.84 |
| 4 | 135.4 | 5.2 | 0.84 |

There was no significant decrease in the air content at higher dosages of defoamer. The air content values ranges between 5.2% and 6.8% for the mixes investigated. In contrast, lower dosages of defoamer (as investigated in Example 7) reduced the air content to a greater degree.

The slurry density and yield were also not affected much at higher dosages of defoamer. Thus, the data shows a defoamer dosage level of more than 0.2 wt % does not have any significant practical implications on slurry density, air content and yield of the material.

TABLE 8.3 shows the early age and ultimate compressive strength behavior of the developed geopolymeric cementitious compositions investigated in this example.

TABLE 8.3

Compressive Strength (psi)

| Mix # | 24 hr | 7 days | 28 days |
|---|---|---|---|
| 1 | 7757 | 10584 | 11549 |
| 2 | 7714 | 10578 | 12307 |
| 3 | 7905 | 10967 | 12304 |
| 4 | 8126 | 11090 | 12735 |

The compressive strength of the geopolymeric cementitious compositions of the invention investigated in this example continued to increase as a function of time. However, there was no significant increase in early age or later age compressive strengths at higher dosages of defoamer.

Example 9

Influence of Air Entraining Agent Dosage

The objective of this example is to demonstrate the influence of air entraining agent dosage on air content, slurry density, and yield of the geopolymer formulations. TABLE 9.1 shows the raw material composition of the mixture composition investigated. The amount of air-entraining agent used in the three mixes investigated was 0.00, 0.10 and 0.20 wt % of total cementitious materials. No defoamers were used and all mixes contained polymer.

Unlike prior examples, in this example the mixes contain coarse aggregates in the form of Gravel A Quickrete® All Purpose Gravel. The gravel to cementitious material ratio was 1.0 for all the mixes. The gravel to the total powder ratio was 0.45. Unlike prior examples, in this example a low shear concrete mixer was employed in all the mixes used. The low shear mixer used was a KUSHLAN 600 DD drum type concrete mixer, having 6 cu. ft. capacity, operated at a drum RPM of 18. The mixing was performed for 6 minutes.

TABLE 9.1

Compositions investigated in Example 9

| Raw Material | Mix 1 | Mix 2 | Mix 3 |
|---|---|---|---|
| Fly Ash Class C (grams) | 5246 | 5246 | 5246 |
| Calcium Sulfoaluminate Cement (grams) | 1049 | 1049 | 1049 |
| Calcium Aluminate Cement (grams) | 787 | 787 | 787 |
| Calcium Sulfate Hemihydrate (grams) | 918 | 918 | 918 |
| Total Cementitious Materials (grams) | 8000 | 8000 | 8000 |
| Sand A (grams) | 9200 | 9200 | 9200 |
| Gravel A (grams) | 8000 | 8000 | 8000 |
| Potassium Citrate (grams) | 160 | 160 | 160 |
| Superplasticizer (grams) | 40 | 40 | 40 |
| Rheology Modifier (grams) | 0.8 | 0.8 | 0.8 |
| Air-Entraining Agent (grams) | 0 | 8 | 16 |
| Lithium Carbonate (grams) | 40 | 40 | 40 |
| Polymer (grams) | 400 | 400 | 400 |

TABLE 9.1-continued

Compositions investigated in Example 9

| Raw Material | Mix 1 | Mix 2 | Mix 3 |
|---|---|---|---|
| Water (grams) | 1760 | 1760 | 1760 |
| Water/Cementitious Materials Ratio | 0.22:1 | 0.22:1 | 0.22:1 |
| Sand A/Cementitious Materials Ratio | 1.15:1 | 1.15:1 | 1.15 |
| Gravel A/Cementitious Materials Ratio | 1:1 | 1:1 | 1:1 |

TABLE 9.2 shows the slurry density, air content and the yield characteristics of the geopolymeric cementitious compositions of Example 9. The yield, representing the total volume of slurry produced in cubic feet, was calculated for 50 pounds of dry material consisting of cementitious materials and additives (i.e., 50 pounds mixture of cementitious materials and additives) when mixed with fine aggregate, coarse aggregate and water.

TABLE 9.2

Slurry Density, Air Content and Yield

| Mix # | Slurry Density (pcf) | Air Content (%) | Yield (cu. ft.) |
|---|---|---|---|
| 1 | 138.1 | 7.0 | 1.16 |
| 2 | 137.4 | 8.1 | 1.16 |
| 3 | 134.5 | 9.4 | 1.19 |

The results presented in TABLE 9.2 show that the air content increases with an increase in the air-entraining agent amount. The data shows an increase in the air-entraining agent level of 0.1 wt % increases the air content by about 1%. In this example, as in previous examples, increased air content lowered the material density and increased yield. The yield was calculated for 50 pounds of dry material consisting of cementitious materials and additives (i.e., 50 pounds mixture of cementitious materials and additives) when mixed with fine aggregate, coarse aggregate and water.

TABLE 9.3 shows the early age and ultimate compressive strength behavior of the developed geopolymeric cementitious compositions of Example 9.

TABLE 9.3

Compressive Strength (psi)

| Mix # | 24 hr | 28 days |
|---|---|---|
| 1 | 6144 | 9268 |
| 2 | 5235 | 8187 |
| 3 | 4826 | 7793 |

The early age 24-hour compressive strengths of the material were in excess of 4500 psi. The compressive strength of the geopolymeric cementitious compositions of the invention investigated in this example continued to increase as a function of time. Both early age and later age strengths decreased with the increase in air-entraining agent amount. The compressive strength results signify and teach the importance of keeping the air-entraining agent dosage to a desired level for obtaining a right balance between mechanical performance and freeze-thaw durability.

Example 10

Influence of Mixing Methods

Previous examples show that the geopolymer compositions investigated and the mixing method employed had an influence of entraining high air content of up to about 20%. The objective was to demonstrate the influence of different mixing methods on the air content, slurry density, and yield of the geopolymer formulations of the invention. This example investigated the use of high and low shear mixers.

The high shear mixer used in this example was PERLS hand held ME 140 mixer operated manually at a RPM of 490

The low shear mixer used in this example was a KUSH-LAN 600 DD drum type concrete mixer, having 6 cu. ft capacity, operated at a drum RPM of 18.

TABLE 10.1 shows the raw material composition of the mixture composition investigated. The sand used in this example is Sand A Unimin Granusil® 5030. The gravel used in this example is Gravel A Quickrete® All Purpose Gravel. The gravel to cementitious material ratio was 1:1 for all the mixes. The gravel to the total powder ratio was 0.45:1. No air entraining agent was used.

Mixing time for the high shear mixer was 4 minutes and the low shear mixer was 6 minutes. No defoamer was used in this example. Mix 1 and Mix 2 used high shear mixer and low shear mixer, respectively.

TABLE 10.1

Compositions investigated in Example 10

| Raw Material | Mix 1 | Mix 2 |
| --- | --- | --- |
| Fly Ash Class C (grams) | 3934 | 3934 |
| Calcium Sulfoaluminate Cement (grams) | 787 | 787 |
| Calcium Aluminate Cement (grams) | 590 | 590 |
| Calcium Sulfate Hemihydrate (grams) | 689 | 689 |
| Total Cementitious Materials (grams) | 6000 | 6000 |
| Sand A (grams) | 6900 | 6900 |
| Gravel A (grams) | 6000 | 6000 |
| Potassium Citrate (grams) | 120 | 120 |
| Superplasticizer (grams) | 30 | 30 |
| Rheology Modifier (grams) | 0.6 | 0.6 |
| Defoamer (grams) | 0 | 0 |
| Lithium Carbonate (grams) | 30 | 30 |
| Polymer (grams) | 300 | 300 |
| Water (grams) | 1320 | 1320 |
| Water/Cementitious Materials Ratio | 0.22:1 | 0.22:1 |
| Sand A/Cementitious Materials Ratio | 1.15:1 | 1.15:1 |
| Gravel A/Cementitious Materials Ratio | 1:1 | 1:1 |
| Mixing Method (Shear) | High | Low |
| Mixing Time (minutes) | 4 | 6 |

TABLE 10.2 shows the slurry density, air content and, yield of the geopolymeric cementitious compositions of this example. The yield, representing the total volume of slurry produced in cubic feet, was calculated for 50 pounds of dry material consisting of cementitious materials and additives (i.e., 50 pounds mixture of cementitious materials and additives) when mixed with fine aggregate, coarse aggregate and water.

TABLE 10.2

Slurry Density, Air Content and Yield

| Mix # | Slurry Density (pcf) | Air Content (%) | Yield (cu. ft.) |
| --- | --- | --- | --- |
| 1 | <120.0* | 20.0 | >1.27* |
| 2 | 138.1 | 7.0 | 1.16 |

*Theoretically derived based on the air content

The air content is about 3 times more when high shear mixing was employed. Mix 1 where high shear mixing was used had 20% air content. The corresponding air content with low shear mixing was 7% for Mix 2. Based on this study it can be concluded the speed of mixing influences the amount of air entrained in some embodiments of this invention.

Example 11

Influence of Mixing Time on Air Content

The objective of this example was to investigate the influence of mixing procedure and mixing time on the stability of air-void system. This example investigates the influence of the mixing time on the air content, slurry density and yield of the geopolymer formulations.

TABLE 11.1 shows the raw material composition of the mixture composition investigated. The sand used in this example is Sand A Unimin Granusil® 5030. The gravel used in this example is Gravel A Quickrete® All Purpose Gravel. The gravel to cementitious material ratio was 1.45:1 for all the mixes. The gravel to the total powder ratio was 0.65:1. The air entraining agent was used at 0.05 wt %. The mixes had no defoamer.

The low shear mixer used in this example was a KUSH-LAN 1000 DD drum type concrete mixer, having 10 cu. ft. capacity, operated at a drum RPM of 18. The mixing was performed for 6 minutes.

To characterize the influence of mixing time on air-void stability, three different mixing times were used for the three mixes investigated. Mix 1 was mixed for 8 minutes, Mix 2 was mixed for 6 minutes, and Mix 3 was mixed for 4 minutes.

TABLE 11.1

Compositions investigated in Example 11

| Raw Material | Mix 1 | Mix 2 | Mix 3 |
| --- | --- | --- | --- |
| Fly Ash Class C (grams) | 6557 | 6557 | 6557 |
| Calcium Sulfoaluminate Cement (grams) | 1311 | 1311 | 1311 |
| Calcium Aluminate Cement (grams) | 984 | 984 | 984 |
| Calcium Sulfate Hemihydrate (grams) | 1148 | 1148 | 1148 |
| Total Cementitious Materials (grams) | 10000 | 10000 | 10000 |
| Sand A (grams) | 11500 | 11500 | 11500 |
| Gravel A (grams) | 14500 | 14500 | 14500 |
| Potassium Citrate (grams) | 200 | 200 | 200 |
| Superplasticizer (grams) | 50 | 50 | 50 |
| Rheology Modifier (grams) | 1 | 1 | 1 |
| Air Entraining Agent (grams) | 5 | 5 | 5 |
| Lithium Carbonate (grams) | 50 | 50 | 50 |
| Polymer (grams) | 500 | 500 | 500 |
| Water (grams) | 2000 | 2000 | 2000 |
| Water/Cementitious Materials Ratio | 0.20:1 | 0.20:1 | 0.20:1 |
| Sand A/Cementitious Materials Ratio | 1.15:1 | 1.15:1 | 1.15:1 |
| Gravel A/Cementitious Materials Ratio | 1.45:1 | 1.45:1 | 1.45:1 |
| Mixing Time (minutes) | 8 | 6 | 4 |

TABLE 11.2 shows the slurry density, air content and the yield characteristics of the geopolymeric cementitious compositions of Example 11. The yield, representing the total volume of slurry produced in cubic feet, was calculated for 50 pounds of dry material consisting of cementitious materials and additives (i.e., 50 pounds mixture of cementitious materials and additives) when mixed with fine aggregate, coarse aggregate and water.

TABLE 11.2

Slurry Density, Air Content and Yield

| Mix # | Slurry Density (pcf) | Air Content (%) | Yield (cu. ft.) |
|---|---|---|---|
| 1 | 133.2 | 11.8 | 1.35 |
| 2 | 137.1 | 9.8 | 1.31 |
| 3 | 141.6 | 7.2 | 1.27 |

Results in TABLE 11.2 show that the air content increased with the mixing time. The air content increased from 7.2% for Mix 1 to 11.8% for Mix 3. These results also demonstrate that the mixing procedure investigated in this example may not be practical for field use since it is generally not possible to strictly control the mixing time in the real field situations. This leads to searching other means for entraining the right amount of air in the system that would provide greater tolerance to operational variations occurring in the field.

The influence of mixing time on the slurry density was also significant. The slurry density decreased with the increase in the mixing time. Yield of the material decreased with decrease in the mixing time.

Freeze-thaw durability performance of geopolymeric cementitious compositions of the invention investigated in Example were performed based on ASTM C 666—Procedure A. TABLE 11.3 shows the freeze-thaw durability behavior of the formulations investigated in Example 11 All formulations investigated in this example performed extremely well when subjected to freeze-thaw cycles. It is noteworthy that the relative dynamic modulus values were found to be above 100%. The calculated durability factors (DF), per ASTM C666 for M=300 cycles, for the mixes investigated in this example were found to be more than 100.

TABLE 11.3

Freeze-Thaw Durability Performance

| Mix # |  | 0 cycles | 100 cycles | 200 cycles | 300 cycles |
|---|---|---|---|---|---|
| 1 | Dynamic | 29.9 | 29.7 | 30.5 | 30.5 |
| 2 | Modulus | 30.4 | 30.1 | 31.2 | 31.7 |
| 3 | (GPa) | 32.9 | 33.8 | 33.9 | 34.3 |
| 1 | Relative | 100 | 99 | 101 | 101 |
| 2 | Dynamic | 100 | 99 | 101 | 103 |
| 3 | Modulus (%) | 100 | 102 | 102 | 103 |

Example 12

Influence of Mixing Time on Air Content to Obtain a Stable System

This example investigates the influence of the mixing time on the air content, slurry density and yield of the geopolymer formulations. The objective of this investigation was to develop a stable system that is independent of the mixing procedure used.

A stable system is defined as the one where the air content of the material is not affected with change in mixing time. TABLE 12.1 shows the raw material composition of the mixture composition investigated. The three mixes investigated in this example had 0.03 wt % defoamer and 0.05 wt % of air-entraining agent.

The low shear mixer used in this example was a KUSHLAN 350 DD drum type concrete mixer with 18 drum RPM with 3.5 cu. ft. capacity. The mixing was performed for 6 minutes.

Different mixing times were used for the three mixes investigated in this example. The first mix (Mix 1) was mixed for 8 minutes, the second mix (Mix 2) was mixed for 6 minutes, and the third mix (Mix 3) was mixed for 4 minutes.

TABLE 12.1

Compositions investigated in Example 12

| Raw Material | Mix 1 | Mix 2 | Mix 3 |
|---|---|---|---|
| Fly Ash Class C (grams) | 6557 | 6557 | 6557 |
| Calcium Sulfoaluminate Cement (grams) | 1311 | 1311 | 1311 |
| Calcium Aluminate Cement (grams) | 984 | 984 | 984 |
| Calcium Sulfate Hemihydrate (grams) | 1148 | 1148 | 1148 |
| Total Cementitious Materials (grams) | 10000 | 10000 | 10000 |
| Sand A (grams) | 11500 | 11500 | 11500 |
| Potassium Citrate (grams) | 200 | 200 | 200 |
| Superplasticizer (grams) | 50 | 50 | 50 |
| Rheology Modifier (grams) | 1 | 1 | 1 |
| Defoamer (grams) | 3 | 3 | 3 |
| Air Entraining Agent (grams) | 5 | 5 | 5 |
| Lithium Carbonate (grams) | 50 | 50 | 50 |
| Polymer (grams) | 500 | 500 | 500 |
| Water (grams) | 2000 | 2000 | 2000 |
| Water/Cementitious Materials Ratio | 0.20:1 | 0.20:1 | 0.20:1 |
| Sand A/Cementitious Materials Ratio | 1.15:1 | 1.15:1 | 1.15:1 |
| Mixing Time (minutes) | 8 | 6 | 4 |

TABLE 12.2 shows the slurry density, air content, and yield of the geopolymeric cementitious compositions of Example 12. The yield, representing the total volume of slurry produced in cubic feet, was calculated for 50 pounds of dry material consisting of cementitious materials and additives (i.e., 50 pounds mixture of cementitious materials and additives) when mixed with fine aggregate and water.

TABLE 12.2

Slurry Density, Air Content and Yield

| Mix # | Slurry Density (pcf) | Air Content (%) | Yield (cu. ft.) |
|---|---|---|---|
| 1 | 136.0 | 6.2 | 0.83 |
| 2 | 135.5 | 6.5 | 0.83 |
| 3 | 134.2 | 6.4 | 0.84 |

Surprisingly there was no significant change in the air content with different mixing times employed in the mixes investigated. The slurry density and yield were also not affected. This investigation teaches that it is possible to develop a robust formulation using a combination and selected levels of both defoamer and air-entraining agent. The results from this example demonstrate these mixes are not affected by the mixing time. This is a significant benefit since the mixing time is practically difficult to control in the field. Thus, in accordance to this invention, the compositions described in this example demonstrate a preferred composition and method of achieving desired and stable air content independent of mixing times employed.

Example 13

Influence of Gravel to Cementitious Materials Ratio

The objective of this example is to determine the influence of gravel to cementitious materials ratio on the air content, slurry density, yield, and compressive strength of the geopolymer compositions of the invention TABLE 13.1 shows the raw material composition of the mixture composition investigated. The sand used in this example is Sand A Unimin Granusil® 5030. The gravel used in this example is Gravel A Quickrete® All Purpose Gravel. This example investigated different gravel to cementitious material ratios. No defoamer was used in this example. The air entraining agent dosage used was 0.2 wt %.

The low shear mixer used in this example was a KUSH-LAN 600 DD drum type concrete mixer with 18 drum RPM with 6 cu. ft capacity. The mixing was performed for 6 minutes.

TABLE 13.1

Compositions investigated in Example 13

| Raw Material | Mix 1 | Mix 2 | Mix 3 |
|---|---|---|---|
| Fly Ash Class C (grams) | 9836 | 9836 | 9836 |
| Calcium Sulfoaluminate Cement (grams) | 1967 | 1967 | 1967 |
| Calcium Aluminate Cement (grams) | 1475 | 1475 | 1475 |
| Calcium Sulfate Hemihydrate (grams) | 1721 | 1721 | 1721 |
| Total Cementitious Materials (grams) | 15000 | 15000 | 15000 |
| Sand A (grams) | 17250 | 17250 | 17250 |
| Gravel A (grams) | 16741 | 21763 | 25111 |
| Potassium Citrate (grams) | 300 | 300 | 300 |
| Superplasticizer (grams) | 75 | 75 | 75 |
| Rheology Modifier (grams) | 1.5 | 1.5 | 1.5 |
| Defoamer (grams) | 0 | 0 | 0 |
| Air Entraining Agent (grams) | 30 | 30 | 30 |
| Lithium Carbonate (grams) | 75 | 75 | 75 |
| Polymer (grams) | 750 | 750 | 750 |
| Water (grams) | 3000 | 3000 | 3000 |
| Water/Cementitious Materials Ratio | 0.20:1 | 0.20:1 | 0.20:1 |
| Sand A/Cementitious Materials Ratio | 1.15:1 | 1.15:1 | 1.15:1 |
| Gravel A/Cementitious Materials Ratio | 1.12:1 | 1.45:1 | 1.67:1 |
| Mixing Time (minutes) | 6 | 6 | 6 |

TABLE 13.2 shows the slurry density, air content and yield of the geopolymeric cementitious compositions of Example 13. The yield, representing the total volume of slurry produced in cubic feet, was calculated for 50 pounds of dry material consisting of cementitious materials and additives (i.e., 50 pounds mixture of cementitious materials and additives) when mixed with fine aggregate, coarse aggregate and water.

TABLE 13.2

Slurry Density, Air Content and Yield

| Mix # | Slurry Density (pcf) | Air Content (%) | Yield (cu. ft.) |
|---|---|---|---|
| 1 | 136.3 | 8.2% | 1.20 |
| 2 | 138.2 | 9.0% | 1.30 |
| 3 | 138.2 | 9.0% | 1.37 |

The data shows increase in the gravel to cementitious materials ratio increased the yield of the material without significantly affecting the air content and the slurry density.

TABLE 13.3 shows the early age and ultimate compressive strength behavior of the developed geopolymeric cementitious compositions of Example 11.

TABLE 13.3

Compressive Strength (in psi)

| Mix # | 2 hr | 4 hr | 24 hr | 7 days | 28 days |
|---|---|---|---|---|---|
| 1 | 2426 | 4092 | 6477 | 9051 | 10406 |
| 2 | 1682 | 3522 | 5064 | 8007 | 8745 |
| 3 | 1122 | 2960 | 5092 | 7884 | 9344 |

All of the mixes described in this example had high early age strength and satisfactory compressive strength performance.

Example 14

Dimensional Movement and Temperature Rise Behavior

This example demonstrates the superior dimensional stability of the inventive formulations. The formulations were similar to the one in Example 5 Mix 2. The only difference was the water to cementitious materials ratio used in this example was 0.20:1 and the mix contained coarse aggregates in the form of Gravel A Quickrete® All Purpose Gravel added at a gravel to cementitious materials ratio of 1:1.

Figure 2:
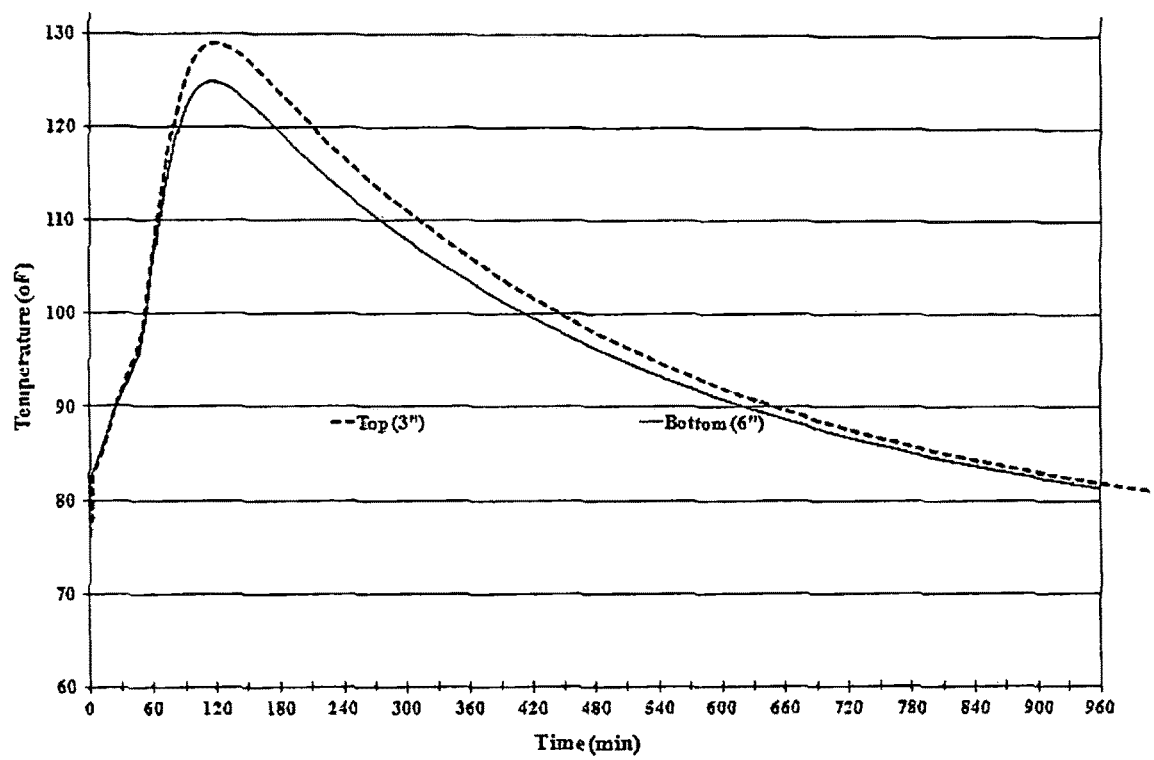
FIG. 2 shows a plot of time vs. temperature for Example 14.

Mixing was carried out using a high shear mixer with mixing for 4 minutes. A rectangular beam, 8 inch wide×8 inch deep×36 inch long, was cast in a wooden form. Dimensional movement and shrinkage of the material was measured using strain gauges embedded at different depths of the 8 inch deep specimen. The strain gauges were mounted at 3 inch and 6 inch depth from the top surface of the specimen. The ultimate strain measured after 8 weeks at both 3 inch and 6 inch depths were found to be less than 0.01%. The maximum temperature rise during curing was observed at the 3 inch depth, where the maximum material temperature was between 120 to 130° F. (49-54° C.) as seen in FIG. 2.

Example 15

Freeze-thaw Durability Performance of Calcium Aluminate Cement Only Mixes with Different Calcium Sulfates TABLE 15.1 shows the raw material composition of the mixture composition investigated. The anhydrous calcium sulfate used in this example was USG SNOW WHITE FILLER. The high shear mixer used in this example was PERLS hand held ME 140 mixer operated manually with RPM greater than 450. The mixing was performed for 4 minutes.

TABLE 15.1

Compositions investigated in Example 15

| Raw Material | Mix 1 | Mix 2 |
|---|---|---|
| Fly Ash Class C (grams) | 10345 | 10345 |
| Calcium Aluminate Cement (grams) | 3103 | 3103 |
| Calcium Sulfate Hemihydrate (grams) | — | 776 |
| Anhydrous Calcium Sulfate (grams) | 1552 | 776 |
| Total Cementitious Materials (grams) | 15000 | 15000 |
| Sand A (grams) | 17250 | 17250 |
| Potassium Citrate (grams) | 300 | 300 |
| Superplasticizer (grams) | 75 | 75 |
| Rheology Modifier (grams) | 1.5 | 1.5 |

TABLE 15.1-continued

| Compositions investigated in Example 15 | | |
| --- | --- | --- |
| Raw Material | Mix 1 | Mix 2 |
| Defoamer (grams) | 30 | 30 |
| Lithium Carbonate (grams) | 75 | 75 |
| Polymer (grams) | 750 | 750 |
| Water (grams) | 3300 | 3300 |
| Water/Cementitious Materials Ratio | 0.22:1 | 0.22:1 |
| Sand A/Cementitious Materials Ratio | 1.15:1 | 1.15:1 |

TABLE 15.2 shows the slump and setting times of the geopolymer compositions of Example 15. TABLE 15.3 shows the compressive strength behavior of the developed geopolymeric cementitious compositions of Example 15.

TABLE 15.2

| Workability (Slump - 2" × 4") and Setting Time (Vicat) | | | |
| --- | --- | --- | --- |
| Mix # | Slump (inches) | Initial Set (mins) | Final Set (mins) |
| 1 | 7.5 | 21 | 28 |
| 2 | 7.5 | 22 | 31 |

TABLE 15.3

| | Compressive Strength (in psi) | | | | |
| --- | --- | --- | --- | --- | --- |
| Mix # | 2 hr | 4 hr | 24 hr | 7 days | 28 days |
| 1 | 2618 | 4202 | 6851 | 9449 | 11241 |
| 2 | 2589 | 4416 | 6668 | 9597 | 11448 |

TABLE 15.4 shows the freeze-thaw durability behavior of the developed geopolymeric cementitious compositions of some embodiments of the invention comprising of fly ash, calcium aluminate, anhydrous calcium sulfate, calcium sulfate hemihydrate and alkali citrate investigated in Example 15. All formulations investigated in this example performed extremely well even after being subjected to 1200 freeze-thaw cycles. It is noteworthy that the relative dynamic modulus values were found to be above 100%. The calculated durability factors (DF), per ASTM C666 for M=300 cycles, for the mixes investigated in this example were found to be more than 100.

TABLE 15.4

| Mix # | | Freeze-Thaw Durability Performance | | | | | |
| --- | --- | --- | --- | --- | --- | --- | --- |
| | | 0 cycles | 100 cycles | 200 cycles | 300 cycles | 900 cycles | 1200 cycles |
| 1 | Compressive | 9362 | 9522 | 9144 | 9572 | 8544 | NA |
| 2 | Strength (psi) | 9654 | 10141 | 10691 | 8927 | 10129 | NA |
| 1 | Dynamic Modulus | 32.1 | 32.8 | 32.6 | 32.7 | 33.0 | 32.7 |
| 2 | (GPa) | 31.9 | 32.4 | 32.5 | 33.1 | 33.2 | 33.4 |
| 1 | Relative Dynamic | 100 | 102 | 102 | 103 | 103 | 103 |
| 2 | Modulus (%) | 100 | 102 | 102 | 104 | 104 | 105 |

TABLE 15.5 shows the slurry density, air content, and yield of the geopolymeric cementitious compositions of Example 15. The yield, representing the total volume of slurry produced in cubic feet, was calculated for 50 pounds of dry material consisting of cementitious materials and additives (i.e., 50 pounds mixture of cementitious materials and additives) when mixed with fine aggregate and water.

TABLE 15.5

| Slurry Density, Air Content and Yield | | | |
| --- | --- | --- | --- |
| Mix # | Slurry Density (pcf) | Air Content (%) | Yield (cu. ft.) |
| 1 | 130.2 | 6.5 | 0.87 |
| 2 | 131.0 | 6.4 | 0.87 |

Example 16

Salt Scaling and Tensile Bond Strength Performance of Calcium Aluminate Cement Only Mixes TABLE 16.1 shows the raw material composition of the mixture composition investigated. The anhydrous calcium sulfate used in this example was USG SNOW WHITE FILLER. The high shear mixer used in this example was PERLS hand held ME 140 mixer operated manually with RPM greater than 450. The mixing was performed for 4 minutes.

TABLE 16.1

| Compositions investigated in Example 16 | |
| --- | --- |
| Raw Material | Mix 1 |
| Fly Ash Class C (grams) | 11538 |
| Calcium Aluminate Cement (grams) | 2308 |
| Anhydrous Calcium Sulfate (grams) | 1154 |
| Total Cementitious Materials (grams) | 15000 |
| Sand A (grams) | 17250 |
| Potassium Citrate (grams) | 300 |
| Superplasticizer (grams) | 75 |
| Rheology Modifier (grams) | 1.5 |
| Defoamer (grams) | 30 |
| Lithium Carbonate (grams) | 75 |
| Polymer (grams) | 750 |
| Water (grams) | 3300 |
| Water/Cementitious Materials Ratio | 0.22:1 |
| Sand A/Cementitious Materials Ratio | 1.15:1 |

TABLE 16.2 shows the slump and setting times of the geopolymer compositions discussed in Example 16. TABLE 16.3 shows the compressive strength behavior of the developed geopolymeric cementitious compositions investigated in Example 16. TABLE 16.4 shows the freeze-thaw durability behavior of the developed geopolymeric cementitious composition of Example 16. All formulations investigated in this example performed extremely well even after being subjected to 900 freeze-thaw cycles. It is noteworthy that the relative dynamic modulus values were found to be above 100%. The calculated durability factors (DF), per ASTM C666 for M=300 cycles, for the mixes investigated in this example were found to be more than 100. The formulation used in this example was same as the one illustrated in mix 1 of example 15. The mix had an air content of about 6.5% and slurry density of about 130 pcf.

TABLE 16.2

| Workability (Slump - 2" × 4") and Setting Time (Vicat) | | | |
| --- | --- | --- | --- |
| Mix # | Slump (inches) | Initial Set (mins) | Final Set (mins) |
| 1 | 8.25 | 22 | 26 |

TABLE 16.3

| | Compressive Strength (in psi) | | | | |
|---|---|---|---|---|---|
| Mix # | 2 hr | 4 hr | 24 hr | 7 days | 28 days |
| 1 | 1760 | 3115 | 5787 | 8789 | 9479 |

TABLE 16.4

Freeze-Thaw Durability Performance

| | 0 cycles | 100 cycles | 200 cycles | 300 cycles | 900 cycles |
|---|---|---|---|---|---|
| Compressive Strength (psi) | 7466 | 8348 | 8616 | 9182 | 4682 |
| Dynamic Modulus (GPa) | 29.6 | 31.4 | 31.8 | 32.0 | 33.6 |
| Relative Dynamic Modulus (%) | 100 | 106 | 108 | 109 | 113 |

Salt Scaling Performance

Salt scaling performance of geopolymeric cementitious compositions of the invention investigated in this example and in the following examples were performed based on ASTM C 672/C672M-12, Standard Test Method for Scaling Resistance of Concrete Surfaces Exposed to Deicing Chemicals, ASTM, published 2012. This is the standard test method for Scaling Resistance of Concrete Surface Exposed to Deicing Chemicals. It covers the determination of the resistance to scaling (local flaking or peeling of a finished concrete surface) of a horizontal concrete surface exposed to freeze-thaw cycles in the presence of deicing chemicals. The test is intended for use in evaluating this surface resistance qualitatively by visual examination. In the test the specimens are placed in a solution of calcium chloride and water (or sodium chloride and water) with a concentration that imitates deicing salts; they are then placed alternatively in a freezing environment and a room temperature environment. This cycle is repeated daily and the surface is flushed off thoroughly at the end of every 5 cycles to visually examine the surface. Generally, 50 cycles is sufficient to evaluate the surface and the condition of the surface is reported using a rating scale from 0 to 5; meaning there is no scaling present and 5 indicating there is severe scaling (coarse aggregate is visible over the entire surface). TABLE 16.5 shows the Visual rating based on ASTM C672 for this standard test.

Figure 3A:
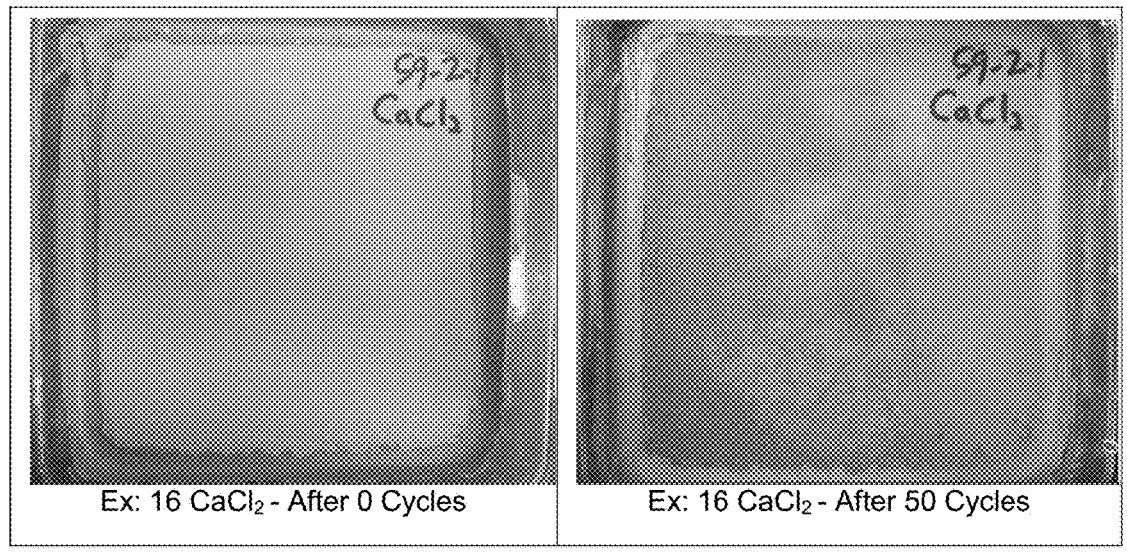
FIG. 3A shows the salt scaling performance using calcium chloride solution for Example 16.
Figure 3B:
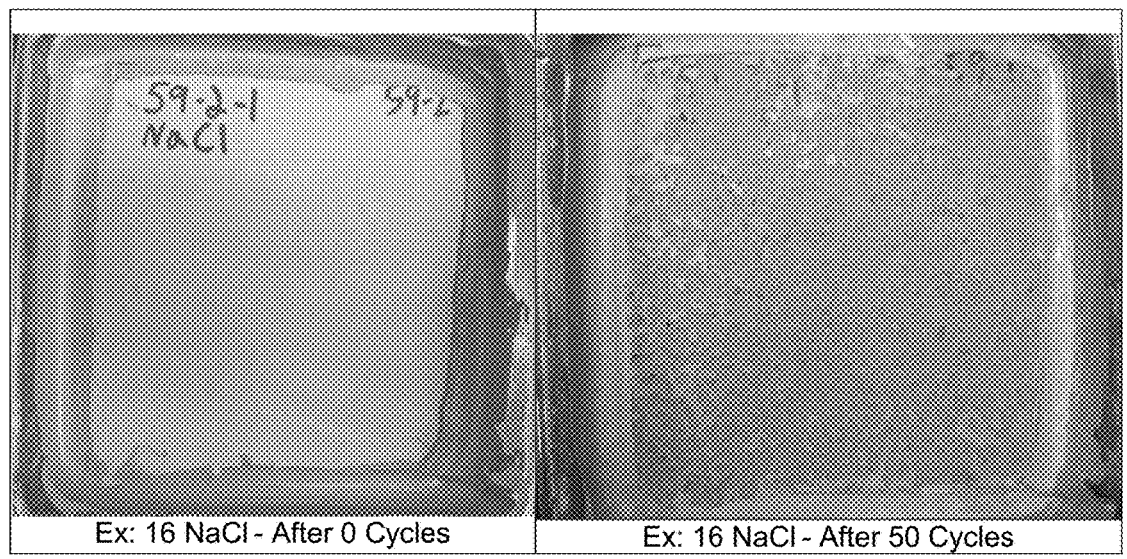
FIG. 3B shows the salt scaling performance using sodium chloride solution for Example 16.

In this salt scaling resistance test two different salt solutions were used for the study—calcium chloride solution and sodium chloride solution. The salt solution has a concentration such that each 100 mL of solution contains 4 g of anhydrous salt. Visual observation was performed and mass change was measured after different freeze-thaw cycles. The change in mass helps in quantifying the amount of scaled material. According to the ASTM C928—Standard Specification for Packaged, Dry, Rapid-Hardening Cementitious Materials for Concrete Repairs, the maximum scaled material after 25 cycles of freezing and thawing under deicing salts should not be more than 5 kg/m². TABLE 16.6 shows the visual rating scale for salt scaling performance according to the ASTM C672 standard for the developed composition of Example 16. The mass change was also determined. There was no mass loss using calcium chloride salt solution even after 50 cycles. Using sodium chloride salt solution there was no mass loss after 25 cycles and the mass loss after 50 cycles was only 0.11% which corresponds to about 0.15 kg/m² scaling. It is noteworthy that this amount of scaling is extremely small and negligible when compared to the 5 kg/m² allowable scaling amount specified in the ASTM C928 standard after 25 cycles. FIGS. 3A and 3B also show the salt scaling behavior of geopolymeric cementitious compositions of the invention investigated in Example 16. These results demonstrate the tested composition provided excellent salt-scaling resistance.

TABLE 16.5

Visual rating based on ASTM C672

| Rating | Condition of Surface |
|---|---|
| 0 | no scaling |
| 1 | very slight scaling (3 mm [⅛ in.] depth, max, no coarse aggregate visible) |
| 2 | slight to moderate scaling |
| 3 | moderate scaling (some coarse aggregate visible) |
| 4 | moderate to severe scaling |

TABLE 16.6

Salt-Scaling Performance

| Salt | | 0 cycles | 10 cycles | 25 cycles | 50 cycles |
|---|---|---|---|---|---|
| Calcium Chloride (4 wt. %) | Mass change (%) | 0.00 | +0.37 | +0.36 | +0.31 |
| | Visual rating | 0 | 0 | 0 | 0 |
| Sodium Chloride (4 wt. %) | Mass change (%) | 0.00 | +0.30 | +0.30 | −0.11 |
| | Visual rating | 0 | 0 | 0 | 1 |

Tensile Bond Test

The tensile bond strength of geopolymeric cementitious compositions of the invention investigated in this example and in the following examples were performed based on ASTM C1583. This test was performed on the surface of a geopolymer material after the material was applied to the prepared concrete surface. The test specimens with 50 mm diameter and 10 mm depth were formed on the concrete surface. A steel disk was bonded to the top surface of the test specimen. A tensile load was applied to the steel disk until failure occurred. The failure load and the failure modes were recorded and the nominal tensile stress at failure was calculated. TABLE 16.7 shows the tensile bond performance of the developed geopolymeric cementitious compositions of some embodiments of the invention in Example 16.

TABLE 16.7

| Tensile Bond Test Data (psi) | | |
|---|---|---|
| 24 hr | 7 days | 28 days |
| 192 | 141 | 167 |

TABLE 16.8 shows the slurry density, air content and yield of the geopolymeric cementitious composition of Example 16. The yield, representing the total volume of slurry produced in cubic feet, was calculated for 50 pounds of dry material consisting of cementitious materials and additives (i.e., 50 pounds mixture of cementitious materials and additives) when mixed with fine aggregate and water.

TABLE 16.8

| Slurry Density, Air Content and Yield | | |
|---|---|---|
| Slurry Density (pcf) | Air Content (%) | Yield (cu. ft.) |
| 132.1 | 7.8% | 0.86 |

Example 17

Freeze-thaw Durability Performance of Calcium Sulfoaluminate Cement Only Mixes

TABLE 17.1 shows the raw material composition of the mixture composition investigated. The calcium sulfate dihydrate used in this example was USG TERRA ALBA. The mixer used in this example was a PERLS high shear hand held ME 140 mixer operated manually with RPM greater than 450. The mixing was performed for 4 minutes.

TABLE 17.1

| Compositions investigated in Example 17 | | |
|---|---|---|
| Raw Material | Mix 1 | Mix 2 |
| Fly Ash Class C (grams) | 7692 | 7692 |
| Calcium Sulfoaluminate Cement (grams) | 1538 | 1538 |
| Calcium Sulfate Dihydrate (grams) | 769 | 769 |
| Total Cementitious Materials (grams) | 10000 | 10000 |
| Sand A (grams) | 11500 | 11500 |
| Potassium Citrate (grams) | 200 | 200 |
| Superplasticizer (grams) | 50 | 50 |
| Rheology Modifier (grams) | 0.6 | 0 |
| Defoamer (grams) | 20 | 20 |
| Lithium Carbonate (grams) | 50 | 50 |
| Water (grams) | 3000 | 2500 |
| Water/Cementitious Materials Ratio | 0.30:1 | 0.25:1 |
| Sand A/Cementitious Materials Ratio | 1.15:1 | 1.15:1 |

TABLE 17.2 shows the 28 days compressive strength behavior of the developed geopolymeric cementitious compositions of Example 17.

TABLE 17.2

| Compressive Strength (in psi) | |
|---|---|
| Mix # | 28 days |
| 1 | 5852 |
| 2 | 9061 |

TABLE 17.3 shows the freeze-thaw durability behavior of the developed geopolymeric cementitious compositions of Example 17. The formulations discussed in this example performed extremely well even after being subjected to 900 freeze-thaw cycles.

TABLE 17.3

| Freeze-Thaw Durability Performance | | | | | | | |
|---|---|---|---|---|---|---|---|
| Mix # | | 0 cycles | 100 cycles | 200 cycles | 300 cycles | 600 cycles | 900 cycles |
| 1 | Compressive Strength (psi) | 8485 | 6664 | 6260 | 6818 | 7476 | 6661 |
| 2 | | 10912 | 11206 | 11320 | 11226 | 11621 | 12553 |

Example 18

Salt Scaling and Tensile Bond Strength Performance of Calcium Sulfoaluminate Cement Only Mixes TABLE 18.1 shows the raw material composition of the mixture composition investigated. Calcium sulfate dihydrate used in this example was USG TERRA ALBA. The mixer used in this example was a PERLS high shear hand held ME 140 mixer operated manually with RPM greater than 450. The mixing was performed for 4 minutes.

TABLE 18.1

| Compositions investigated in Example 18 | |
|---|---|
| Raw Material | Mix 1 |
| Fly Ash Class C (grams) | 7692 |
| Calcium Sulfoaluminate Cement (grams) | 1538 |
| Calcium Sulfate Dihydrate (grams) | 769 |
| Total Cementitious Materials (grams) | 10000 |
| Sand A (grams) | 11500 |
| Potassium Citrate (grams) | 200 |
| Superplasticizer (grams) | 50 |
| Rheology Modifier (grams) | 3.0 |
| Defoamer (grams) | 20 |
| Lithium Carbonate (grams) | 50 |
| Polymer (grams) | 500 |
| Water (grams) | 2500 |
| Water/Cementitious Materials Ratio | 0.25:1 |
| Sand A/Cementitious Materials Ratio | 1.15:1 |

TABLE 18.2 shows the setting times of the geopolymer compositions discussed in example 18.

TABLE 18.2

| Setting Time (Vicat) | |
|---|---|
| Initial Set (mins) | Final Set (mins) |
| 106 | 113 |

TABLE 18.3 shows the compressive strength behavior of the developed geopolymeric cementitious compositions of some embodiments of the invention investigated in Example 18. TABLE 18.4 shows the mass change and visual ratings for salt scaling performance of the developed geopolymeric cementitious compositions of Example 18.

TABLE 18.3

| Compressive Strength (in psi) | |
|---|---|
| 7 days | 56 days |
| 6059 | 7454 |

TABLE 18.4 shows the visual rating scale for salt scaling performance according to the ASTM C672 standard for the developed composition of Example 18. The mass change was also determined. There was no mass loss using sodium chloride salt solution even after 75 cycles. Using calcium chloride salt solution there was no mass loss even after 50 cycles and the mass loss after 75 cycles was only 0.26%, which corresponds to about 0.36 kg/m$^2$ scaling. It is noteworthy that this amount of scaling is extremely small and negligible when compared to the 5 kg/m$^2$ allowable scaling amount specified in the ASTM C928 standard after 25 cycles.

TABLE 18.4

| Salt | | 0 cycles | 10 cycles | 25 cycles | 50 cycles | 75 cycles |
|---|---|---|---|---|---|---|
| Calcium Chloride (4%) | Mass change (%) | 0.00 | +0.05 | +0.92 | +0.27 | −0.26 |
| | Visual rating | 0 | 0 | 0 | 0 | 1 |
| Sodium Chloride (4%) | Mass change (%) | 0.00 | +0.18 | +0.85 | +0.80 | +0.44 |
| | Visual rating | 0 | 0 | 0 | 0 | 0 |

Salt-Scaling Performance

Figure 4A:
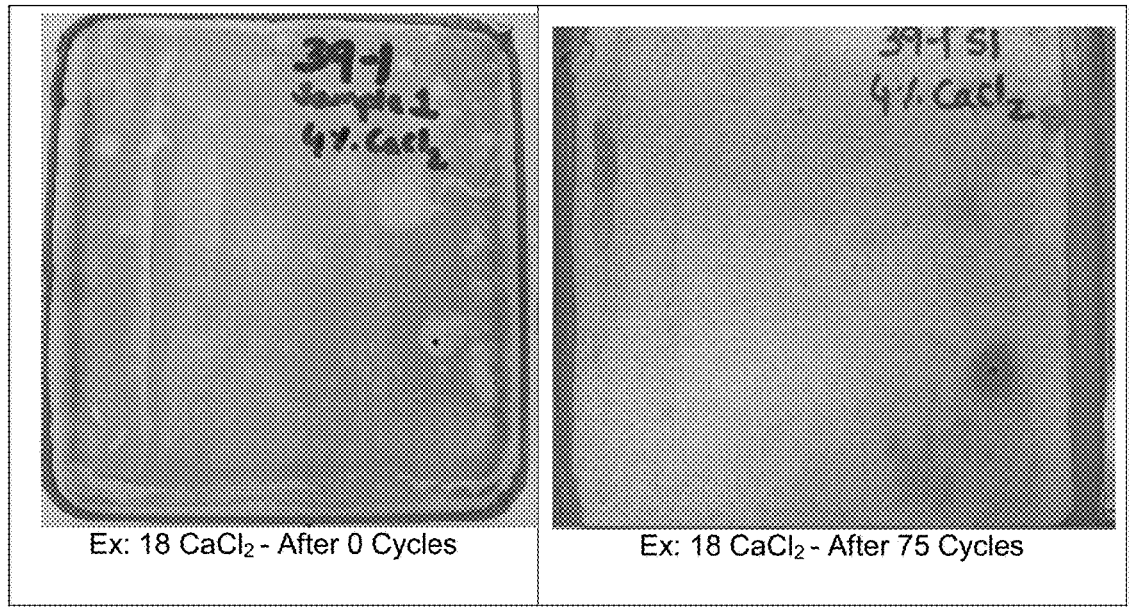
FIG. 4A shows the salt scaling performance using calcium chloride solution for Example 18.
Figure 4B:
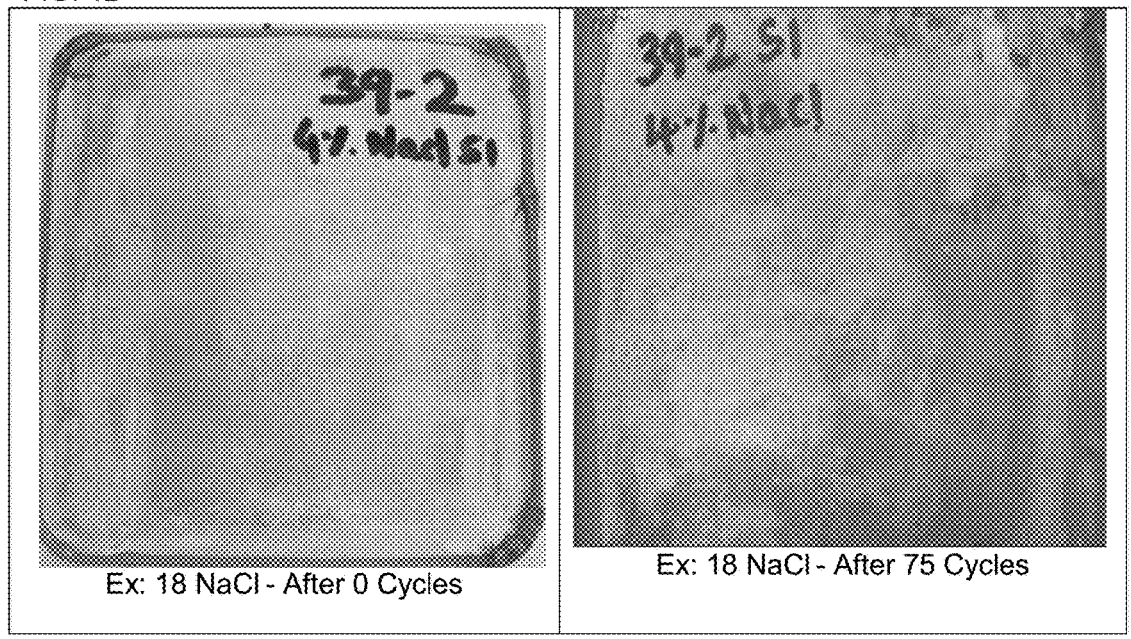
FIG. 4B shows the salt scaling performance using sodium chloride solution for Example 18.

FIGS. 4A and 4B shows the salt scaling behavior of geopolymeric cementitious compositions of the invention investigated in Example 18.

Figure 5:
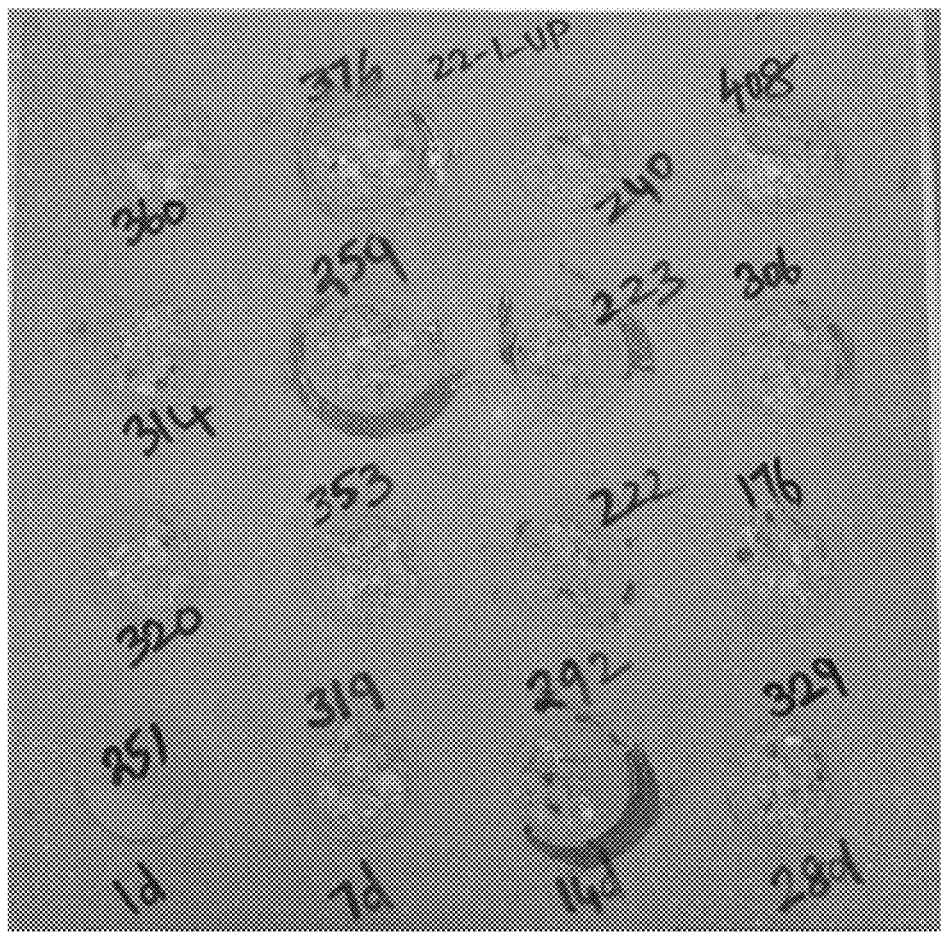
FIG. 5 shows the tensile bond testing for Example 18.

TABLE 18.5 shows the tensile bond performance of the developed geopolymeric cementitious compositions of Example 18. FIG. 5 also shows the tensile bond testing for compositions of Example 18.

TABLE 18.5

Tensile Bond Test Data (psi)

| 24 hr | 7 days | 28 days |
|---|---|---|
| 311 | 327 | 305 |

Example 19

Freeze-thaw Durability Performance of Mixes with Coarse Aggregate (Gravel)

TABLE 19.1 shows the raw material composition of the mixture compositions investigated. Mix 1 had no gravel and Mix 2 had Gravel A Quickrete® All Purpose Gravel. Mixing was carried out using high shear hand mixer and was mixed for 4 minutes.

TABLE 19.1

Compositions investigated in Example 19

| Raw Material | Mix 1 | Mix 2 |
|---|---|---|
| Fly Ash Class C (grams) | 9836 | 9836 |
| Calcium Sulfoaluminate Cement (grams) | 1967 | 1967 |
| Calcium Aluminate Cement (grams) | 1475 | 1475 |
| Calcium Sulfate Hemihydrate (grams) | 1721 | 1721 |
| Total Cementitious Materials (grams) | 15000 | 15000 |
| Sand A (grams) | 17250 | 17250 |
| Gravel A (grams) | 0 | 15000 |
| Potassium Citrate (grams) | 300 | 300 |
| Superplasticizer (grams) | 75 | 75 |
| Rheology Modifier (grams) | 1.5 | 1.5 |
| Defoamer (grams) | 30 | 30 |
| Lithium Carbonate (grams) | 75 | 75 |
| Polymer (grams) | 750 | 750 |
| Water (grams) | 3300 | 3300 |
| Water/Cementitious Materials Ratio | 0.22:1 | 0.22:1 |
| Sand A/Cementitious Materials Ratio | 1.15:1 | 1.15:1 |
| Gravel A/Cementitious Materials Ratio | 0.00:1 | 1.00:1 |
| Mixing Time (minutes) | 4 | 4 |

The slurry density, air content, and yield of mixes with Gravel/Cementitious Materials Ratios of 1.12:1, 1.45:1, and 1.67:1 were discussed in Example 13. Thus, these parameters were not retested for the present example.

TABLE 19.2 shows the compressive strength behavior of the developed geopolymeric cementitious compositions investigated in Example 19.

TABLE 19.2

Compressive Strength (in psi)

| Mix # | 2 hr | 4 hr | 24 hr | 7 days | 28 days |
|---|---|---|---|---|---|
| 1 | 2266 | 4939 | 7938 | 11488 | 12100 |
| 2 | NA | 4648 | 7902 | 10559 | 12444 |

TABLE 19.3 shows the freeze-thaw durability behavior of the formulations of the invention investigated in Example 19. It is noteworthy that the Mix 2 with gravel had more than 90% relative dynamic modulus even after being subjected to 900 freeze-thaw cycles. The calculated durability factors (DF), per ASTM C666 for M=300 cycles, for the mixes investigated in this example were found to be more than 95.

TABLE 19.3

Freeze-Thaw Durability Performance

| Mix # | | 0 cycles | 100 cycles | 200 cycles | 300 cycles | 900 cycles |
|---|---|---|---|---|---|---|
| 1 | Compressive Strength | 9618 | 11378 | 10632 | 11355 | 9645 |
| 2 | (psi) | 10203 | 10435 | 9934 | 9509 | Broken |
| 1 | Dynamic Modulus | 33.0 | 33.7 | 34.0 | 34.4 | 35.0 |
| 2 | (GPa) | 38.4 | 38.7 | 38.8 | 36.0 | 34.6 |
| 1 | Relative Dynamic | 100 | 102 | 103 | 104 | 107 |
| 2 | Modulus (%) | 100 | 101 | 101 | 96 | 92 |

TABLE 19.4 shows the mass change and visual ratings for the salt scaling performance of the developed geopolymeric cementitious compositions investigated in Example 19. For mix 1 there was no mass loss using sodium chloride salt solution even after 75 cycles. Using calcium chloride salt solution there was no mass loss even after 50 cycles and the mass loss after 75 cycles was only 0.07% which corresponds to 0.11 kg/m² scaling. For mix 2 there was no mass loss using both calcium chloride and sodium chloride salt solutions even after 75 cycles. It is noteworthy that this amount of scaling is extremely small and negligible when compared to the 5 kg/m² allowable scaling amount specified in the ASTM C928 standard after 25 cycles.

Figure 6A:
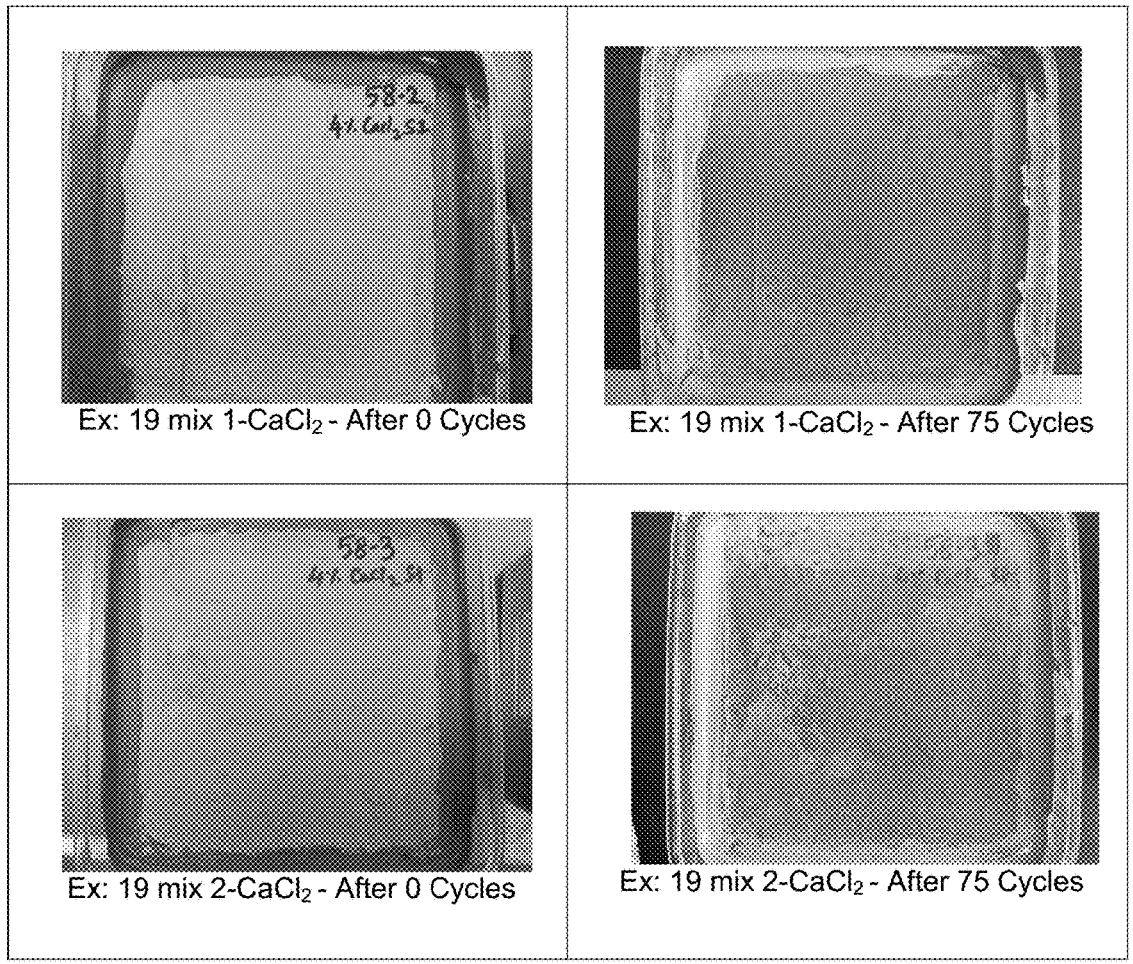
FIG. 6A shows the salt scaling performance using calcium chloride solution for Example 19.
Figure 6B:
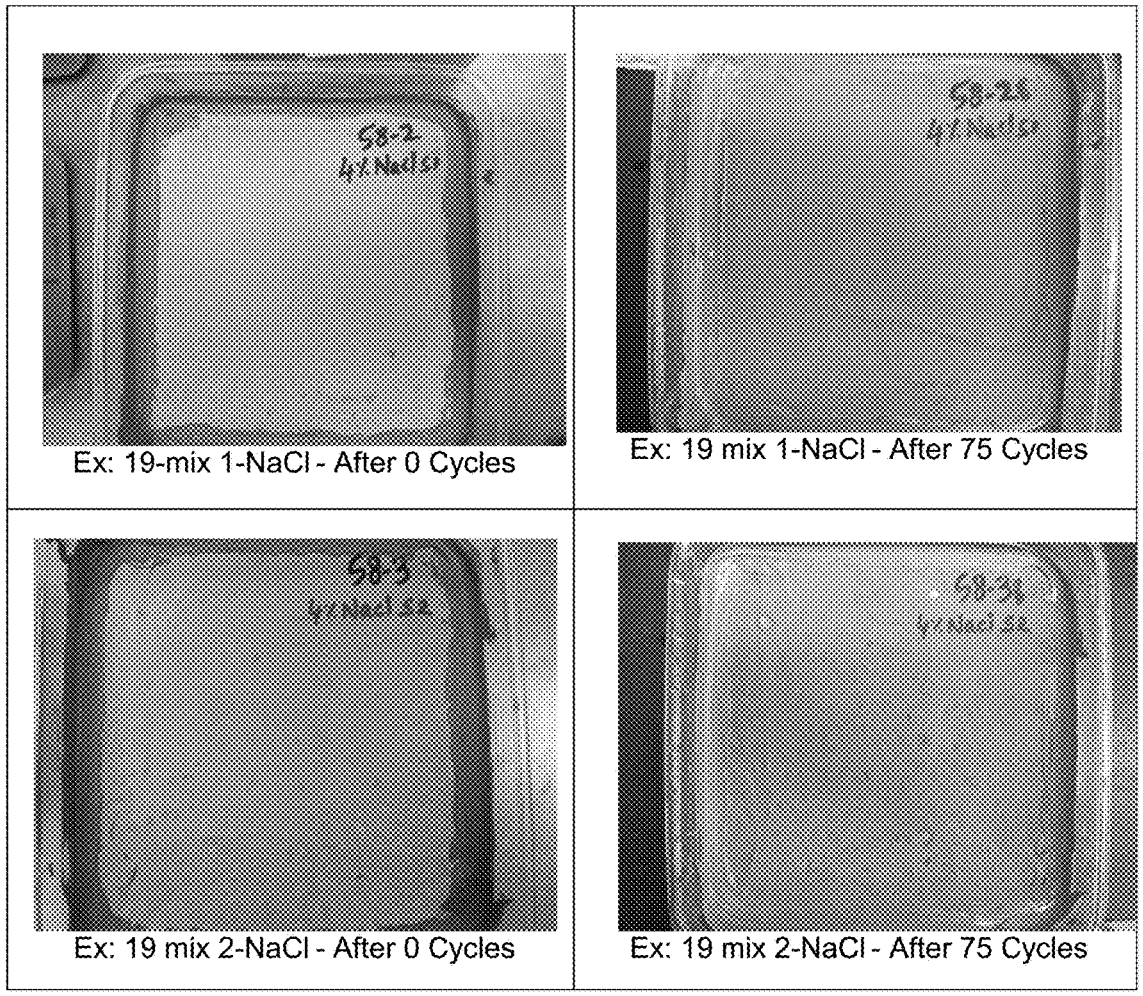
FIG. 6B shows the salt scaling performance using sodium chloride solution for Example 19.

FIG. 6A and FIG. 6B show the salt scaling behavior of geopolymeric cementitious compositions of the invention investigated in Example 19.

TABLE 19.4

| Mix # | Salt | Properties | 0 cycles | 10 cycles | 25 cycles | 50 cycles | 75 cycles |
|---|---|---|---|---|---|---|---|
| 1 | Calcium Chloride (4%) | Mass change (%) | +0.00 | +0.07 | +0.01 | +0.00 | −0.07 |
| | | Visual rating | 0 | 0 | 0 | 0 | 1 |
| | Sodium Chloride (4%) | Mass change (%) | +0.00 | +0.13 | +0.06 | +0.15 | +0.07 |
| | | Visual rating | 0 | 0 | 0 | 0 | 0 |
| 2 | Calcium Chloride (4%) | Mass change (%) | +0.00 | +0.40 | +0.39 | +0.46 | +0.47 |
| | | Visual rating | 0 | 0 | 0 | 0 | 0 |
| | Sodium Chloride (4%) | Mass change (%) | +0.00 | +0.16 | +0.11 | +0.17 | +0.11 |
| | | Visual rating | 0 | 0 | 0 | 0 | 0 |

Example 20

Freeze-thaw Durability and Salt Scaling Performance of Inventive Compositions with Air-entraining Agent without and with Gravel Both defoamers and air entraining agents were present in order to obtain a stable system. The TABLE 20.1 shows the raw material composition of the mixture composition investigated. Mixes 3 and 4 contains coarse aggregates in the form of Gravel A. The low shear mixer used in this example was a KUSHLAN 1000 DD drum type concrete mixer, having 10 cu. ft capacity, operated at a drum RPM of 18. Mixing was performed for 6 minutes.

TABLE 20.1

Compositions investigated in Example 20

| Raw Material | Mix 1 | Mix 2 | Mix 3 | Mix 4 |
|---|---|---|---|---|
| Fly Ash Class C (grams) | 6557 | 6557 | 5246 | 5246 |
| Calcium Sulfoaluminate Cement (grams) | 1311 | 1311 | 1049 | 1049 |
| Calcium Aluminate Cement (grams) | 984 | 984 | 787 | 787 |
| Calcium Sulfate Hemihydrate (grams) | 1148 | 1148 | 918 | 918 |
| Total Cementitious Materials (grams) | 10000 | 10000 | 8000 | 8000 |
| Sand A (grams) | 11500 | 11500 | 9200 | 9200 |
| Gravel A (grams) | 0 | 0 | 11600 | 11600 |
| Potassium Citrate (grams) | 200 | 200 | 160 | 160 |
| Superplasticizer (grams) | 50 | 50 | 40 | 40 |
| Rheology Modifier (grams) | 1 | 1 | 0.8 | 0.8 |
| Defoamer (grams) | 3 | 3 | 2.4 | 2.4 |
| Air Entraining Agent (grams) | 5 | 5 | 4 | 4 |
| Lithium Carbonate (grams) | 50 | 50 | 40 | 40 |
| Polymer (grams) | 500 | 500 | 400 | 400 |
| Water (grams) | 2200 | 2000 | 1760 | 1600 |
| Water/Cementitious Materials Ratio | 0.22:1 | 0.20:1 | 0.22:1 | 0.20:1 |
| Sand A/Cementitious Materials Ratio | 1.15:1 | 1.15:1 | 1.15:1 | 1.15:1 |
| Gravel A/Cementitious Materials Ratio | 0.00:1 | 0.00:1 | 1.45:1 | 1.45:1 |
| Mixing Time (minutes) | 6 | 6 | 6 | 6 |

TABLE 20.2 shows the slurry density, air content, and yield of the geopolymeric cementitious compositions investigated of Example 20. The yield, representing the total volume of slurry produced in cubic feet, was calculated for 50 pounds of dry material consisting of cementitious materials and additives (i.e., 50 pounds mixture of cementitious materials and additives) when mixed with fine aggregate, coarse aggregate (when present) and water.

TABLE 20.3 shows the compressive strength behavior of the developed geopolymeric cementitious of Example 20.

TABLE 20.2

Slurry Density, Air Content and Yield

| Mix # | Slurry Density (pcf) | Air Content (%) | Yield (cu. ft.) |
|---|---|---|---|
| 1 | 129.7 | 8.8 | 0.87 |
| 2 | 131.9 | 8.8 | 0.85 |
| 3 | 140.2 | 7.2 | 1.29 |
| 4 | 143.6 | 5.7 | 1.25 |

TABLE 20.3

Compressive Strength (in psi)

| Mix # | 2 hr | 4 hr | 24 hr | 7 days | 28 days |
|---|---|---|---|---|---|
| 1 | 2453 | 3512 | 5933 | 9658 | 10383 |
| 2 | 3021 | 4153 | 6673 | 9931 | 10891 |
| 3 | 2545 | 4003 | 6110 | 9349 | 10046 |
| 4 | 2539 | 4105 | 6654 | 9988 | 9481 |

TABLE 20.4 shows the freeze-thaw durability behavior of the formulations investigated in Example 20. All formulations investigated in this example performed extremely well when subjected to freeze-thaw cycles. It is noteworthy that the relative dynamic modulus values were found to be above 100%. The calculated durability factors (DF), per ASTM C666 for M=300 cycles, for the mixes investigated in this example were found to be more than 100.

TABLE 20.4

Freeze-Thaw Durability Performance

| Mix # | | 0 cycles | 100 cycles | 200 cycles | 300 cycles |
|---|---|---|---|---|---|
| 1 | Dynamic | 32.0 | 32.4 | 32.9 | 32.7 |
| 2 | Modulus | 32.8 | 33.2 | 34.1 | 33.6 |
| 3 | (GPa) | 33.9 | 34.1 | 34.6 | 35.6 |
| 4 | | 36.9 | 36.8 | 36.5 | 37.3 |
| 1 | Relative | 100 | 101 | 101 | 101 |
| 2 | Dynamic | 100 | 101 | 103 | 103 |
| 3 | Modulus (%) | 100 | 100 | 101 | 103 |
| 4 | | 100 | 100 | 101 | 101 |

TABLE 20.5 shows the mass change and visual ratings for the salt scaling performance of the developed geopolymeric cementitious compositions investigated in Example 20. For all the mixes investigated in this example there was no mass loss using sodium chloride salt solutions even after 50 cycles. Using calcium chloride salt solution mix 1, 2 and 4 showed no mass loss after 50 cycles. Mix 3 with calcium chloride solution showed no mass loss after 25 cycles. After 50 cycles it experienced very little scaling. The scaled material after 50 cycles was only 0.10 kg/m² corresponding to 0.06% mass loss. It is noteworthy that this amount of scaling is extremely small and negligible when compared to the 5 kg/m² allowable scaling amount specified in the ASTM C928 standard after 25 cycles. These results demonstrate excellent salt-scaling resistance provided by the compositions of the invention.

TABLE 20.5

Salt-Scaling Performance

| Mix # | Salt | Properties | 0 cycles | 10 cycles | 25 cycles | 50 cycles |
|---|---|---|---|---|---|---|
| 1 | Calcium Chloride (4%) | Mass change (%) | 0.00 | +0.43 | +0.43 | +0.18 |
|   |   | Visual rating | 0 | 0 | 0 | 0 |
|   | Sodium Chloride (4%) | Mass change (%) | 0.00 | +0.29 | +0.47 | +0.58 |
|   |   | Visual rating | 0 | 0 | 0 | 0 |
| 2 | Calcium Chloride (4%) | Mass change (%) | 0.00 | +0.13 | +0.03 | +0.20 |
|   |   | Visual rating | 0 | 0 | 0 | 0 |
|   | Sodium Chloride (4%) | Mass change (%) | 0.00 | +0.05 | +0.09 | +0.06 |
|   |   | Visual rating | 0 | 0 | 0 | 0 |
| 3 | Calcium Chloride (4%) | Mass change (%) | 0.00 | +0.06 | +0.06 | −0.06 |
|   |   | Visual rating | 0 | 0 | 0 | 1 |
|   | Sodium Chloride (4%) | Mass change (%) | 0.00 | +0.17 | +0.20 | +0.17 |
|   |   | Visual rating | 0 | 0 | 0 | 0 |
| 4 | Calcium Chloride (4%) | Mass change (%) | 0.00 | +0.06 | +0.24 | +0.10 |
|   |   | Visual rating | 0 | 0 | 0 | 0 |
|   | Sodium Chloride (4%) | Mass change (%) | 0.00 | +0.17 | +0.22 | +0.16 |
|   |   | Visual rating | 0 | 0 | 0 | 0 |

Figure 7A:
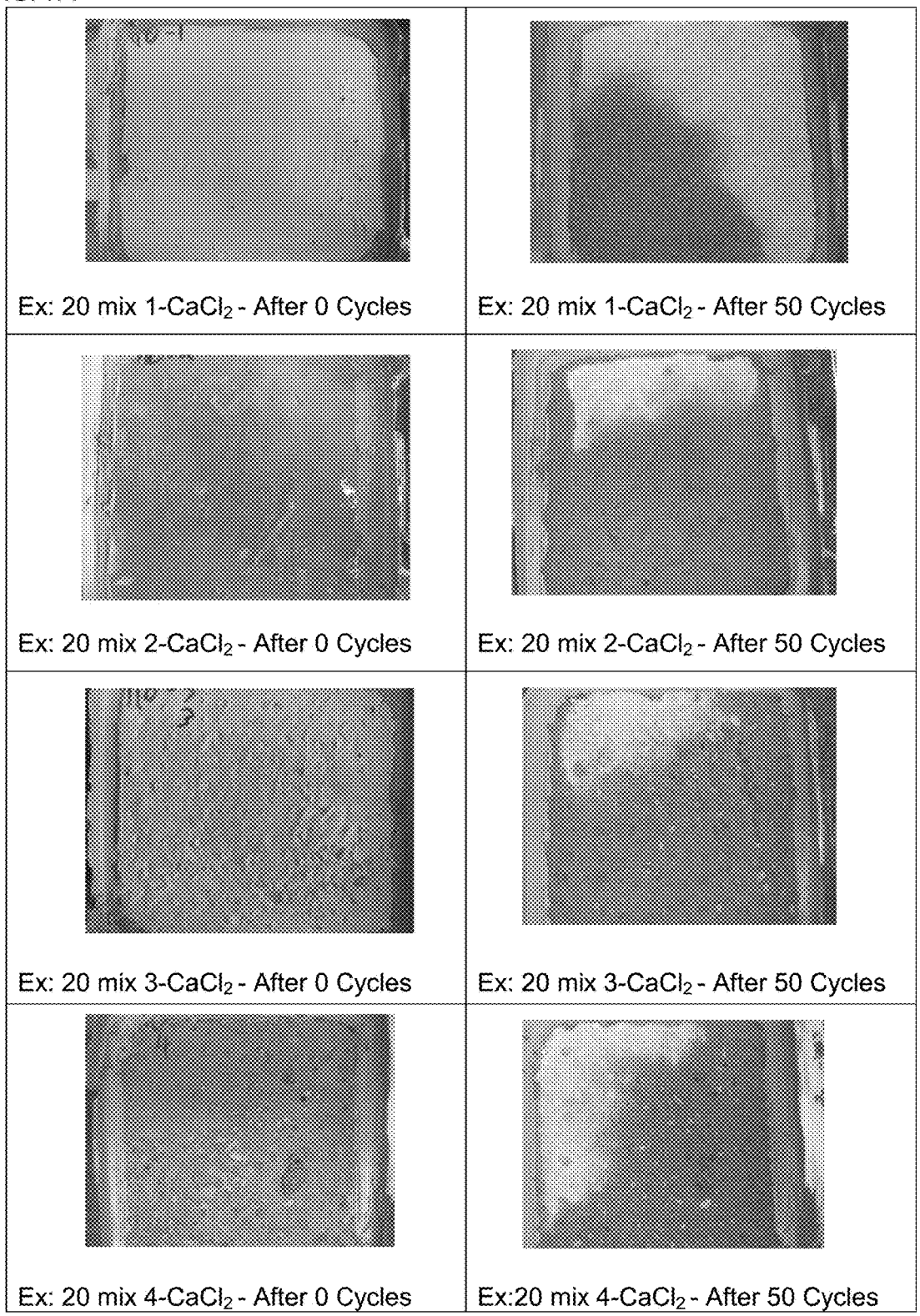
FIG. 7A shows the salt scaling performance using calcium chloride solution for Example 20.
Figure 7B:
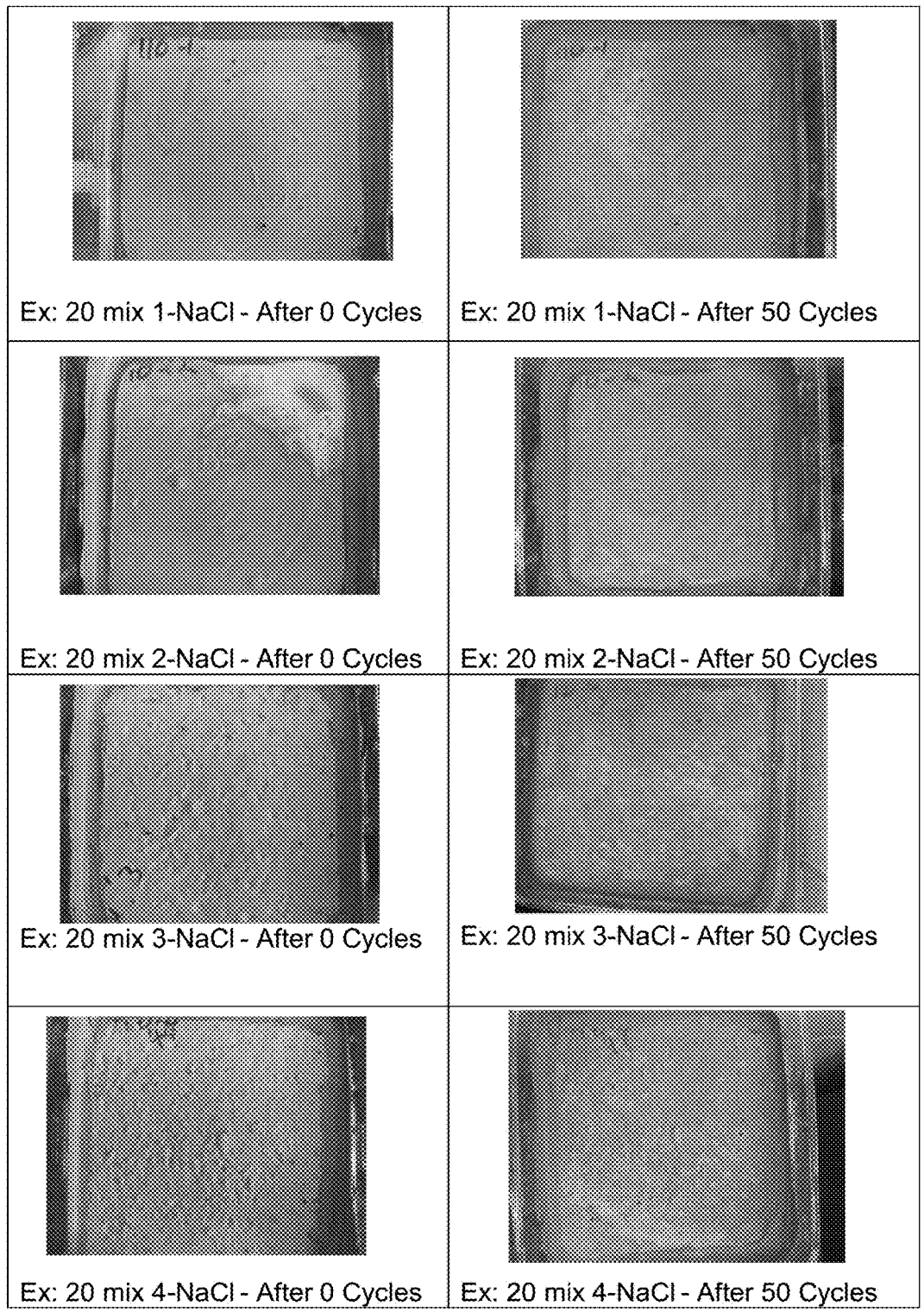
FIG. 7B shows the salt scaling performance using sodium chloride solution for Example 20.

FIGS. 7A and 7B show the salt scaling behavior of geopolymeric cementitious compositions of the invention investigated in Example 20.

Example 21

Freeze-thaw Durability Behavior of Compositions Investigated in Example 13

The raw material compositions and the mixing procedure employed in this example were the same as in TABLE 13.1 except for the water to cementitious materials ratio used in this example was 0.22:1. The freeze-thaw durability study was performed based on ASTM C 666—Procedure A. TABLE 21.1 shows the freeze-thaw durability behavior of the formulations investigated in Example 21. All compositions investigated demonstrated satisfactory freeze-thaw durability performance.

TABLE 21.1

Freeze-Thaw Durability Performance

| Mix # |  | 0 cycles | 100 cycles | 200 cycles | 300 cycles |
|---|---|---|---|---|---|
| 1 | Dynamic | 40.1 | 39.5 | 39.9 | 39.1 |
| 2 | Modulus | 41.3 | 39.5 | 37.6 | 36.9 |
| 3 | (GPa) | 41.2 | 39.9 | 37.6 | 33.2 |
| 1 | Relative | 100 | 98 | 99 | 97 |
| 2 | Dynamic | 100 | 96 | 91 | 89 |
| 3 | Modulus (%) | 100 | 96 | 91 | 80 |

Example 22

Compositions with High Air Content (Greater than 12 vol. %)

TABLE 22.1 shows the raw material composition of the mixture composition investigated. The high shear mixer used in this example was PERLS hand held ME 140 mixer operated manually at an RPM of 490. The mixing was performed for 4 minutes. Mix 1 had 0 wt. % defoamer, Mix 2 had 0.005 wt. % defoamer, and Mix 3 had 0.01 wt. % defoamer.

TABLE 22.1

Compositions investigated in Example 22

| Raw Material | Mix 1 | Mix 2 | Mix 3 |
|---|---|---|---|
| Fly Ash Class C (grams) | 6557 | 6557 | 6557 |
| Calcium Sulfoaluminate Cement (grams) | 1311 | 1311 | 1311 |
| Calcium Aluminate Cement (grams) | 984 | 984 | 984 |
| Calcium Sulfate Hemihydrate (grams) | 1148 | 1148 | 1148 |
| Total Cementitious Materials (grams) | 10000 | 10000 | 10000 |
| Sand A (grams) | 11500 | 11500 | 11500 |
| Potassium Citrate (grams) | 200 | 200 | 200 |
| Superplasticizer (grams) | 50 | 50 | 50 |
| Rheology Modifier (grams) | 1 | 1 | 1 |
| Defoamer (grams) | 0 | 0.5 | 1 |
| Air Entraining Agent (grams) | 5 | 5 | 5 |
| Lithium Carbonate (grams) | 50 | 50 | 50 |
| Polymer (grams) | 500 | 500 | 500 |
| Water (grams) | 2200 | 2200 | 2200 |
| Water/Cementitious Materials Ratio | 0.22 | 0.22 | 0.22 |
| Sand A/Cementitious Materials Ratio | 1.15 | 1.15 | 1.15 |
| Mixing Time (minutes) | 4 | 4 | 4 |

TABLE 22.2 shows the slurry density, air content and yield of mixes of the compositions of Example 22. The yield, representing the total volume of slurry produced in cubic feet, was calculated for 50 pounds of dry material consisting of cementitious materials and additives (i.e., 50 pounds mixture of cementitious materials and additives) when mixed with fine aggregate and water.

TABLE 22.3 shows the compressive strength behavior of the developed geopolymeric cementitious compositions of Example 22. Surprisingly these compositions despite containing such high amounts of air demonstrated very high compressive strengths.

TABLE 22.2

Slurry Density, Air Content and Yield

| Mix # | Slurry Density (pcf) | Air Content (%) | Yield (cu. ft.) |
|---|---|---|---|
| 1 | 119.3 | 19.0 | 0.95 |
| 2 | 119.0 | 15.0 | 0.95 |
| 3 | 121.1 | 14.5 | 0.94 |

TABLE 22.3

Compressive Strength (in psi)

| Mix # | 24 hr | 28 days |
|---|---|---|
| 1 | 4851 | 7493 |
| 2 | 4613 | 7663 |
| 3 | 4783 | 8152 |

TABLE 22.3 shows the freeze-thaw durability behavior of the formulations investigated in Example 22. Again surprisingly these compositions despite containing very high amount of air demonstrated impressive freeze-thaw durability performance.

TABLE 22.3

Freeze-Thaw Durability Performance

| Mix # | | 0 cycles | 100 cycles | 200 cycles |
|---|---|---|---|---|
| 1 | Dynamic Modulus | 25.7 | 25.8 | 26.0 |
| 2 | (GPa) | 25.4 | 25.7 | 26.0 |
| 3 | | 26.2 | 26.5 | 26.8 |
| 1 | Relative Dynamic | 100 | 100 | 101 |
| 2 | Modulus (%) | 100 | 101 | 102 |
| 3 | | 100 | 101 | 102 |

Example 23

Compositions with Both Sand and Gravel Extension when Both Calcium Sulfoaluminate and Calcium Aluminate Cement are Present TABLE 23.1 shows the raw material composition of the mixture compositions investigated. The low shear mixer used in this example was a KUSHLAN 350 DD drum type concrete mixer having 3.5 cu. ft. capacity, operated at a drum RPM of 18. The mixing was performed for 6 minutes. The sand and gravel used in this example were Sand B Hamilton Builders' Supply concrete sand and Gravel B Hamilton Builders' Supply pea gravel respectively. Sand B is considered fine aggregate.

TABLE 23.1

Compositions investigated in Example 23

| Raw Material | Mix 1 | Mix 2 | Mix 3 | Mix 4 |
|---|---|---|---|---|
| Fly Ash Class C (grams) | 3934 | 3279 | 2623 | 2623 |
| Calcium Sulfoaluminate Cement (grams) | 787 | 656 | 525 | 525 |
| Calcium Aluminate Cement (grams) | 590 | 492 | 393 | 393 |
| Calcium Sulfate Hemihydrate (grams) | 689 | 574 | 459 | 459 |
| Total Cementitious Materials (grams) | 6000 | 5000 | 4000 | 4000 |

TABLE 23.1-continued

Compositions investigated in Example 23

| Raw Material | Mix 1 | Mix 2 | Mix 3 | Mix 4 |
|---|---|---|---|---|
| Sand B (grams) | 9540 | 10600 | 8480 | 12720 |
| Gravel B (grams) | 9720 | 10800 | 17280 | 17280 |
| Potassium Citrate (grams) | 120 | 100 | 80 | 80 |
| Superplasticizer (grams) | 30 | 25 | 20 | 20 |
| Rheology Modifier (grams) | 0.6 | 0.5 | 0.4 | 0.4 |
| Defoamer (grams) | 1.8 | 1.5 | 1.2 | 1.2 |
| Air Entraining Agent (grams) | 3.0 | 2.5 | 2.0 | 2.0 |
| Lithium Carbonate (grams) | 30 | 25 | 20 | 20 |
| Polymer (grams) | 300 | 250 | 200 | 200 |
| Water (grams) | 1500 | 1400 | 1280 | 1400 |
| Water/Cementitious Materials Ratio | 0.25:1 | 0.28:1 | 0.32:1 | 0.35:1 |
| Sand B/Cementitious Materials Ratio | 1.59:1 | 2.12:1 | 2.12:1 | 3.18:1 |
| Gravel B/Cementitious Materials Ratio | 1.62:1 | 2.16:1 | 4.32:1 | 4.32:1 |
| Mixing Time (minutes) | 6 | 6 | 6 | 6 |

TABLE 23.2 shows the compressive strength behavior of the developed geopolymeric cementitious compositions investigated in Example 23. Surprisingly, the compressive strength performance for these compositions is significantly superior compared to those for the compositions consisting of calcium sulfoaluminate cement as the only aluminate cement in the mixture (Example 24) and also for the compositions consisting of calcium aluminate cement as the only aluminate cement in the mixture (Example 25). It was surprising that the 21 day compressive strength of the tested samples resulting from the mixes of Example 23 was greater than the 28 day compressive strength of the tested samples resulting from the mixes of Examples 24 and 25.

TABLE 23.2

Compressive Strength (in psi)

| Mix # | 24 hr | 7 days | 21 days |
|---|---|---|---|
| 1 | 6854 | 9479 | 11108 |
| 2 | 4954 | 6829 | 8101 |
| 3 | 5259 | 6370 | 7420 |
| 4 | 4166 | 5666 | 7062 |

TABLE 23.3 shows the slurry density, air content, and yield of the geopolymeric cementitious compositions of the invention investigated in Example 23. The yield, representing the total volume of slurry produced in cubic feet, was calculated for 50 pounds of dry material consisting of cementitious materials and additives (i.e., 50 pounds mixture of cementitious materials and additives) when mixed with fine aggregate, coarse aggregate and water.

TABLE 23.3

Slurry Density, Air Content and Yield

| Mix # | Slurry Density (pcf) | Air Content (%) | Yield (cu. ft.) |
|---|---|---|---|
| 1 | 143.5 | 4.0 | 1.46 |
| 2 | 147.5 | 6.2 | 1.77 |
| 3 | 149.4 | NA | 2.43 |
| 4 | 147.6 | 4.2 | 2.69 |

Example 24

Compositions with Both Sand and Gravel Extension when Only Calcium Sulfoaluminate Cement is Present TABLE 24.1 shows the raw material composition of the mixture compositions investigated. The mixes were activated with potassium citrate. The low shear mixer used in this example was a KUSHLAN 1000 DD drum type concrete mixer, having 10 cu. ft. capacity, operated at a drum RPM of 18. The mixing was performed for 6 minutes. The sand and gravel used in this example were Sand B Hamilton Builders' Supply concrete sand and Gravel B Hamilton Builders' Supply pea gravel, respectively.

TABLE 24.1

Compositions investigated in Example 24

| Raw Material | Mix 1 | Mix 2 | Mix 3 | Mix 4 |
|---|---|---|---|---|
| Fly Ash Class C (grams) | 4615 | 3846 | 3077 | 3077 |
| Calcium Sulfoaluminate Cement (grams) | 923 | 769 | 615 | 615 |
| Calcium Sulfate Hemihydrate (grams) | 462 | 385 | 308 | 308 |
| Total Cementitious Materials (grams) | 6000 | 5000 | 4000 | 4000 |
| Sand B (grams) | 9720 | 10800 | 8640 | 12960 |
| Gravel B (grams) | 9720 | 10800 | 17280 | 17280 |
| Potassium Citrate (grams) | 120 | 100 | 80 | 80 |
| Superplasticizer (grams) | 30 | 25 | 20 | 20 |
| Rheology Modifier (grams) | 0.6 | 0.5 | 0.4 | 0.4 |
| Defoamer (grams) | 1.8 | 1.5 | 1.2 | 1.2 |
| Air Entraining Agent (grams) | 3.0 | 2.5 | 2.0 | 2.0 |
| Lithium Carbonate (grams) | 30 | 25 | 20 | 20 |
| Polymer (grams) | 300 | 250 | 200 | 200 |
| Water (grams) | 1500 | 1500 | 1280 | 1400 |
| Water/Cementitious Materials Wt. Ratio | 0.25:1 | 0.30:1 | 0.32:1 | 0.35:1 |
| Sand B/Cementitious Materials Wt. Ratio | 1.62:1 | 2.16:1 | 2.16:1 | 3.24:1 |
| Gravel B/Cementitious Materials Wt. Ratio | 1.62:1 | 2.16:1 | 4.32:1 | 4.32:1 |
| Mixing Time (minutes) | 6 | 6 | 6 | 6 |

TABLE 24.2 shows the compressive strength behavior of the developed geopolymeric cementitious compositions investigated in Example 24.

TABLE 24.2

Compressive Strength (in psi)

| Mix # | 24 hr | 7 days | 28 days |
|---|---|---|---|
| 1 | 3195 | 6130 | 7618 |
| 2 | 1998 | 4435 | 5530 |
| 3 | 1826 | 4113 | 5238 |
| 4 | 1452 | 3591 | 4557 |

TABLE 24.3 shows the slurry density, air content, and yield of the geopolymeric cementitious compositions of the invention investigated in Example 24. The yield, representing the total volume of slurry produced in cubic feet, was calculated for 50 pounds of dry material consisting of cementitious materials and additives (i.e., 50 pounds mixture of cementitious materials and additives) when mixed with fine aggregate, coarse aggregate and water.

TABLE 24.3

Slurry Density and Air Content

| Mix # | Slurry Density (pcf) | Air Content (%) | Yield (cu. ft.) |
|---|---|---|---|
| 1 | 144.6 | 5.8 | 1.46 |
| 2 | 144.0 | 6.4 | 1.83 |
| 3 | 151.5 | NA | 2.41 |
| 4 | 152.2 | 4.9 | 2.63 |

Example 25

Compositions with Both Sand and Gravel Extensions when Only Calcium Aluminate Cement is Present TABLE 25.1 shows the raw material composition of the mixture compositions investigated. The low shear mixer used in this example was a KUSHLAN 1000 DD drum type concrete mixer, having 10 cubic foot (cu. ft.) capacity, operated at a drum RPM of 18. The mixing was performed for 6 minutes. The sand and gravel used in this example were Sand B Hamilton Builders' Supply concrete sand and Gravel B Hamilton Builders' Supply pea gravel, respectively.

TABLE 25.1

Compositions investigated in Example 25

| Raw Material | Mix 1 | Mix 2 | Mix 3 | Mix 4 |
|---|---|---|---|---|
| Fly Ash Class C (grams) | 4615 | 3846 | 3077 | 3077 |
| Calcium Aluminate Cement (grams) | 923 | 769 | 615 | 615 |
| Calcium Sulfate Hemihydrate (grams) | 462 | 385 | 308 | 308 |
| Total Cementitious Materials (grams) | 6000 | 5000 | 4000 | 4000 |
| Sand B (grams) | 9540 | 10600 | 8480 | 12720 |
| Gravel B (grams) | 9720 | 10800 | 17280 | 17280 |
| Potassium Citrate (grams) | 120 | 100 | 80 | 80 |
| Superplasticizer (grams) | 30 | 25 | 20 | 20 |
| Rheology Modifier (grams) | 0.6 | 0.5 | 0.4 | 0.4 |
| Defoamer (grams) | 1.8 | 1.5 | 1.2 | 1.2 |
| Air Entraining Agent (grams) | 3.0 | 2.5 | 2.0 | 2.0 |
| Lithium Carbonate (grams) | 30 | 25 | 20 | 20 |
| Polymer (grams) | 300 | 250 | 200 | 200 |
| Water (grams) | 1500 | 1400 | 1280 | 1400 |
| Water/Cementitious Materials Ratio | 0.25:1 | 0.28:1 | 0.32:1 | 0.35:1 |
| Sand B/Cementitious Materials Ratio | 1.59:1 | 2.12:1 | 2.12:1 | 3.18:1 |
| Gravel B/Cementitious Materials Ratio | 1.62:1 | 2.16:1 | 4.32:1 | 4.32:1 |
| Mixing Time (minutes) | 6 | 6 | 6 | 6 |

TABLE 25.2 shows the slurry density, air content, and yield of the developed geopolymeric cementitious compositions investigated in Example 25. The yield, representing the total volume of slurry produced in cubic feet, was calculated for 50 pounds of dry material consisting of cementitious materials and additives (i.e., 50 pounds mixture of cementitious materials and additives) when mixed with fine aggregate, coarse aggregate and water.

TABLE 25.3 shows the compressive strength behavior of the developed geopolymeric cementitious compositions investigated in Example 25.

TABLE 25.2

| Slurry Density and Air Content | | | |
|---|---|---|---|
| Mix # | Slurry Density (pcf) | Air Content (%) | Yield (cu. ft.) |
| 1 | 140.8 | 5.9 | 1.49 |
| 2 | 144.5 | 8.4 | 1.80 |
| 3 | 145.7 | 4.5 | 2.49 |
| 4 | 145.5 | 5.0 | 2.73 |

TABLE 25.3

| Compressive Strength (in psi) | | | |
|---|---|---|---|
| Mix # | 24 hr | 7 days | 28 days |
| 1 | 4225 | 6391 | 8044 |
| 2 | 3227 | 5234 | 6985 |
| 3 | 3057 | 4549 | 6138 |
| 4 | 2680 | 4489 | 5761 |

TABLE 25.4 shows the freeze-thaw durability behavior of the formulations investigated in Example 25. All formulations demonstrated impressive freeze-thaw durability performance.

TABLE 25.4

| Freeze-Thaw Durability Performance | | | | |
|---|---|---|---|---|
| Mix # | | 0 cycles | 100 cycles | 200 cycles |
| 1 | Dynamic Modulus | 37.2 | 37.3 | 38.4 |
| 2 | (GPa) | 36.1 | 36.2 | 36.5 |
| 3 | | 41.3 | 40.8 | 41.3 |
| 4 | | 36.8 | 36.9 | 37.2 |
| 1 | Relative Dynamic | 100 | 99 | 101 |
| 2 | Modulus (%) | 100 | 99 | 101 |
| 3 | | 100 | 100 | 100 |
| 4 | | 100 | 99 | 100 |

Based on the Examples 23, 24 and 25 when the system was extended with both sand and gravel, the compressive strength development for mixes with calcium aluminate cement as the only aluminate cement was much higher compared to the mixes with calcium sulfoaluminate cement as the only aluminate cement as part of the composition. Surprisingly when the system was extended with both sand and gravel, the compressive strength development was about 1.5 to 3 times more when a combination of calcium sulfoaluminate and calcium aluminate cements was used as part of the composition. Thus, it is surprising that the combination of calcium sulfoaluminate cement and calcium aluminate cement yield significantly better mechanical strength when the geopolymer compositions of this invention are extended with both sand and gravel. It is also noteworthy that the aforementioned behavior is even more pronounced and valid for the compositions of the invention that employ extremely high levels of sand and gravel extensions.

Example 26

Compressive Strengths of Specimen Cast in the Field

The present investigation illustrates the compressive strength performance of the geopolymer compositions of the invention measured in accordance to the ASTM C39 standard using cylindrical specimen cast in the field while conducting road repair trials. The cylindrical test specimen had a diameter of 3" and a height of 6". The TABLE 26.1 shows the raw material composition of the mixture composition investigated. Six different mixes were investigated in this study. Three cylindrical specimens were cast and tested in compression at the age of 28-days for each mix and the average result was calculated.

The low shear mixer used in this example was concrete mixer, having 6 cu. ft. capacity, operated at a drum RPM of 18. Mixing was performed for 6 minutes. Sand A was used in mixes 1 and 2, whereas Sand B was used in mixes 3, 4, 5 and 6. All the mixes used Gravel B Hamilton Builders' Supply pea gravel as coarse aggregate. All specimens were cast in the field while conducting road repair field trials.

TABLE 26.1

| Compositions investigated in Example 26 | | | | | | |
|---|---|---|---|---|---|---|
| Raw Material | Mix 1 | Mix 2 | Mix 3 | Mix 4 | Mix 5 | Mix 6 |
| Fly Ash Class C (grams) | 53330 | 53330 | 82552 | 55035 | 86557 | 57705 |
| Calcium Sulfoaluminate Cement (grams) | 10666 | 10666 | 16510 | 11007 | 17312 | 11541 |
| Calcium Aluminate Cement (grams) | 7999 | 7999 | 12382 | 8255 | 12984 | 8656 |
| Calcium Sulfate Hemihydrate (grams) | 9333 | 9333 | 14447 | 9631 | 15148 | 10098 |
| Total Cementitious Materials (grams) | 81328 | 81328 | 125892 | 83928 | 132000 | 88000 |
| Sand A (grams) | 93527 | 93527 | 0 | 0 | 0 | 0 |
| Sand B (grams) | 0 | 0 | 196392 | 175410 | 198000 | 175120 |
| Gravel B (grams) | 117926 | 162656 | 203945 | 181285 | 204600 | 181280 |
| Potassium Citrate (grams) | 1627 | 1627 | 2518 | 1679 | 2640 | 1760 |
| Superplasticizer (grams) | 407 | 407 | 629 | 420 | 660 | 440 |
| Rheology Modifier (grams) | 8 | 8 | 13 | 8 | 13 | 9 |
| Defoamer (grams) | 24 | 24 | 38 | 25 | 40 | 26 |
| Air Entraining Agent (grams) | 41 | 41 | 63 | 42 | 66 | 44 |
| Lithium Carbonate (grams) | 407 | 407 | 629 | 420 | 660 | 440 |
| Polymer (grams) | 4066 | 4066 | 6295 | 4196 | 0 | 0 |
| Water (grams) | 17038 | 18933 | 32567 | 25152 | 32593 | 25163 |
| Water/Cementitious Materials Ratio | 0.21:1 | 0.23:1 | 0.26:1 | 0.30:1 | 0.25:1 | 0.29:1 |

TABLE 26.1-continued

Compositions investigated in Example 26

| Raw Material | Mix 1 | Mix 2 | Mix 3 | Mix 4 | Mix 5 | Mix 6 |
|---|---|---|---|---|---|---|
| Sand A/Cementitious Materials Ratio | 1.15:1 | 1.15:1 | 0.00:1 | 0.00:1 | 0.00:1 | 0.00:1 |
| Sand B/Cementitious Materials Ratio | 0.00:1 | 0.00:1 | 1.56:1 | 2.09:1 | 1.50:1 | 1.99:1 |
| Gravel B/Cementitious Materials Ratio | 1.45:1 | 2.00:1 | 1.62:1 | 2.16:1 | 1.55:1 | 2.06:1 |
| Mixing Time (minutes) | 6 | 6 | 6 | 6 | 6 | 6 |

TABLE 26.2 shows the compressive strength behavior of the developed geopolymeric cementitious of Example 26. The compressive strengths were determined based on the ASTM C39 standard using 3"×6" cylinder specimen. All test specimens were air cured for 28-days.

TABLE 26.2

Compressive Strength (in psi)

| Mix # | 28 days |
|---|---|
| 1 | 9738 |
| 2 | 8728 |
| 3 | 8194 |
| 4 | 6048 |
| 5 | 9959 |
| 6 | 9177 |

Preferred Embodiments of the Invention

Embodiment 1. A freeze-thaw durable, dimensionally stable, geopolymer composition comprising a mixture of:
cementitious reactive powder comprising:
thermally activated aluminosilicate mineral in an amount of 100 parts by weight, wherein preferably the thermally activated aluminosilicate mineral comprises at least 75% Class C fly ash,
aluminate cement in an amount of 1 to 100, preferably 2.5-80, more preferably 5 to 60, most preferably 25 to 40 parts by weight (pbw) per 100 pbw of thermally activated aluminosilicate mineral, wherein preferably the aluminate cement is selected from at least one member of the group consisting of calcium sulfoaluminate cement and calcium aluminate cement, and
calcium sulfate in an amount of 2 to 100, preferably 5 to 75, more preferably 10 to 50 parts by weight per 100 pbw of aluminate cement, wherein the calcium sulfate is selected from at least one member of the group consisting of calcium sulfate dihydrate, calcium sulfate hemihydrate, and anhydrous calcium sulfate; and
alkali metal chemical activator in an amount of 1 to 6, preferably 1.25 to 4, more preferably 1.5 to 2.5 weight % in weight % based upon the total weight of the cementitious reactive powder, wherein the alkali metal chemical activator is selected from at least one member of the group consisting of an alkali metal salt and an alkali metal base, wherein potassium citrate is the preferred alkali metal salt chemical activator;
freeze-thaw durability component in an amount of 0.05 to 21.5, preferably 0.1 to 10, more preferably 0.1 to 5 weight % based upon the total weight of the cementitious reactive powder, the freeze-thaw durability component comprising:
air-entraining agent in an amount of 0 to 1, preferably 0.01-0.5, more preferably 0.01-0.2, most preferably 0.05-0.2 weight % based upon the total weight of the cementitious reactive powder,
defoaming agent in an amount of 0 to 0.5, preferably 0-0.25, more preferably 0.01-0.1 weight % based upon the total weight of the cementitious reactive powder, and
surface active organic polymer in an amount of 0 to 20, preferably 0-10, more preferably 0-5 weight % based upon the total weight of the cementitious reactive powder;
wherein at least one member of the group consisting of the air-entraining agent and the surface active organic polymer is present,
wherein the composition has an air content of about 4% to 20% by volume, more preferably about 4% to 12% by volume, and most preferably about 4% to 8% by volume,
wherein said thermally activated aluminosilicate mineral, said aluminate cement, and said calcium sulfate is at least 70 wt. %, preferably at least 80 wt. %, more preferably at least 95 wt. %, most preferably 100 wt. % of the cementitious reactive powder,
wherein the composition after mixing with water and setting has a freeze-thaw durability performance according to ASTM C666/C666M-15 of a relative dynamic modulus of greater than 80 percent, preferably greater than 90 percent, more preferably greater than 100 percent for at least 300 freeze-thaw cycles, preferably at least 600 freeze-thaw cycles, more preferably at least 900 freeze-thaw cycles, most preferably at least 1200 freeze-thaw cycles.

Embodiment 2. The composition of Embodiment 1, wherein the thermally activated aluminosilicate mineral comprises at least 75% Class C fly ash, wherein the aluminate cement is selected from at least one member of the group consisting of calcium sulfoaluminate cement and calcium aluminate cement.

Embodiment 3. The composition of Embodiment 1 or 2, wherein the composition contains at least one feature selected from the group consisting of
air-entraining agent in an amount of 0.01 to 1 weight % based upon the total weight of the cementitious reactive powder, and
surface active organic polymer in an amount of 1 to 20 weight % based upon the total weight of the cementitious reactive powder,
wherein the composition has a relative dynamic modulus greater than 80%, more preferably greater than 90%, most preferably greater than 100% for at least 300 cycles, preferably at least 600 cycles, more preferably at least 900 cycles, most preferably at least 1200 cycles according to ASTM C666/C666M-15, and
wherein the composition after setting has a weight loss less than 1% after 25 freeze-thaw cycles according to this ASTM C672/C672M-12 salt scaling test, more preferably after 50 freeze-thaw cycles, and most preferably after 75 freeze-thaw cycles, wherein the composition after setting has a Durability Factor (DF) measured according to ASTM C666/C666M-15 greater than 85%, preferably greater than 90%, more preferably greater than 95%, and most preferably equal or greater than 100% for 300 freeze-thaw cycles.

Embodiment 4. The composition of any of Embodiments 1 to 3, wherein the composition was made from setting a slurry comprising water, the cementitious reactive powder, the alkali metal chemical activator, and the freeze-thaw durability component, wherein the water/cementitious reactive powder weight ratio of the slurry is 0.14 to 0.45:1, preferably 0.16 to 0.35:1, and more preferably 0.18 to 0.25:1.

Embodiment 5. The composition of any of Embodiments 1 to 4, wherein the calcium sulfoaluminate cement is provided in the absence of calcium aluminate cement and an absence of Portland cement.

Embodiment 6. The composition of any of Embodiments 1 to 4, wherein the calcium aluminate cement is provided in the absence of calcium sulfoaluminate cement and an absence of Portland cement.

Embodiment 7. The Embodiment of any of Embodiments 1 to 4, comprising 5 to 60 parts aluminate cement by weight per 100 pbw of thermally activated aluminosilicate mineral, the aluminate cement comprising the calcium sulfoaluminate cement and the calcium aluminate cement, wherein the amount of calcium aluminate cement is about 5 to about 75, more preferably about 10 to 50, most preferably about 30-45 parts by weight (pbw) per 100 pbw of total calcium sulfoaluminate cement and calcium aluminate cement, wherein the composition has an absence of Portland cement.

Embodiment 8. The composition of any of Embodiments 1 to 7, comprising the air entraining agent and the surface active organic polymer,
wherein the surface active organic polymer comprises at least one member of the group consisting of biopolymers, Organic Rheology Control Agents, Film Forming Redispersible Polymers, and Film forming polymer of Film forming polymer dispersions,
wherein the biopolymer is selected from at least one member of the group consisting of Succinoglycans, diutan gum, guar gum, wellan gum, xanthan gums galactomannan gums, glucomannan gums, guar gum, locust bean gum, cara gum, hydroxyethyl guar, hydroxypropyl guar, cellulose, hydroxypropyl cellulose, hydroxymethyl cellulose, and hydroxyethyl cellulose,
wherein the at least one Organic Rheology Control Agent comprises at least one acrylic-based polymer selected from the group consisting of alkali-swellable (or soluble) emulsions (ASE's), hydrophobically modified alkali-swellable emulsions (HASE's), and hydrophobically modified, ethoxylated urethane resins (HEUR's),
wherein the Film Forming Redispersible Polymer is selected from the group consisting of (meth)acrylic polymers, styrene polymers, styrene-butadiene rubber polymers, vinyl polymers, polyesters, polyurethanes, polyamides, chlorinated polyolefins, and mixtures or copolymers thereof, wherein said film forming polymer has a glass transition temperature (Tg) of from −40° to 70° C., and
wherein the film forming polymer of the Film forming polymer dispersions is selected from the group consisting of (meth)acrylic polymers, styrene polymers, styrene-butadiene rubber polymers, vinyl polymers, polyesters, polyurethanes, polyamides, chlorinated polyolefins, and mixtures or copolymers thereof, wherein said film forming polymer has a glass transition temperature (Tg) of from −40° to 70° C.

Embodiment 9. The composition of any of Embodiments 1 to 8, comprising the defoaming agent, wherein the defoaming agent is selected from at least one member of the group consisting of polyethylene oxides, polyetheramine, polyethylene glycol, polypropylene glycol, alkoxylates, polyalkoxylate, fatty alcohol alkoxylates, hydrophobic esters, tributyl phosphate, alkyl polyacrylates, silanes, silicones, polysiloxanes, polyether siloxanes, acetylenic diols, tetramethyl decynediol, secondary alcohol ethoxylates, silicone oil, hydrophobic silica, oils (mineral oil, vegetable oil, white oil), waxes (paraffin waxes, ester waxes, fatty alcohol waxes), amides, fatty acids, and polyether fatty acids.

Embodiment 10. The composition of any of Embodiments 1 to 9, comprising
fine aggregate in an amount of 0 to 5 parts by weight per 1 part total weight of the cementitious reactive powder;
coarse aggregate in an amount of 0 to 5.5 parts by weight per 1 part total weight of the cementitious reactive powder.

Embodiment 11. The composition of Embodiment 10, comprising,
25 to 40 parts said aluminate cement by weight per 100 pbw of thermally activated aluminosilicate mineral, the aluminate cement comprising the calcium sulfoaluminate cement and the calcium aluminate cement, wherein the amount of the calcium aluminate cement is about 30-45 parts by weight (pbw) per 100 pbw of total calcium sulfoaluminate cement and calcium aluminate cement, wherein the composition has an absence of Portland cement;
the air entraining agent,
the defoamer,
the superplasticizer comprising polycarboxylate polyether;
the surface active polymer comprising redispersible film forming polymer;
greater than 0 to at most 5 parts by weight fine aggregate per 1 part total weight of the cementitious reactive powder;
0 to 5.5 parts by weight coarse aggregate per 1 part total weight of the cementitious reactive powder;
the alkali metal salt chemical activator comprises potassium citrate;
air content of about 4% to 12%, preferably about 4% to 8% by volume,
wherein the thermally activated aluminosilicate mineral comprises at least 75% Class C fly ash.

Embodiment 12. The composition of Embodiment 11,
wherein the air-entraining agent is in an amount equal to 0.03-0.1 wt % based upon total weight of the cementitious reactive powder, wherein the air entraining agent comprises one or more of wood resin, vinsol resin, wood rosin, gum rosin, tall oil rosin, or salts thereof
wherein the defoamer is in an amount equal to 0.02-0.1 weight % based upon the total weight of the cementitious reactive powder;
wherein the surface active organic polymer comprises organic film forming polymer in an amount equal to 3-10 wt % based upon the total weight of the cementitious reactive powder, wherein the organic film forming polymer comprises at least one member selected from the group consisting of acrylate polymer, acrylate co-polymer, vinyl acetate ethylene co-polymer, styrene butadiene rubber, and styrene-acrylic copolymer;
greater than 0 to at most 3.5 parts by weight fine aggregate per 1 part total weight of the cementitious reactive powder;
0 to 4.5 parts by weight coarse aggregate per 1 part total weight of the cementitious reactive powder;

wherein there is 1 to 8 parts by weight total fine and coarse aggregate per 1 part total weight of the cementitious reactive powder the alkali metal salt chemical activator comprises potassium citrate;

wherein the air content is about 4% to 8% by volume;

wherein the composition was made from setting a slurry comprising water, the cementitious reactive powder, the alkali metal chemical activator, and the freeze-thaw durability component, wherein the water/cementitious reactive powder weight ratio of the slurry is 0.18 to 0.35:1;

wherein the set composition has a Durability Factor (DF) measured according to ASTM C666/C666M-15 greater than 85%, preferably greater than 90%, more preferably greater than 95%, and most preferably equal or greater than 100% for 300 freeze-thaw cycles.

Embodiment 13. A method for making the geopolymer compositions of any of the aforementioned composition Embodiments 1 to 12 comprising the steps of:

preparing a slurry by mixing
water;
cementitious reactive powder comprising:
thermally activated aluminosilicate mineral in an amount of 100 parts by weight, wherein preferably the thermally activated aluminosilicate mineral comprises Class C fly ash,
aluminate cement in an amount of 1 to 100, preferably 2.5-80, more preferably 5 to 60, most preferably 25 to 40 parts by weight (pbw) per 100 pbw of thermally activated aluminosilicate mineral, wherein preferably the aluminate cement is selected from at least one member of the group consisting of calcium sulfoaluminate cement and calcium aluminate cement, and
calcium sulfate in an amount of 2 to 100, preferably 5 to 75, more preferably 10 to 50 parts by weight per 100 pbw of aluminate cement, wherein the calcium sulfate is selected from at least one member of the group consisting of calcium sulfate dihydrate, calcium sulfate hemihydrate, and anhydrous calcium sulfate; and
alkali metal chemical activator in an amount of 1 to 6, preferably 1.25 to 4, more preferably 1.5 to 2.5 weight % based upon the total weight of the cementitious reactive powder, wherein the alkali metal chemical activator is selected from at least one member of the group consisting of an alkali metal salt and an alkali metal base, wherein potassium citrate is the preferred alkali metal salt chemical activator;
freeze-thaw durability component in an amount of 0.05 to 21.5, preferably 0.1 to 10, more preferably 0.1 to 5 weight % based upon the total weight of the cementitious reactive powder, the freeze-thaw durability component comprising:
air-entraining agent in an amount of 0 to 1, preferably 0.01-0.5, more preferably 0.01-0.2, most preferably 0.05-0.2 weight % based upon the total weight of the cementitious reactive powder,
defoaming agent in an amount of 0 to 0.5, preferably 0-0.25, more preferably 0.01-0.1 weight % based upon the total weight of the cementitious reactive powder, and
surface active organic polymer in an amount of 0 to 20, preferably 0-10, more preferably 0-5 weight % based upon the total weight of the cementitious reactive powder;
wherein at least one member of the group consisting of the air-entraining agent and the surface active organic polymer is present, wherein the slurry has an air content of about 4% to 20% by volume, more preferably about 4% to 12% by volume, and most preferably about 4% to 8% by volume, wherein said thermally activated aluminosilicate mineral, said aluminate cement, and said calcium sulfate is at least 70 wt. %, preferably at least 80 wt. %, more preferably at least 95 wt. %, most preferably 100 wt. % of the cementitious reactive powder;

wherein the water/cementitious reactive powder weight ratio of the slurry is 0.14 to 0.45:1, preferably 0.16 to 0.35:1, and more preferably 0.18 to 0.25:1, setting the slurry to form a set composition;

wherein the set composition has a freeze-thaw durability performance according to ASTM C666/C666M-15 of a relative dynamic modulus of greater than 80 percent for at least 300 freeze-thaw cycles, preferably at least 600 freeze-thaw cycles, more preferably at least 900 freeze-thaw cycles, most preferably at least 1200 freeze-thaw cycles.

Embodiment 14. The method of Embodiment 13, wherein the thermally activated aluminosilicate mineral comprises at least 75% Class C fly ash, wherein the aluminate cement is selected from at least one member of the group consisting of calcium sulfoaluminate cement and calcium aluminate cement.

Embodiment 15. The method of Embodiment 13 or 14, wherein the set composition has a Durability Factor (DF) measured according to ASTM C666/C666M-15 greater than 85%, preferably greater than 90%, more preferably greater than 95%, and most preferably equal or greater than 100% for 300 cycles, and wherein the set composition has a weight loss less than 1% after 25 freeze-thaw cycles according to this ASTM C672/C672M-12 salt scaling test, more preferably after 50 freeze-thaw cycles, and most preferably after 75 freeze-thaw cycles Embodiment 16. The method of any of Embodiments 13 to 15, wherein the mixture is mixed at an initial temperature of about 0 to about 122° F. (0 to 50° C.), preferably about 41 to about 104° F. (5 to 40° C.), more preferably about 50 to about 95° F. (10 to 35° C.) and, most preferably ambient temperature (room temperature) of about 77° F. (25° C.), wherein the water/cementitious reactive powder weight ratio of the slurry is 0.14 to 0.45:1, preferably 0.16 to 0.35:1, and more preferably 0.18 to 0.25:1, wherein the mixture contains at least one member of the group consisting of the air-entraining agent and the surface active organic polymer.

Embodiment 17. The method of any of Embodiments 13 to 16, wherein the slurry is aerated by mixing the formed slurry to directly entrain air into the slurry in a high shear mixer at a speed of RPM>100 for 1.5 to 8 minutes.

Embodiment 18. The method of any of Embodiments 13 to 17, wherein the slurry is aerated by mixing the formed slurry to directly entrain air into the slurry in a low shear mixer at a speed of RPM≤100 for 2 to 12 minutes.

Embodiment 19. The method of Embodiment 18, wherein the slurry comprises the rheology modifier, the defoaming agent, the air entraining agent, and the surface active organic polymer, wherein the slurry has an absence of Portland cement.

Embodiment 20. The method of Embodiment 13, wherein the slurry comprises:

25 to 40 parts said aluminate cement by weight per 100 pbw of thermally activated aluminosilicate mineral, the aluminate cement comprising the calcium sulfoaluminate cement and the calcium aluminate cement, wherein the amount of the calcium aluminate cement is about 30-45 parts by weight (pbw) per 100 pbw of total calcium sulfoaluminate cement and calcium aluminate cement, wherein the composition has an absence of Portland cement;
the air entraining agent,
the defoamer,
the superplasticizer comprising polycarboxylate polyether;
the surface active polymer comprising redispersible film forming polymer;
greater than 0 to at most 5 parts by weight fine aggregate per 1 part total weight of the cementitious reactive powder;
0 to 5.5 parts by weight coarse aggregate per 1 part total weight of the cementitious reactive powder;
the alkali metal salt chemical activator comprises potassium citrate;
air content of about 4% to 12%, preferably about 4% to 8% by volume;
wherein the thermally activated aluminosilicate mineral comprises at least 75% Class C fly ash, wherein the aluminate cement is selected from at least one member of the group consisting of calcium sulfoaluminate cement and calcium aluminate cement.

Embodiment 21. The method of Embodiment 20,
wherein the air-entraining agent is in an amount equal to 0.03-0.1 wt % based upon total weight of the cementitious reactive powder, wherein the air entraining agent comprises one or more of wood resin, vinsol resin, wood rosin, gum rosin, tall oil rosin, or salts thereof;
the defoamer is in an amount equal to 0.02-0.1 weight % based upon the total weight of the cementitious reactive powder;
the redispersible film forming polymer in an amount equal to 3-10 wt % based upon the total weight of the cementitious reactive powder, wherein said redispersible film forming polymer comprises at least one member selected from the group consisting of acrylate polymer, acrylate co-polymer, vinyl acetate ethylene copolymer, styrene butadiene rubber, and styrene-acrylic copolymer;
greater than 0 to at most 3.5 parts by weight fine aggregate per 1 part total weight of the cementitious reactive powder;
0 to 4.5 parts by weight coarse aggregate per 1 part total weight of the cementitious reactive powder;
the alkali metal salt chemical activator comprises potassium citrate;
wherein there is 1 to 8 parts by weight total fine and coarse aggregate per 1 part total weight of the cementitious reactive powder;
wherein the air content is about 4% to 8% by volume;
wherein mixing occurs at a mixing speed of 25 RPM or less for a mixing time of 4 to 8 minutes,
wherein the water/cementitious reactive powders weight ratio is 0.18 to 0.35:1;
wherein the composition has a Durability Factor (DF) measured according to ASTM C666/C666M-15 greater than 85%, preferably greater than 90%, more preferably greater than 95%, and most preferably equal or greater than 100% for 300 freeze-thaw cycles.

Embodiment 22. A method for repairing pavement comprising filling a crack of the pavement or pothole of the pavement with an aqueous mass of the composition of any of Embodiments 1 to 12, the filled mass having a thickness of at least 1 inch, wherein the composition comprises fine aggregate and water, and setting the mass in the crack or pothole to form the set composition.

Embodiment 23. A method for repairing pavement comprising filling a crack of the pavement or pothole of the pavement with a mass of aqueous slurry made by the method of any of Embodiments 13 to 21, the filled mass having a thickness of at least 1 inch,
wherein the slurry comprises fine aggregate, and setting the mass in the crack or pothole to form the set composition.

Although we have described the preferred embodiments for implementing our invention, it will be understood by those skilled in the art to which this disclosure is directed that modifications and additions may be made to our invention without departing from its scope.

The invention claimed is:
1. A freeze-thaw durable, dimensionally stable, geopolymer composition comprising a mixture of:
cementitious reactive powder comprising:
thermally activated aluminosilicate mineral in an amount of 100 parts by weight,
aluminate cement in an amount of 1 to 100 parts by weight (pbw) per 100 pbw of thermally activated aluminosilicate mineral, and
calcium sulfate in an amount of 2 to 100 parts by weight per 100 pbw of aluminate cement, wherein the calcium sulfate is selected from at least one member of the group consisting of calcium sulfate dihydrate, calcium sulfate hemihydrate, and anhydrous calcium sulfate; and
alkali metal chemical activator in an amount of 1 to 6 weight % based upon the total weight of the cementitious reactive powder, wherein the alkali metal chemical activator is selected from at least one member of the group consisting of an alkali metal salt and an alkali metal base;
freeze-thaw durability component in an amount of 0.05 to 21.5 weight % based upon the total weight of the cementitious reactive powder, the freeze-thaw durability component comprising:
air-entraining agent in an amount of 0 to 1 weight % based upon the total weight of the cementitious reactive powder,
defoaming agent in an amount of 0 to 0.5 weight % based upon the total weight of the cementitious reactive powder, and
surface active organic polymer in an amount of 0 to 20 weight % based upon the total weight of the cementitious reactive powder;
optional superplasticizer;
wherein at least one member of the group consisting of the air-entraining agent defoaming agent, superplasticizer, and the surface active organic polymer is present,
wherein said thermally activated aluminosilicate mineral, said aluminate cement, and said calcium sulfate is at least 70 wt. % of the cementitious reactive powder,
wherein the composition after mixing the mixture with water and aerating and setting has a freeze-thaw durability performance according to ASTM C666/C666M-15 of a relative dynamic modulus of greater than 80 percent for at least 100 freeze-thaw cycles.
2. The composition of claim 1, wherein the thermally activated aluminosilicate mineral comprises at least 75% Class C fly ash, wherein the aluminate cement is selected from at least one member of the group consisting of calcium sulfoaluminate cement and calcium aluminate cement, wherein the alkali metal chemical activator is selected from at least one member of the group consisting of an alkali metal citrate, alkali metal hydroxide and an alkali metal silicate.

3. The composition of claim 1, wherein the composition contains at least one feature selected from the group consisting of:
air-entraining agent in an amount of 0.01 to 1 weight % based upon the total weight of the cementitious reactive powder, and
surface active organic polymer in an amount of 1 to 20 weight % based upon the total weight of the cementitious reactive powder.

4. The composition of claim 1, wherein the composition is made from setting a slurry comprising water, the cementitious reactive powder, the alkali metal chemical activator, and the freeze-thaw durability component, wherein the water/cementitious reactive powder weight ratio of the slurry is 0.16-0.35.

5. The composition of claim 1, wherein the composition has an absence of Portland cement.

6. The composition of claim 1, wherein the composition comprises lithium carbonate.

7. The composition of claim 1, comprising 5 to 60 parts aluminate cement by weight per 100 pbw of thermally activated aluminosilicate mineral, the aluminate cement comprising the calcium sulfoaluminate cement and the calcium aluminate cement, wherein the amount of calcium aluminate cement is about 5 to about 75 parts by weight (pbw) per 100 pbw of total calcium sulfoaluminate cement and calcium aluminate cement, wherein the composition has an absence of Portland cement.

8. The composition of claim 1, comprising the air entraining agent and the surface active organic polymer,
wherein the surface active organic polymer comprises at least one member of the group consisting of biopolymers, organic rheology control agents, film forming redispersible polymers, and film forming polymer of film forming polymer dispersions,
wherein the biopolymer is selected from at least one member of the group consisting of Succinoglycans, diutan gum, guar gum, wellan gum, xanthan gums galactomannan gums, glucomannan gums, guar gum, locust bean gum, cara gum, hydroxyethyl guar, hydroxypropyl guar, cellulose, hydroxypropyl cellulose, hydroxymethyl cellulose, and hydroxyethyl cellulose,
wherein the at least one organic rheology control agent comprises at least one acrylic-based polymer selected from the group consisting of alkali-swellable (or soluble) emulsions (ASE's), hydrophobically modified alkali-swellable emulsions (HASE's), and hydrophobically modified, ethoxylated urethane resins (HEUR's),
wherein the film forming redispersible polymer is selected from the group consisting of (meth)acrylic polymers, styrene polymers, styrene-butadiene rubber polymers, vinyl polymers, polyesters, polyurethanes, polyamides, chlorinated polyolefins, and mixtures or copolymers thereof, wherein said film forming polymer has a glass transition temperature (Tg) of from −40° to 70° C., and
wherein the film forming polymer of the film forming polymer dispersions is selected from the group consisting of (meth)acrylic polymers, styrene polymers, styrene-butadiene rubber polymers, vinyl polymers, polyesters, polyurethanes, polyamides, chlorinated polyolefins, and mixtures or copolymers thereof, wherein said film forming polymer has a glass transition temperature (Tg) of from −40° to 70° C.

9. The composition of claim 1, comprising the defoaming agent, wherein the defoaming agent is selected from at least one member of the group consisting of polyethylene oxides, polyetheramine, polyethylene glycol, polypropylene glycol, alkoxylates, polyalkoxylate, fatty alcohol alkoxylates, hydrophobic esters, tributyl phosphate, alkyl polyacrylates, silanes, silicones, polysiloxanes, polyether siloxanes, acetylenic diols, tetramethyl decynediol, secondary alcohol ethoxylates, silicone oil, hydrophobic silica, oils (mineral oil, vegetable oil, white oil), waxes (paraffin waxes, ester waxes, fatty alcohol waxes), amides, fatty acids, and polyether fatty acids.

10. The composition of claim 1, comprising
0 to 5 parts by weight fine aggregate per 1 part total weight of the cementitious reactive powder;
0 to 5.5 parts by weight coarse aggregate per 1 part total weight of the cementitious reactive powder;
wherein there is 1 to 8 parts by weight total fine and coarse aggregate per 1 part total weight of the cementitious reactive powder,
wherein the aluminate cement comprises calcium sulfoaluminate cement and calcium aluminate cement.

11. The composition of claim 10, comprising,
25 to 40 parts said aluminate cement by weight per 100 pbw of thermally activated aluminosilicate mineral, the aluminate cement comprising the calcium sulfoaluminate cement and the calcium aluminate cement, wherein the amount of the calcium aluminate cement is about 30-50 parts by weight (pbw) per 100 pbw of total calcium sulfoaluminate cement and calcium aluminate cement, wherein the composition has an absence of Portland cement;
the air entraining agent,
the defoamer,
the superplasticizer, wherein the superplasticizer comprises polycarboxylate polyether, wherein the superplasticizer is in an amount of 5 wt. % or less based upon the total weight of the cementitious reactive powder;
greater than 0 to at most 5 parts by weight fine aggregate per 1 part total weight of the cementitious reactive powder;
0 to 5.5 parts by weight coarse aggregate per 1 part total weight of the cementitious reactive powder;
wherein there is 1 to 8 parts by weight total fine and coarse aggregate per 1 part total weight of the cementitious reactive powder;
the alkali metal chemical activator comprises at least one member of the group consisting of potassium citrate and sodium citrate;
air content of about 4% to 12% by volume;
wherein the thermally activated aluminosilicate mineral comprises at least 75% Class C fly ash.

12. The composition of claim 11,
wherein the air-entraining agent is in an amount equal to 0.03-0.1 wt % based upon total weight of the cementitious reactive powder, wherein the air entraining agent comprises a one or more of wood resin, vinsol resin, wood rosin, gum rosin, tall oil rosin, or salts thereof,
wherein the defoamer is in an amount equal to 0.02-0.1 weight % based upon the total weight of the cementitious reactive powder;
wherein the surface active organic polymer comprises organic film forming polymer in an amount equal to 3-10 wt % based upon the total weight of the cementitious reactive powder, wherein the organic film forming polymer comprises at least one member selected from the group consisting of acrylate polymer, acrylate co-polymer, vinyl acetate ethylene co-polymer, styrene butadiene rubber, and styrene-acrylic copolymer;

greater than 0 to at most 3.5 parts by weight fine aggregate per 1 part total weight of the cementitious reactive powder;

0 to 4.5 parts coarse aggregate by weight per 1 part total weight of the cementitious reactive powder;

wherein there is 1 to 8 parts by weight total fine and coarse aggregate per 1 part total weight of the cementitious reactive powder;

the alkali metal chemical activator comprises at least one member of the group consisting of potassium citrate and sodium citrate;

wherein the air content is about 4% to 8% by volume;

wherein the composition was made from setting a slurry comprising water, the cementitious reactive powder, the alkali metal chemical activator, and the freeze-thaw durability component, wherein the water/cementitious reactive powder weight ratio of the slurry is 0.18 to 0.35:1, wherein the composition after setting has a Durability Factor (DF) measured according to ASTM C666/C666M-15 greater than 85% for 300 freeze-thaw cycles.

13. The composition of claim 1, wherein the calcium sulfate comprises calcium sulfate dihydrate.

14. The composition of claim 1, wherein the calcium sulfate comprises calcium sulfate hemihydrate.

15. The composition of claim 1, wherein the calcium sulfate comprises calcium sulfate anhydrite.

16. A method for repairing pavement comprising filling a crack of the pavement or pothole of the pavement with an aqueous mass of the composition of claim 1, the filled mass having a thickness of at least 1 inch, wherein the composition comprises fine aggregate and water, and setting the mass in the crack or pothole to form the set composition.

17. A method for making a geopolymer composition comprising the steps of:
preparing and aerating a slurry by mixing
water;
air;
cementitious reactive powder comprising:
  thermally activated aluminosilicate mineral in an amount of 100 parts by weight,
  aluminate cement in an amount of 1 to 100 parts by weight (pbw) per 100 pbw of thermally activated aluminosilicate mineral, and
  calcium sulfate in an amount of 2 to 100 parts by weight per 100 pbw of aluminate cement, wherein the calcium sulfate is selected from at least one member of the group consisting of calcium sulfate dihydrate, calcium sulfate hemihydrate, and anhydrous calcium sulfate; and
alkali metal chemical activator in an amount of 1 to 6 weight % based upon the total weight of the cementitious reactive powder, wherein the alkali metal chemical activator is selected from at least one member of the group consisting of an alkali metal salt and an alkali metal base;
freeze-thaw durability component in an amount of 0.05 to 21.5 weight % based upon the total weight of the cementitious reactive powder, the freeze-thaw durability component comprising:
  air-entraining agent in an amount of 0 to 1 weight % based upon the total weight of the cementitious reactive powder,
  defoaming agent in an amount of 0 to 0.5 weight % based upon the total weight of the cementitious reactive powder, and surface active organic polymer in an amount of 0 to 20 weight % based upon the total weight of the cementitious reactive powder;

optional superplasticizer;

wherein at least one member of the group consisting of the air-entraining agent defoaming agent, and the surface active organic polymer is present, wherein said thermally activated aluminosilicate mineral, said aluminate cement, and said calcium sulfate is at least 70 wt. % of the cementitious reactive powder;

wherein the water/cementitious reactive powder weight ratio of the slurry is 0.14 to 0.45:1, setting the slurry to form a set composition;

wherein the set composition has a freeze-thaw durability performance according to ASTM C666/C666M-15 of a relative dynamic modulus of greater than 80 percent for at least 100 freeze-thaw cycles.

18. The method of claim 17, wherein the thermally activated aluminosilicate mineral comprises at least 75% Class C fly ash, wherein the aluminate cement is selected from at least one member of the group consisting of calcium sulfoaluminate cement and calcium aluminate cement.

19. The method of claim 17,
wherein the mixture is mixed at an initial temperature of about 0 to about 122° F. (0 to 50° C.),
wherein the water/cementitious reactive powder weight ratio of the slurry is 0.14 to 0.45:1, wherein the mixture contains at least one member of the group consisting of the air-entraining agent and the surface active organic polymer.

20. The method of claim 17, wherein the slurry comprises a rheology modifier, the defoaming agent, the air entraining agent, and the surface active organic polymer, wherein the slurry has an absence of Portland cement.

21. A settable composition for making a freeze-thaw durable, dimensionally stable, geopolymer composition when reacted in water comprising a mixture of:
cementitious reactive powder comprising:
  thermally activated aluminosilicate mineral in an amount of 100 parts by weight,
  aluminate cement in an amount of 1 to 100 parts by weight (pbw) per 100 pbw of thermally activated aluminosilicate mineral, and
  calcium sulfate in an amount of 2 to 100 parts by weight per 100 pbw of aluminate cement, wherein the calcium sulfate is selected from at least one member of the group consisting of calcium sulfate dihydrate, calcium sulfate hemihydrate, and anhydrous calcium sulfate; and
alkali metal chemical activator in an amount of 1 to 6 weight % based upon the total weight of the cementitious reactive powder, wherein the alkali metal chemical activator is selected from at least one member of the group consisting of an alkali metal salt and an alkali metal base;
freeze-thaw durability component in an amount of 0.05 to 21.5 weight % based upon the total weight of the cementitious reactive powder, the freeze-thaw durability component comprising:
  air-entraining agent in an amount of 0 to 1 weight % based upon the total weight of the cementitious reactive powder,
  defoaming agent in an amount of 0 to 0.5 weight % based upon the total weight of the cementitious reactive powder, and surface active organic polymer in an amount of 0 to 20 weight % based upon the total weight of the cementitious reactive powder;

optional superlasticizer;

wherein at least one member of the group consisting of the air-entraining agent, defoaming agent, and the surface active organic polymer is present, wherein said thermally activated aluminosilicate mineral, said aluminate cement, and said calcium sulfate is at least 70 wt. % of the cementitious reactive powder, wherein the composition after being mixed with water and air and setting will make the freeze-thaw durable, dimensionally stable, geolpolymer composition to have a freeze-thaw durability performance according to ASTM C666/C666M-15 of a relative dynamic modulus of greater than 80 percent for at least 100 freeze-thaw cycles.

* * * * *